(12) United States Patent  
Chai et al.

(10) Patent No.: US 12,052,770 B2  
(45) Date of Patent: Jul. 30, 2024

(54) RANDOM ACCESS METHOD, DEVICE, AND SYSTEM

(71) Applicant: Huawei Technologies Co., Ltd., Shenzhen (CN)

(72) Inventors: Xiaomeng Chai, Shanghai (CN); Yiqun Wu, Shanghai (CN); Shaoyuan Chen, Shenzhen (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 17/402,302

(22) Filed: Aug. 13, 2021

(65) Prior Publication Data

US 2021/0378031 A1 Dec. 2, 2021

Related U.S. Application Data

(63) Continuation of application No. PCT/CN2020/075603, filed on Feb. 17, 2020.

(30) Foreign Application Priority Data

Feb. 15, 2019 (CN) .......................... 201910118163.2  
Apr. 28, 2019 (CN) .......................... 201910351921.5

(51) Int. Cl.  
*H04W 72/04* (2023.01)  
*H04L 5/00* (2006.01)  
(Continued)

(52) U.S. Cl.  
CPC ....... *H04W 74/0841* (2013.01); *H04L 5/0051* (2013.01); *H04W 72/0446* (2013.01);  
(Continued)

(58) Field of Classification Search  
CPC ... H04L 5/0023; H04L 5/0044; H04L 5/0048; H04L 5/0051; H04L 5/0082;  
(Continued)

(56) References Cited

U.S. PATENT DOCUMENTS

| 11,588,669 | B2 * | 2/2023 | Takeda ................... H04W 28/06 |
| 2019/0200326 | A1 * | 6/2019 | Shin ....................... H04L 5/0051 |
| 2022/0104267 | A1 * | 3/2022 | Gao .................... H04W 72/1268 |

FOREIGN PATENT DOCUMENTS

| CA | 3130285 A1 | 8/2020 |
| CN | 107889273 A | 4/2018 |

(Continued)

OTHER PUBLICATIONS

Catt, "Further considerations on a 2-step RA Procedure," 3GPP TSG RAN WG1 AH_NR Meeting, Spokane, USA, R1-1700186, total 4 pages, 3rd Generation Partnership Project, Valobnne, France (Jan. 16-20, 2017).

(Continued)

*Primary Examiner* — Mansour Oveissi  
*Assistant Examiner* — David M Oveissi  
(74) *Attorney, Agent, or Firm* — Leydig, Voit & Mayer, Ltd.

(57) ABSTRACT

A random access method, a device, and a system are provided, related to the field of communications technologies. The method includes: receiving first configuration information, second configuration information, and third configuration information that are sent by a network device, wherein the first configuration information is used to configure a PRACH time-frequency resource and a preamble sequence set, the second configuration information is used to (Continued)

configure a PUSCH time-frequency resource block corresponding to each PRACH time-frequency resource, and the third configuration information is used to configure a size of each PUSCH time-frequency resource and a correspondence between a preamble sequence and a PUSCH time-frequency resource; and sending a first message including a first preamble sequence and uplink data, wherein the first preamble sequence is carried on a first PRACH time-frequency resource, and the uplink data is carried on a PUSCH time-frequency resource associated with the first PRACH time-frequency resource.

20 Claims, 29 Drawing Sheets

(51) Int. Cl.
  *H04W 72/0446* (2023.01)
  *H04W 72/0453* (2023.01)
  *H04W 72/1263* (2023.01)
  *H04W 74/08* (2009.01)
  *H04W 74/0833* (2024.01)
(52) U.S. Cl.
  CPC ... *H04W 72/0453* (2013.01); *H04W 72/1263* (2013.01); *H04W 74/0866* (2013.01)
(58) Field of Classification Search
  CPC ............ H04L 5/0094; H04W 72/0446; H04W 72/0453; H04W 72/1263; H04W 72/1268; H04W 74/0833; H04W 74/0841; H04W 74/0866
  See application file for complete search history.

(56) References Cited

FOREIGN PATENT DOCUMENTS

| | | |
|---|---|---|
| CN | 108282874 A | 7/2018 |
| CN | 108633100 A | 10/2018 |
| CN | 111294937 A | 6/2020 |
| EP | 3925370 A1 | 12/2021 |
| JP | 2017511088 A | 4/2017 |
| WO | 2018062925 A1 | 4/2018 |
| WO | 2018064367 A1 | 4/2018 |
| WO | 2018085726 A1 | 5/2018 |
| WO | 2018089265 A1 | 5/2018 |
| WO | 2018127042 A1 | 7/2018 |
| WO | 2018133437 A1 | 7/2018 |
| WO | 2020167794 A1 | 8/2020 |

OTHER PUBLICATIONS

Motorola Mobility, "Physical channel design for 2-step RACH," 3GPP TSG RAN WG1 Meeting NR, Spokane, USA, R1-1700880, total 5 pages, 3rd Generation Partnership Project, Valobnne, France (Jan. 16-20, 2017).

InterDigital, "2-Step RACH Procedure," 3GPP TSG-RAN WG2 Meeting # 103bis, Chengdu, China, R2-1814008, total 5 pages, 3rd Generation Partnership Project, Valbonne, France (Oct. 8-12, 2018).

Ericsson, "NR two-step random access procedure," 3GPP TSG-RAN WG1 NR adhoc, Spokane, USA, R1-1700300, total 4 pages, 3rd Generation Partnership Project, Valbonne, France (Jan. 16-20, 2017).

Huawei et al., "Discussion on channel structure of 2-step RACH," 3GPP TSG RAN WG1 Meeting #97, Reno, USA, R1-1906050, total 12 pages, 3rd Generation Partnership Project, Valbonne, France (May 13-17, 2019).

Nokia, Nokia Shanghai Bell, "On 2-step Random Access Procedure," 3GPP TSG RAN WG1 Ad-Hoc Meeting 1901, Taipei, Taiwan, R1-1901192, total 7 pages, 3rd Generation Partnership Project, Valbonne, France (Jan. 21-25, 2019).

ZTE, ZTE Microelectronics, "2-step Random Access Procedure," 3GPP TSG RAN WG1 AH_NR Meeting, Spokane, USA, R1-1700105, total 10 pages, 3rd Generation Partnership Project, Valbonne, France (Jan. 16-20, 2017).

"3rd Generation Partnership Project; Technical Specification Group Radio Access Network; NR; Physical channels and modulation (Release 15)," 3GPP TS 38.211 V15.4.0, total 96 pages, 3rd Generation Partnership Project, Valbonne, France (Dec. 2018).

CATT, "Further considerations on a 2-step RA Procedure," 3GPP TSG RAN WG1 AH_NR Meeting, Spokane, USA, R1-1700186, total 4 pages, 3rd Generation Partnership Project, Valbonne, France (Jan. 16-20, 2017).

"3rd Generation Partnership Project; Technical Specification Group Radio Access Network; NR; Physical layer procedures for control (Release 15)," 3GPP TS 38.213 V15.4.0, total 104 pages, 3rd Generation Partnership Project, Valbonne, France (Dec. 2018).

Motorola Mobility, "Physical channel design for 2-step Rach," 3GPP TSG RAN WG1 Meeting NR, Spokane, USA, R1-1700880, total 5 pages, 3rd Generation Partnership Project, Valbonne, France (Jan. 16-20, 2017).

"3rd Generation Partnership Project; Technical Specification Group Radio Access Network; NR; Physical layer procedures for data (Release 15)," 3GPP TS 38.214 V15.4.0, total 102 pages, 3rd Generation Partnership Project, Valbonne, France (Dec. 2018).

"3rd Generation Partnership Project; Technical Specification Group Radio Access Network; NR; Radio Resource Control (RRC) protocol specification (Release 15)," 3GPP TS 38.331 V15.4.0, total 474 pages, 3rd Generation Partnership Project, Valbonne, France (Dec. 2018).

* cited by examiner

RANDOM ACCESS METHOD, DEVICE, AND SYSTEM

CROSS-REFERENCE TO RELATED APPLICATIONS

This application is a continuation of International Application No. PCT/CN2020/075603, filed on Feb. 17, 2020, which claims priority to Chinese Patent Application No. 201910118163.2, filed on Feb. 15, 2019 and Chinese Patent Application No. 201910351921.5, filed on Apr. 28, 2019. All of the aforementioned patent applications are hereby incorporated by reference in their entireties.

TECHNICAL FIELD

Embodiments of this application relate to the field of communications technologies, and in particular, to a random access method, a device, and a system.

BACKGROUND

In a wireless communication process, user equipment (UE) may establish a connection to a base station (BS) by using a random access procedure and obtain uplink synchronization, to send uplink data to the accessed BS.

Currently, the UE may access the BS through a four-step random access procedure. The four-step random access procedure is specifically as follows: The UE sends a random access preamble to the BS, which is also referred to as a message 1 (Msg1). After detecting the random access preamble, the BS sends a random access response to the UE, which is also referred to as a message 2 (Msg2). The UE sends an uplink message, also referred to as a message 3 (Msg3), on an allocated uplink resource through a data channel (for example, a physical uplink shared channel (PUSCH)) based on an indication of the Msg2. The Msg3 carries unique identity information of the UE. Because a plurality of UEs may send a same random access preamble to the BS, these UEs receive same Msg2 and send Msg3 to the BS based on an indication of the Msg2, resulting in a conflict between a plurality of Msg3. The BS can successfully receive, at a time, Msg3 sent by a maximum of one UE, or may fail to receive, due to interference between UEs, Msg3 sent by any UE. To resolve the conflict, after successfully receiving one Msg3, the BS returns a conflict resolution message (which may also be referred to as Msg4) to UE that successfully accesses the BS. The Msg4 carries a unique identity that is in the Msg3, to specify the UE that successfully accesses the BS.

In the four-step random access procedure, when UE in an idle state or an inactive state intends to transmit uplink data, the UE needs to complete at least four times of information exchange before entering a radio resource control (RRC) connected state. For an ultra-reliable and low-latency communications (URLLC) service, four times of information exchange cause a relatively high latency, and cannot meet a URLLC low-latency requirement. For a massive machine-type communications (mMTC) service, especially a service whose service data is sporadic small packets, four-step information exchange not only causes a relatively high latency, but also causes relatively high signaling overheads.

Therefore, a two-step random access procedure is proposed in the industry. As shown in FIG. 1, a difference between the two-step random access procedure and the four-step random access procedure lies in that, in the two-step random access procedure, Msg A sent by UE to a BS includes a random access preamble and uplink data, that is, the UE sends the uplink data before completing uplink synchronization, so that an uplink data transmission latency can be reduced. In addition, compared with the four-step random access procedure, in the two-step random access procedure, the BS does not need to send data channel scheduling information for the UE in Msg B sent to the UE, thereby reducing signaling overheads.

However, in a specific implementation process of the two-step random access procedure, the following problem exists: After the UE selects a physical random access channel (PRACH) preamble when sending the Msg A, regarding how the UE selects a corresponding physical uplink shared channel (PUSCH) resource for sending the uplink data, the industry has not provided an appropriate solution to this technical problem.

SUMMARY

This application provides a random access method, a device, and a system, to reduce signaling overheads and improve resource utilization.

To resolve the foregoing technical problem, the following technical solutions are provided in this application:

According to a first aspect, a random access method is provided, and includes: receiving, by a terminal, first configuration information, second configuration information, and third configuration information that are sent by a network device, where the first configuration information is used to configure one or more physical random access channel PRACH time-frequency resources and a preamble sequence set: the second configuration information is used to configure a physical uplink shared channel PUSCH time-frequency resource block corresponding to each PRACH time-frequency resource, and the PUSCH time-frequency resource block includes one or more PUSCH time-frequency resources: and the third configuration information is used to configure a size of each PUSCH time-frequency resource and a correspondence between a preamble sequence and a PUSCH time-frequency resource; determining a first PRACH time-frequency resource based on the first configuration information: determining a first preamble sequence to be sent on the first PRACH time-frequency resource, where the first preamble sequence is a preamble sequence in the preamble sequence set: determining a PUSCH time-frequency resource corresponding to the first preamble sequence, based on the first PRACH time-frequency resource, the first preamble sequence, the second configuration information, and the third configuration information: and sending a first message including the first preamble sequence and uplink data, where the first preamble sequence is carried on the first PRACH time-frequency resource, and the uplink data is carried on the PUSCH time-frequency resource corresponding to the first PRACH time-frequency resource.

It can be learned that the terminal may determine, based on the first configuration information, the second configuration information, and the third configuration information that are configured by the network device, a preamble sequence and a PUSCH time-frequency resource corresponding to the preamble sequence. Therefore, the terminal may directly send the first message including the first preamble sequence and the uplink data, to reduce an uplink data transmission latency. In addition, the network device does not need to send PUSCH time-frequency resource scheduling information to the terminal for each random access of the terminal, to reduce signaling overheads.

In a possible implementation, the second configuration information includes information used for configuring a demodulation reference signal DMRS port associated with the PUSCH time-frequency resource block.

In a possible implementation, the second configuration information includes configuration information of a first mapping pattern, the first mapping pattern includes one or more mapping rules, and each mapping rule may be used together with at least one PRACH time-frequency resource to determine a time domain resource and a frequency domain resource of at least one PUSCH time-frequency resource block.

In a possible implementation, the second configuration information includes a period T1 used to configure the PUSCH time-frequency resource block, and the first mapping pattern is used to determine a PUSCH time-frequency resource block corresponding to a PRACH time-frequency resource in the period T1.

In a possible implementation, the second configuration information includes a parameter $N_1$, and the parameter $N_1$ is used to determine a quantity of PUSCH time-frequency resource blocks corresponding to each PRACH time-frequency resource.

In a possible implementation, the parameter $N_1$ and the first mapping pattern are used to determine the PUSCH time-frequency resource block corresponding to each PRACH time-frequency resource.

In a possible implementation, the second configuration information includes a parameter $N_2$ and a parameter $N_3$, the parameter $N_2$ is used to determine a quantity of PRACH time-frequency resources included in each PRACH time-frequency resource group, and the parameter $N_3$ is used to determine a quantity of PUSCH time-frequency resource blocks associated with each PRACH time-frequency resource group in the period T1.

In a possible implementation, the second configuration information includes a period T2 of the PUSCH time-frequency resource block, and time domain resource configuration information of the PUSCH time-frequency resource block and/or frequency domain resource configuration information of the PUSCH time-frequency resource block.

In a possible implementation, the second configuration information includes a mapping period T3, and a same rule is used in each mapping period T3 to determine a PUSCH time-frequency resource block corresponding to each configured PRACH time-frequency resource.

In a possible implementation, the second configuration information includes a parameter $N_4$, and the parameter $N_4$ is used to determine a quantity of PUSCH time-frequency resource blocks corresponding to each PRACH time-frequency resource.

In a possible implementation, the second configuration information includes a parameter $N_5$ and a parameter $N_6$, the parameter $N_5$ is used to determine a quantity of PRACH time-frequency resources included in each PRACH time-frequency resource group, and the parameter $N_6$ is used to determine a quantity of PUSCH time-frequency resource blocks associated with each PRACH time-frequency resource group in the period T3.

In a possible implementation, the second configuration information further includes a parameter $N_7$ and information about a second mapping pattern, the parameter $N_7$ is used to determine a quantity of PRACH time-frequency resources included in each PRACH resource group, the second mapping pattern includes one or more sequence number sets, each sequence number set includes a sequence number or sequence numbers of one or more PUSCH time-frequency resource blocks, and the parameter $N_7$ and the second mapping pattern are used to determine a sequence number of a PUSCH time-frequency resource block associated with each PRACH time-frequency resource group in the period T3.

In a possible implementation, the determining a PUSCH time-frequency resource corresponding to the first preamble sequence, based on the first PRACH time-frequency resource, the first preamble sequence, the second configuration information, and the third configuration information includes: determining the PUSCH time-frequency resource corresponding to the first preamble sequence, based on a preset order of mapping from PRACH time-frequency resources to PUSCH time-frequency resource blocks, the first PRACH time-frequency resource, the first preamble sequence, the second configuration information, and the third configuration information.

In a possible implementation, the third configuration information includes the size of each PUSCH time-frequency resource and a parameter $N_8$, and the parameter $N_8$ is used to determine a quantity of PUSCH time-frequency resources corresponding to each preamble sequence.

In a possible implementation, the determining a PUSCH time-frequency resource corresponding to the first preamble sequence, based on the first PRACH time-frequency resource, the first preamble sequence, the second configuration information, and the third configuration information includes: determining the PUSCH time-frequency resource corresponding to the first preamble sequence, based on the preset order of mapping from PRACH time-frequency resources to PUSCH time-frequency resource blocks, a preset order of mapping from preamble sequences to PUSCH time-frequency resources, the first PRACH time-frequency resource, the first preamble sequence, the second configuration information, and the third configuration information.

In a possible implementation, the method further includes: determining, based on a preset order of mapping from preamble sequences to DMRS ports, a DMRS port associated with the PUSCH time-frequency resource corresponding to the first PRACH time-frequency resource.

According to a second aspect, a random access method is provided, and includes: sending, by a network device, first configuration information, second configuration information, and third configuration information to a terminal, where the first configuration information is used to configure one or more physical random access channel PRACH time-frequency resources and a preamble sequence set: the second configuration information is used to configure a physical uplink shared channel PUSCH time-frequency resource block corresponding to each PRACH time-frequency resource, and the PUSCH time-frequency resource block includes one or more PUSCH time-frequency resources: and the third configuration information is used to configure a size of each PUSCH time-frequency resource and a correspondence between a preamble sequence and a PUSCH time-frequency resource; and receiving a first message that includes a first preamble sequence and uplink data and that is sent by the terminal, where the first preamble sequence is carried on a first PRACH time-frequency resource, and the uplink data is carried on a PUSCH time-frequency resource corresponding to the first PRACH time-frequency resource.

It can be learned that the first configuration information, the second configuration information, and the third configuration information that are configured by the network device may be used by the terminal to determine a preamble sequence and a PUSCH time-frequency resource corresponding to the preamble sequence. Therefore, the terminal may directly send the first message including the first preamble sequence and the uplink data, to reduce an uplink data transmission latency. In addition, the network device does not need to send PUSCH time-frequency resource scheduling information to the terminal for each random access of the terminal, to reduce signaling overheads.

In a possible implementation, the second configuration information includes information used for configuring a demodulation reference signal DMRS port associated with the PUSCH time-frequency resource block.

In a possible implementation, the second configuration information includes configuration information of a first mapping pattern, the first mapping pattern includes one or more mapping rules, and each mapping rule may be used together with at least one PRACH time-frequency resource to determine a time domain resource and a frequency domain resource of at least one PUSCH time-frequency resource block.

In a possible implementation, the second configuration information includes a period T1 used to configure the PUSCH time-frequency resource block, and the first mapping pattern is used to determine a PUSCH time-frequency resource block corresponding to a PRACH time-frequency resource in the period T1.

In a possible implementation, the second configuration information includes a parameter $N_1$, and the parameter $N_1$ is used to determine a quantity of PUSCH time-frequency resource blocks corresponding to each PRACH time-frequency resource.

In a possible implementation, the parameter $N_1$ and the first mapping pattern are used to determine the PUSCH time-frequency resource block corresponding to each PRACH time-frequency resource.

In a possible implementation, the second configuration information includes a parameter $N_2$ and a parameter $N_3$, the parameter $N_2$ is used to determine a quantity of PRACH time-frequency resources included in each PRACH time-frequency resource group, and the parameter $N_3$ is used to determine a quantity of PUSCH time-frequency resource blocks associated with each PRACH time-frequency resource group in the period T1.

In a possible implementation, the second configuration information includes a period T2 of the PUSCH time-frequency resource block, and time domain resource configuration information of the PUSCH time-frequency resource block and/or frequency domain resource configuration information of the PUSCH time-frequency resource block.

In a possible implementation, the second configuration information includes a mapping period T3, and a same rule is used in each mapping period T3 to determine a PUSCH time-frequency resource block corresponding to each configured PRACH time-frequency resource.

In a possible implementation, the second configuration information includes a parameter $N_4$, and the parameter $N_4$ is used to determine a quantity of PUSCH time-frequency resource blocks corresponding to each PRACH time-frequency resource.

In a possible implementation, the second configuration information includes a parameter $N_5$ and a parameter $N_6$, the parameter $N_5$ is used to determine a quantity of PRACH time-frequency resources included in each PRACH time-frequency resource group, and the parameter $N_6$ is used to determine a quantity of PUSCH time-frequency resource blocks associated with each PRACH time-frequency resource group in the period T3.

In a possible implementation, the second configuration information further includes a parameter $N_7$ and information about a second mapping pattern, the parameter $N_7$ is used to determine a quantity of PRACH time-frequency resources included in each PRACH resource group, the second mapping pattern includes one or more sequence number sets, each sequence number set includes a sequence number or sequence numbers of one or more PUSCH time-frequency resource blocks, and the parameter $N_7$ and the second mapping pattern are used to determine a sequence number of a PUSCH time-frequency resource block associated with each PRACH time-frequency resource group in the period T3.

In a possible implementation, the third configuration information includes the size of each PUSCH time-frequency resource and a parameter $N_8$, and the parameter $N_5$ is used to determine a quantity of PUSCH time-frequency resources corresponding to each preamble sequence.

According to a third aspect, a random access apparatus is provided, and includes a communications unit and a determining unit. The communications unit is configured to receive first configuration information, second configuration information, and third configuration information that are sent by a network device, where the first configuration information is used to configure one or more physical random access channel PRACH time-frequency resources and a preamble sequence set: the second configuration information is used to configure a physical uplink shared channel PUSCH time-frequency resource block corresponding to each PRACH time-frequency resource, and the PUSCH time-frequency resource block includes one or more PUSCH time-frequency resources: and the third configuration information is used to configure a size of each PUSCH time-frequency resource and a correspondence between a preamble sequence and a PUSCH time-frequency resource. The determining unit is configured to determine a first PRACH time-frequency resource based on the first configuration information. The determining unit is further configured to determine a first preamble sequence to be sent on the first PRACH time-frequency resource, where the first preamble sequence is a preamble sequence in the preamble sequence set. The determining unit is further configured to determine a PUSCH time-frequency resource corresponding to the first preamble sequence, based on the first PRACH time-frequency resource, the first preamble sequence, the second configuration information, and the third configuration information. The communications unit is further configured to send a first message including the first preamble sequence and uplink data, where the first preamble sequence is carried on the first PRACH time-frequency resource, and the uplink data is carried on the PUSCH time-frequency resource corresponding to the first PRACH time-frequency resource.

In a possible implementation, the second configuration information includes information used for configuring a demodulation reference signal DMRS port associated with the PUSCH time-frequency resource block.

In a possible implementation, the second configuration information includes configuration information of a first mapping pattern, the first mapping pattern includes one or more mapping rules, and each mapping rule may be used together with at least one PRACH time-frequency resource to determine a time domain resource and a frequency domain resource of at least one PUSCH time-frequency resource block.

In a possible implementation, the second configuration information includes a period T1 used to configure the PUSCH time-frequency resource block, and the first mapping pattern is used to determine a PUSCH time-frequency resource block corresponding to a PRACH time-frequency resource in the period T1.

In a possible implementation, the second configuration information includes a parameter $N_1$, and the parameter $N_1$ is used to determine a quantity of PUSCH time-frequency resource blocks corresponding to each PRACH time-frequency resource.

In a possible implementation, the parameter $N_1$ and the first mapping pattern are used to determine the PUSCH time-frequency resource block corresponding to each PRACH time-frequency resource.

In a possible implementation, the second configuration information includes a parameter $N_2$ and a parameter $N_3$, the parameter $N_2$ is used to determine a quantity of PRACH time-frequency resources included in each PRACH time-frequency resource group, and the parameter $N_3$ is used to determine a quantity of PUSCH time-frequency resource blocks associated with each PRACH time-frequency resource group in the period T1.

In a possible implementation, the second configuration information includes a period T2 of the PUSCH time-frequency resource block, and time domain resource configuration information of the PUSCH time-frequency resource block and/or frequency domain resource configuration information of the PUSCH time-frequency resource block.

In a possible implementation, the second configuration information includes a mapping period T3, and a same rule is used in each mapping period T3 to determine a PUSCH time-frequency resource block corresponding to each configured PRACH time-frequency resource.

In a possible implementation, the second configuration information includes a parameter $N_4$, and the parameter $N_4$ is used to determine a quantity of PUSCH time-frequency resource blocks corresponding to each PRACH time-frequency resource.

In a possible implementation, the second configuration information includes a parameter $N_5$ and a parameter $N_6$, the parameter $N_5$ is used to determine a quantity of PRACH time-frequency resources included in each PRACH time-frequency resource group, and the parameter $N_6$ is used to determine a quantity of PUSCH time-frequency resource blocks associated with each PRACH time-frequency resource group in the period T3.

In a possible implementation, the second configuration information further includes a parameter $N_7$ and information about a second mapping pattern, the parameter $N_7$ is used to determine a quantity of PRACH time-frequency resources included in each PRACH resource group, the second mapping pattern includes one or more sequence number sets, each sequence number set includes a sequence number or sequence numbers of one or more PUSCH time-frequency resource blocks, and the parameter $N_7$ and the second mapping pattern are used to determine a sequence number of a PUSCH time-frequency resource block associated with each PRACH time-frequency resource group in the period T3.

In a possible implementation, that the determining unit is further configured to determine a PUSCH time-frequency resource corresponding to the first preamble sequence, based on the first PRACH time-frequency resource, the first preamble sequence, the second configuration information, and the third configuration information specifically includes: The determining unit is specifically configured to determine the PUSCH time-frequency resource corresponding to the first preamble sequence, based on a preset order of mapping from PRACH time-frequency resources to PUSCH time-frequency resource blocks, the first PRACH time-frequency resource, the first preamble sequence, the second configuration information, and the third configuration information.

In a possible implementation, the third configuration information includes the size of each PUSCH time-frequency resource and a parameter $N_8$, and the parameter $N_8$ is used to determine a quantity of PUSCH time-frequency resources corresponding to each preamble sequence.

In a possible implementation, that the determining unit is further configured to determine a PUSCH time-frequency resource corresponding to the first preamble sequence, based on the first PRACH time-frequency resource, the first preamble sequence, the second configuration information, and the third configuration information includes: The determining unit is specifically configured to determine the PUSCH time-frequency resource corresponding to the first preamble sequence, based on the preset order of mapping from PRACH time-frequency resources to PUSCH time-frequency resource blocks, a preset order of mapping from preamble sequences to PUSCH time-frequency resources, the first PRACH time-frequency resource, the first preamble sequence, the second configuration information, and the third configuration information.

In a possible implementation, the determining unit is further configured to determine, based on a preset order of mapping from preamble sequences to DMRS ports, a DMRS port associated with the PUSCH time-frequency resource corresponding to the first PRACH time-frequency resource.

According to a fourth aspect, a random access apparatus is provided, and includes a communications unit. The communications unit is configured to send first configuration information, second configuration information, and third configuration information to a terminal, where the first configuration information is used to configure one or more physical random access channel PRACH time-frequency resources and a preamble sequence set: the second configuration information is used to configure a physical uplink shared channel PUSCH time-frequency resource block corresponding to each PRACH time-frequency resource, and the PUSCH time-frequency resource block includes one or more PUSCH time-frequency resources: and the third configuration information is used to configure a size of each PUSCH time-frequency resource and a correspondence between a preamble sequence and a PUSCH time-frequency resource. The communications unit is further configured to receive a first message that includes a first preamble sequence and uplink data and that is sent by the terminal, where the first preamble sequence is carried on a first PRACH time-frequency resource, and the uplink data is carried on a PUSCH time-frequency resource corresponding to the first PRACH time-frequency resource.

In a possible implementation, the second configuration information includes information used for configuring a demodulation reference signal DMRS port associated with the PUSCH time-frequency resource block.

In a possible implementation, the second configuration information includes configuration information of a first mapping pattern, the first mapping pattern includes one or more mapping rules, and each mapping rule may be used together with at least one PRACH time-frequency resource to determine a time domain resource and a frequency domain resource of at least one PUSCH time-frequency resource block.

In a possible implementation, the second configuration information includes a period T1 used to configure the PUSCH time-frequency resource block, and a first mapping pattern is used to determine a PUSCH time-frequency resource block corresponding to a PRACH time-frequency resource in the period T1.

In a possible implementation, the second configuration information includes a parameter $N_1$, and the parameter $N_1$ is used to determine a quantity of PUSCH time-frequency resource blocks corresponding to each PRACH time-frequency resource.

In a possible implementation, the parameter $N_1$ and the first mapping pattern are used to determine the PUSCH time-frequency resource block corresponding to each PRACH time-frequency resource.

In a possible implementation, the second configuration information includes a parameter $N_2$ and a parameter $N_3$, the parameter $N_2$ is used to determine a quantity of PRACH time-frequency resources included in each PRACH time-frequency resource group, and the parameter $N_3$ is used to determine a quantity of PUSCH time-frequency resource blocks associated with each PRACH time-frequency resource group in the period T1.

In a possible implementation, the second configuration information includes a period T2 of the PUSCH time-frequency resource block, and time domain resource configuration information of the PUSCH time-frequency resource block and/or frequency domain resource configuration information of the PUSCH time-frequency resource block.

In a possible implementation, the second configuration information includes a mapping period T3, and a same rule is used in each mapping period T3 to determine a PUSCH time-frequency resource block corresponding to each configured PRACH time-frequency resource.

In a possible implementation, the second configuration information includes a parameter $N_4$, and the parameter $N_4$ is used to determine a quantity of PUSCH time-frequency resource blocks corresponding to each PRACH time-frequency resource.

In a possible implementation, the second configuration information includes a parameter $N_5$ and a parameter $N_6$, the parameter $N_5$ is used to determine a quantity of PRACH time-frequency resources included in each PRACH time-frequency resource group, and the parameter $N_6$ is used to determine a quantity of PUSCH time-frequency resource blocks associated with each PRACH time-frequency resource group in the period T3.

In a possible implementation, the second configuration information further includes a parameter $N_7$ and information about a second mapping pattern, the parameter $N_7$ is used to determine a quantity of PRACH time-frequency resources included in each PRACH resource group, the second mapping pattern includes one or more sequence number sets, each sequence number set includes a sequence number or sequence numbers of one or more PUSCH time-frequency resource blocks, and the parameter $N_7$ and the second mapping pattern are used to determine a sequence number of a PUSCH time-frequency resource block associated with each PRACH time-frequency resource group in the period T3.

In a possible implementation, the third configuration information includes the size of each PUSCH time-frequency resource and a parameter $N_8$, and the parameter $N_8$ is used to determine a quantity of PUSCH time-frequency resources corresponding to each preamble sequence.

According to a fifth aspect, a random access apparatus is provided. The random access apparatus includes a processor, and optionally, further includes one or more of a memory, at least one communications interface, and a communications bus. The memory is configured to store a computer-executable instruction. The processor, the memory, and the at least one communications interface are connected by using the communications bus. The processor executes the computer-executable instruction stored in the memory, so that the random access apparatus implements the method according to the first aspect or the second aspect. The random access apparatus may exist in a product form of a chip.

According to a sixth aspect, a communications system is provided, and includes the random access apparatuses according to the third aspect and the fourth aspect.

According to a seventh aspect, a computer-readable storage medium is provided. The computer-readable storage medium includes an instruction, and when the instruction is run on a computer, the computer is enabled to perform any method according to the first aspect or the second aspect.

According to an eighth aspect, a computer program product including an instruction is provided. When the instruction is run on a computer, the computer is enabled to perform any method according to the first aspect or the second aspect.

For technical effects brought by any design of the third aspect to the eighth aspect, refer to technical effects brought by a corresponding design of the first aspect and the second aspect. Details are not described herein again.

It should be noted that, various possible implementations of any one of the foregoing aspects may be combined on a premise that the solutions are not contradictory.

DESCRIPTION OF EMBODIMENTS

Figure 1:
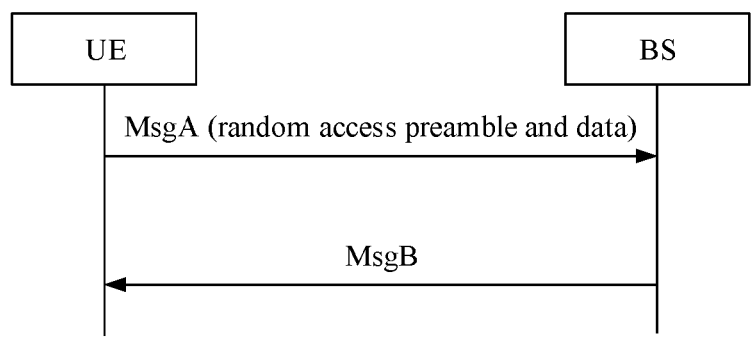
FIG. 1 is a schematic diagram of a random access procedure according to the current technology.

To facilitate understanding of this application, some concepts in embodiments of this application are briefly described herein.

1. PRACH Time-Frequency Resource, Also Referred to as a PRACH Occasion.

In a 5G new radio (NR) system, a time-frequency resource used to send a preamble is usually represented by using a PRACH occasion. Each PRACH time-frequency resource may include 64 preamble sequences, and each preamble sequence may be referred to as a preamble resource. A PRACH time-frequency resource has different sizes based on different subcarrier spacings of the PRACH time-frequency resource and different preamble formats.

2. Configuring a PRACH Time-Frequency Resource

Configuring a PRACH time-frequency resource by a network side specifically includes configuring a time domain resource and a frequency domain resource.

When the network side configures the time domain resource of the PRACH time-frequency resource, the network side may configure, for example, a parameter PRACH Configuration Index. A UE side may determine the time domain resource of the PRACH time-frequency resource based on the parameter PRACH Configuration Index and Table 1. For example, if PRACH Configuration Index is 87, a preamble is sent in a subframe #4 (a subframe whose sequence number is 4) and a subframe #9 (a subframe whose sequence number is 9) of each radio frame whose frame number satisfies mod 16=0, and sending of the preamble starts from a symbol #0 (an OFDM symbol whose sequence number is 0). One subframe has only one PRACH slot, each PRACH slot has six consecutive PRACH time-frequency resources, and each PRACH time-frequency resource occupies two symbols. It should be noted that, Table 1 shows configuration information of only some PRACH time domain resources.

TABLE 1

| PRACH configuration index | Preamble format | $n_{SFN}$ mod x = y | | Subframe number) | Start symbol) | Quantity of PRACH slots in a subframe | $N_t^{RA, slot}$ | $N_{dur}^{RA}$ |
|---|---|---|---|---|---|---|---|---|
| | | x | y | | | | | |
| 0 | 0 | 16 | 1 | 1 | 0 | — | — | 0 |
| ... | | | | | | | | |
| 87 | A1 | 16 | 0 | 4, 9 | 0 | 1 | 6 | 2 |

$N_t^{RA,slot}$ is a quantity of PRACH time-frequency resources that are consecutive in time domain in one PRACH slot, and $N_{dur}^{RA}$ is a quantity of symbols occupied by each PRACH time-frequency resource.

When the network side configures the frequency domain resource of the PRACH time-frequency resource, the network side may configure a frequency domain size and a frequency domain start position of the PRACH time-frequency resource, and a quantity of PRACH time-frequency resources that are consecutive in frequency domain on each PRACH time-domain occasion.

Specifically, the network side may configure, for example, a parameter msg1-Frequency Start, used to indicate the frequency domain start position of the PRACH time-frequency resource. The network side may further configure, for example, a parameter msg1-FDM, used to indicate a quantity of PRACH time-frequency resources that are consecutive in frequency domain on each PRACH time-domain occasion and that are frequency division multiplexed. The network side may further configure, for example, a parameter PRACH Configuration Index, used to indicate the frequency domain size of the PRACH time-frequency resource. Specifically, the UE side may determine, by looking up Table 1, a preamble format based on the parameter PRACH Configuration Index. Then, a preamble length ($L_{RA}$) and a subcarrier spacing ($\Delta f^{RA}$) of the PRACH time-frequency resource may be determined, by looking up Table 2 or Table 3, based on the preamble format. Finally, the frequency domain size of the PRACH time-frequency resource (that is, a quantity $N_{RB}^{RA}$ of RBs occupied by the PRACH time-frequency resource) may be determined, by looking up Table 4, based on the preamble length ($L_{RA}$), the subcarrier spacing ($\Delta f^{RA}$) of the PRACH time-frequency resource, and a subcarrier spacing $\Delta f$ of a PUSCH time-frequency resource.

TABLE 2

| Preamble format | $L_{RA}$ | $\Delta f^{RA}$ | $N_u$ | $N_{CP}^{RA}$ |
|---|---|---|---|---|
| 0 | 839 | 1.25 kHz | 24576k | 3168k |
| 1 | 839 | 1.25 kHz | 2 · 24576k | 2 · 21024k |
| 2 | 839 | 1.25 kHz | 4 · 24576k | 4688k |
| 3 | 839 | 5 kHz | 4 · 6144k | 3168k |

TABLE 3

| Preamble format | $L_{RA}$ | $\Delta f^{RA}$ | $N_u$ | $N_{CP}^{RA}$ |
|---|---|---|---|---|
| A1 | 139 | 15 · $2^\mu$ kHz | 2 · 2048κ · $2^{-\mu}$ | 288κ · $2^{-\mu}$ |
| A2 | 139 | 15 · $2^\mu$ kHz | 4 · 2048κ · $2^{-\mu}$ | 576κ · $2^{-\mu}$ |
| A3 | 139 | 15 · $2^\mu$ kHz | 6 · 2048κ · $2^{-\mu}$ | 864κ · $2^{-\mu}$ |
| B1 | 139 | 15 · $2^\mu$ kHz | 2 · 2048κ · $2^{-\mu}$ | 216κ · $2^{-\mu}$ |

TABLE 3-continued

| Preamble format | $L_{RA}$ | $\Delta f^{RA}$ | $N_u$ | $N_{CP}^{RA}$ |
|---|---|---|---|---|
| B2 | 139 | 15 · $2^\mu$ kHz | 4 · 2048κ · $2^{-\mu}$ | 360κ · $2^{-\mu}$ |
| B3 | 139 | 15 · $2^\mu$ kHz | 6 · 2048κ · $2^{-\mu}$ | 504κ · $2^{-\mu}$ |
| B4 | 139 | 15 · $2^\mu$ kHz | 12 · 2048κ · $2^{-\mu}$ | 936κ · $2^{-\mu}$ |
| C0 | 139 | 15 · $2^\mu$ kHz | 2048κ · $2^{-\mu}$ | 1240κ · $2^{-\mu}$ |
| C2 | 139 | 15 · $2^\mu$ kHz | 4 · 2048κ · $2^{-\mu}$ | 2048κ · $2^{-\mu}$ |

TABLE 4

| $L_{RA}$ | $\Delta f^{RA}$ | $\Delta f$ | $N_{RB}^{RA}$ | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |

3. 5G NR Frame Structure

5G NR supports a plurality of subcarrier spacings, but radio frames and subframes both have same lengths in different subcarrier spacing configurations. A length of the radio frame is 10 ms, and a length of the subframe is 1 ms.

A slot length in each subframe varies with a subcarrier spacing. Generally, the slot length decreases as the subcarrier spacing increases. Therefore, subframes include different quantities of slots. In a case of a normal cyclic prefix (CP), slots include a same quantity of symbols, and each slot includes 14 symbols.

Figure 3:
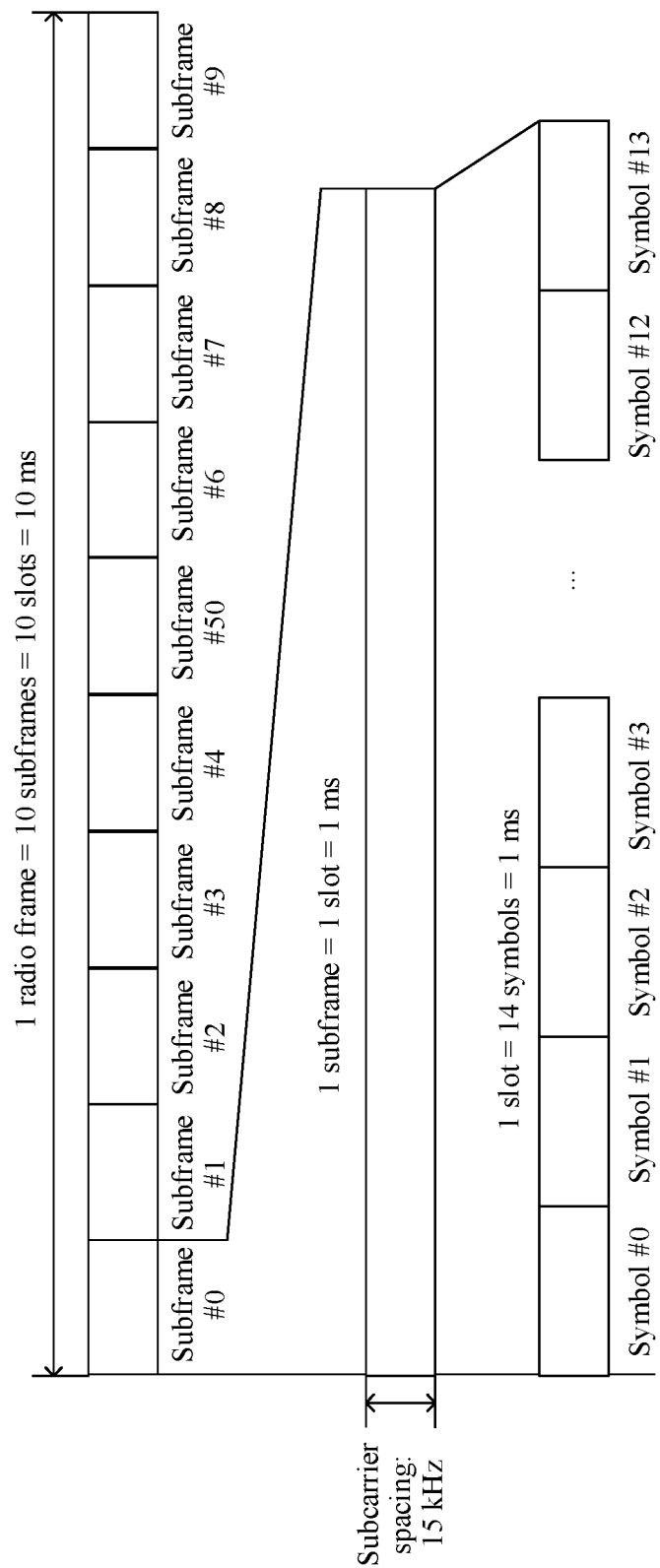
FIG. 3 is a schematic diagram of a 5G NR frame structure according to the current technology.

For example, when the subcarrier spacing is configured as 15 kHz (normal CP), referring to FIG. 3, one radio frame includes 10 subframes (sequence numbers of the subframes are #0 to #9), and each subframe has only one slot. Therefore, the radio frame includes 10 slots, that is, a sequence number of a subframe is the same as a sequence number of a slot, and the subframe and the slot may be used interchangeably. Each slot includes 14 OFDM symbols (sequence numbers of the OFDM symbols in each slot are #0 to #13).

It should be noted that, all sequence numbers in this application may also be understood as numbers or indexes.

Figure 4:
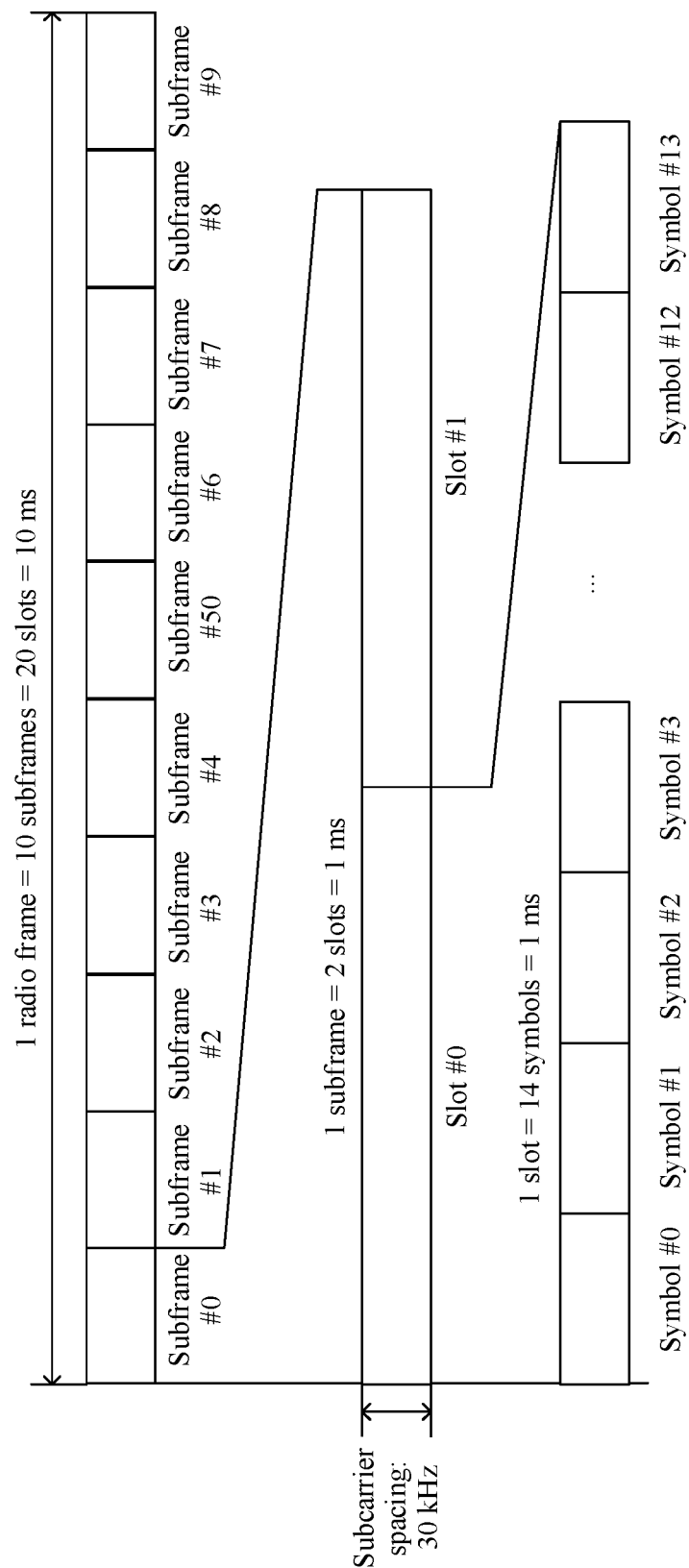
FIG. 4 is a schematic diagram of another 5G NR frame structure according to the current technology.

For another example, when the subcarrier spacing is configured as 30 kHz (normal CP), referring to FIG. 4, one radio frame includes 10 subframes (sequence numbers of the subframes are #0 to #9), and each subframe has only two slots (sequence numbers of slots in each subframe are #0 to #1). Therefore, the radio frame includes 20 slots. Each slot includes 14 OFDM symbols (sequence numbers of the OFDM symbols in each slot are #0 to #13).

In the embodiments of this application, "XX #n" is used to represent "XX whose sequence number is n", where n is a positive integer. "XX" may be a "radio frame", a "subframe", a "slot", a "symbol", a "PRACH time-frequency resource", a "PRACH time-frequency resource group", a "PUSCH time-frequency resource block", a "PUSCH time-frequency resource", or the like. For example, "subframe #4" represents a subframe whose sequence number is 4. A general description is provided herein, and details are not described below:

4. Sequence Number of a PRACH Time-Frequency Resource

In the embodiments of this application, a sequence number of a PRACH time-frequency resource may be determined based on a sequence number of a time domain resource and a sequence number of a frequency domain resource.

With reference to the description about the 5G NR frame structure, it can be learned that the sequence number of the time domain resource may be determined based on a sequence number of a subframe occupied by the PRACH time-frequency resource, a sequence number of a slot (when a plurality of slots are occupied, the sequence number may be a sequence number of a start slot or a sequence number of an end slot) occupied by the PRACH time-frequency resource, or a sequence number of a symbol (when a plurality of symbols are occupied, the sequence number may be a sequence number of a start symbol or a sequence number of an end symbol) occupied by the PRACH time-frequency resource.

For example, an ascending order of sequence numbers of time domain resources may be an ascending order of sequence numbers of subframes occupied by PRACH time-frequency resources, an ascending order of sequence numbers of slots (which may be an ascending order of sequence numbers of start slots or sequence numbers of end slots when a plurality of slots are occupied) occupied by PRACH time-frequency resources, or an ascending order of sequence numbers of symbols (which may be an ascending order of sequence numbers of start symbols or sequence numbers of end symbols when a plurality of symbols are occupied) occupied by PRACH time-frequency resources.

With reference to the description about the 5G NR frame structure, it can be learned that the sequence number of the frequency domain resource may be determined based on a sequence number of an RB occupied by the PRACH time-frequency resource. When a PRACH time-frequency resource occupies a plurality of RBs, a sequence number of the frequency domain resource may be determined based on a sequence number of a start RB or a sequence number of an end RB occupied by the PRACH time-frequency resource.

For example, an ascending order of sequence numbers of frequency domain resources may be an ascending order of sequence numbers of RBs occupied by PRACH time-frequency resources. When PRACH time-frequency resources each occupy a plurality of RBs, an ascending order of sequence numbers of frequency domain resources may be an ascending order of sequence numbers of start RBs or sequence numbers of end RBs occupied by the PRACH time-frequency resources.

Specifically, the sequence number of the PRACH time-frequency resource may be determined first based on the sequence number of the frequency domain resource and then based on the sequence number of the time domain resource. Alternatively, the sequence number of the PRACH time-frequency resource may be determined first based on the sequence number of the time domain resource and then based on the sequence number of the frequency domain resource.

For example, an ascending order of sequence numbers of PRACH time-frequency resources may be first based on an ascending order of sequence numbers of frequency domain resources, and then based on an ascending order of sequence numbers of time domain resources.

Figure 5A:
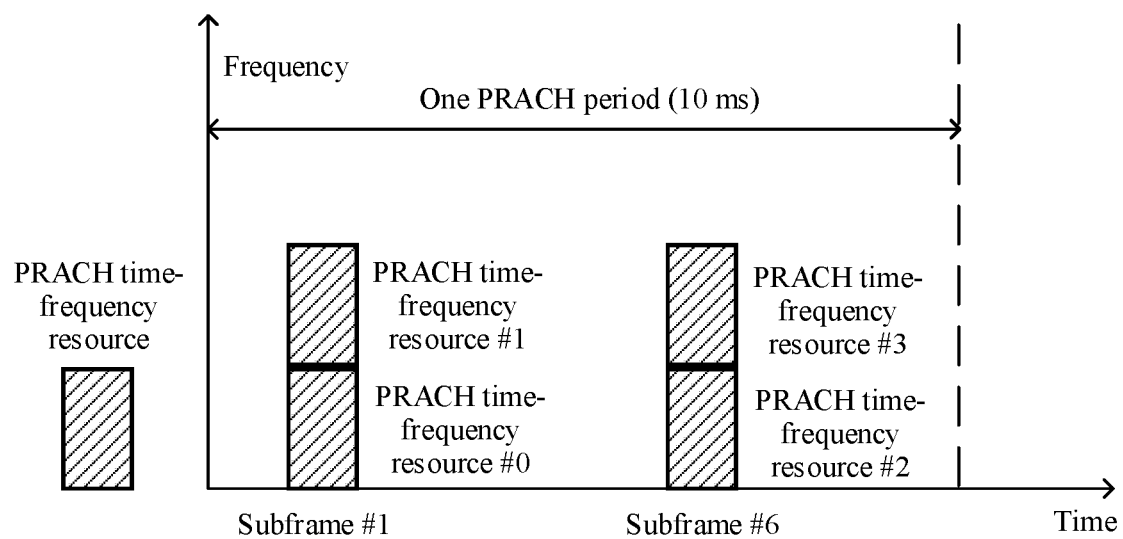
FIG. 5A is a schematic diagram of a PRACH time-frequency resource numbering method according to an embodiment of this application.

For example, referring to FIG. 5A, it is assumed that a subcarrier spacing of a PRACH time-frequency resource is 15 kHz, that is, one subframe includes only one slot: in addition, in one radio frame, four PRACH time-frequency resources are separately configured in a subframe #1 and a subframe #6, and two PRACH time-frequency resources are frequency division multiplexed in each of the subframe #1 and the subframe #6.

If the PRACH time-frequency resources are sorted first in ascending order of sequence numbers of frequency domain resources, and then in ascending order of sequence numbers of time domain resources, the four PRACH time-frequency resources are sorted, starting from the leftmost subframe #1, in ascending order of sequence numbers of start RBs occupied by the PRACH time-frequency resources. To be specific, a PRACH time-frequency resource located in a lower part of a box representing the subframe #1 is a PRACH time-frequency resource #0, a PRACH time-frequency resource located in an upper part of the box representing the subframe #1 is a PRACH time-frequency resource #1, a PRACH time-frequency resource located in a lower part of a box representing the subframe #6 is a PRACH time-frequency resource #2, and a PRACH time-frequency resource located in an upper part of the box representing the subframe #6 is a PRACH time-frequency resource #3.

5. Demodulation Reference Signal (DMRS) Port

The DMRS port may be represented by using an antenna port, that is, different antenna ports correspond to different DMRS configurations. Table 5 shows parameter configuration information corresponding to a PUSCH DMRS configuration type 1. It can be learned from Table 5 that the PUSCH DMRS configuration type 1 may support a maximum of eight antenna ports, that is, may correspond to eight different DMRS configurations, that is, eight DMRS ports. Table 6 shows parameter configuration information corresponding to a PUSCH DMRS configuration type 2. It can be learned from Table 6 that the PUSCH DMRS configuration type 2 may support a maximum of 12 antenna ports, that is, may correspond to 12 different DMRS configurations, that is, 12 DMRS ports.

TABLE 5

| $\tilde{p}$ | CDM group | $\Delta$ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 6

| $\tilde{p}$ | CDM group | Δ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

The term "and/or" in this application describes only an association relationship for describing associated objects and represents that three relationships may exist. For example, A and/or B may represent the following three cases: Only A exists, A and B coexist, and only B exists. In addition, the character "/" in this application generally indicates an "or" relationship between the associated objects.

It should be noted that in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a relative concept in a specific manner.

The technical solutions provided in the embodiments of this application can be applied to various communications systems, for example, a long term evolution (LTE) communications system, a new radio (NR) communications system that uses a 5th generation (5G) communications technology, a future evolved system, or a plurality of convergent communications systems.

The technical solutions provided in the embodiments of this application can be applied to a plurality of communications scenarios, for example, a machine to machine (M2M) scenario, a macro-micro communication scenario, an enhanced mobile broadband (eMBB) scenario, an ultra-reliable and low-latency communications (URLLC) scenario, and a massive machine-type communications (mMTC) scenario. Transmission scenarios to which the technical solutions provided in the embodiments of this application are applied include but are not limited to a semi-persistent scheduling (SPS) scenario, a grant-free scenario, a scheduling-free scenario, a dynamic scheduling-free scenario, a dynamic grant-free scenario, and a higher layer configuration scenario. Communications bodies in these communications scenarios and transmission scenarios may include but are not limited to a communication scenario between communications devices (for example, terminals), network devices (for example, base stations), a network device and a communications device (for example, a base station and a terminal), and the like.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

Figure 2:
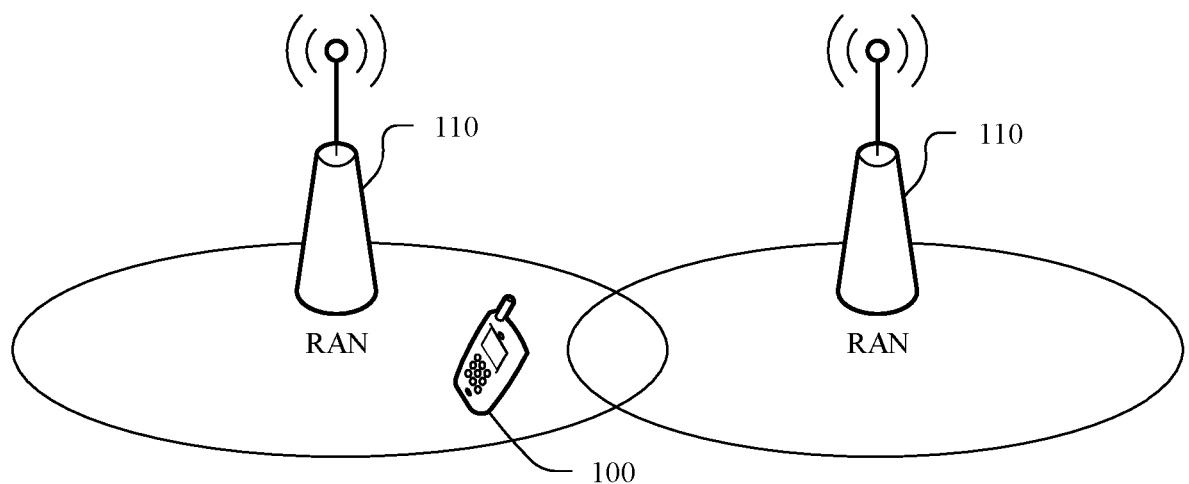
FIG. 2 is a schematic composition diagram of a communications system according to an embodiment of this application.

FIG. 2 is a schematic architectural diagram of a mobile communications system to which an embodiment of this application is applied. As shown in FIG. 2, the mobile communications system includes a terminal 100. The terminal 100 accesses a wireless network, to obtain a service of an external network (for example, the Internet) through the wireless network, or to communicate with another terminal through the wireless network. The wireless network includes a radio access network (RAN) 110. The RAN 110 is configured to connect the terminal 100 to the wireless network. The RAN 110 may include a radio access network device.

The terminal is wirelessly connected to the radio access network device, and may access a core network via the radio access network device. The terminal 100 may be fixed, or may be mobile. FIG. 2 is merely a schematic diagram, and the communications system may further include another network device, for example, may further include a wireless relay device and a wireless backhaul device, which are not shown in FIG. 2. Quantities of radio access network devices and terminals included in the mobile communications system are not limited in the embodiments of this application.

The radio access network device and the terminal may be deployed on land, including an indoor or outdoor device and terminal, a handheld device and terminal, or a vehicle-mounted device and terminal, may be deployed on water, or may be deployed on an airplane, a balloon, and a satellite in the air. Application scenarios of the radio access network device and the terminal are not limited in the embodiments of this application.

The terminal may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal may be a station (STA) in a wireless local area network (WLAN), a cellular phone, a cordless phone, a session initiation protocol (SIP) phone, a wireless local loop (WLL) station, a personal digital processing (PDA) device, a handheld device with a wireless communication function, a computing device or another processing device connected to a wireless modem, a vehicle-mounted device, a wearable device, a terminal device in a next-generation communications system, for example, a 5th generation (5G) communications network, or a terminal device in a future evolved public land mobile network (PLMN). 5G may also be referred to as new radio (NR).

For example, in the embodiments of this application, the terminal may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

The radio access network device may be an access device used by the terminal to access the mobile communication system in a wireless manner. For example, the radio access network device may be a network device. For example, the network device may be an access point (AP) in a WLAN, an evolved NodeB (eNB or eNodeB) in long term evolution (LTE), a gNodeB (next generation Node B, gNB) in NR, a relay station, an access point, a vehicle-mounted device, a wearable device, a network device in a future 5G network, or a network device in a future evolved PLMN network.

In addition, in the embodiments of this application, the network device provides a service in a cell, and the terminal communicates with the network device by using a transmission resource (for example, a frequency domain resource or a time-frequency resource) in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

A random access method and apparatus provided in the embodiments of this application can be applied to a terminal, and the terminal includes a hardware layer, an operating system layer running on the hardware layer, and an application layer running on the operating system layer. The hardware layer includes hardware such as a central processing unit (CPU), a memory management unit (MMU), or a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in the embodiments of this application, a specific structure of an execution body of the random access method is not particularly limited, provided that the random access method in the embodiments of this application can be implemented.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

It may be understood that the random access method in this application may be performed by a terminal, or an apparatus that supports a terminal in implementing the method, for example, an apparatus used in the terminal, for example, a chip system. The random access method may be performed by a network device, or an apparatus that supports a network device in implementing the method, for example, an apparatus used in the network device, for example, a chip system. In the following embodiments, for example, a random access method is performed by a terminal, and a random access method is performed by a network device.

Figure 5B:
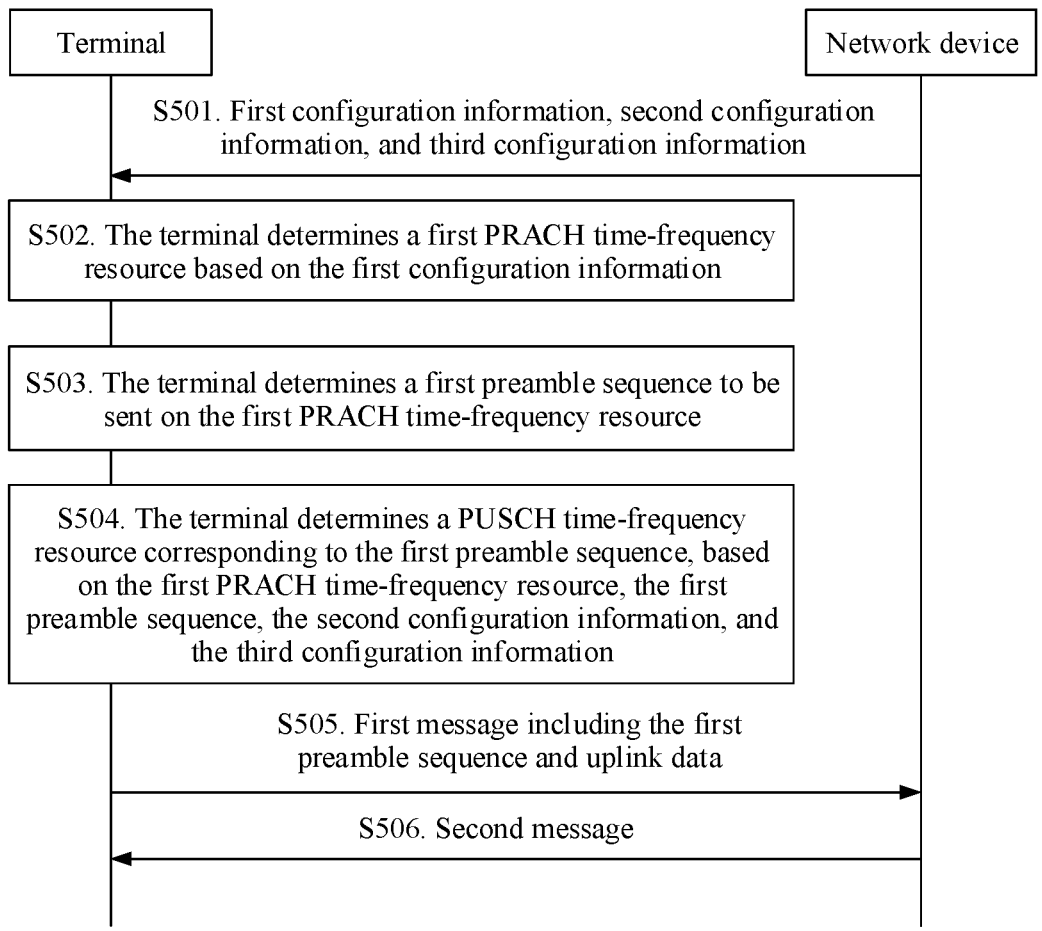
FIG. 5B is a schematic flowchart of a random access method according to an embodiment of this application.

As shown in FIG. 5B, FIG. 5B shows a random access method according to this application. The method includes the following steps.

S501. A terminal receives first configuration information, second configuration information, and third configuration information that are sent by a network device.

The first configuration information is used to configure one or more PRACH time-frequency resources and a preamble sequence set. The preamble sequence set includes one or more preamble sequences. To be specific, the network device configures, for the terminal by using the first configuration information, a PRACH time-frequency resource and a preamble sequence that can be used in a two-step random access procedure.

The second configuration information is used to configure a PUSCH time-frequency resource block corresponding to each PRACH time-frequency resource. The PUSCH time-frequency resource block includes one or more PUSCH time-frequency resources. To be specific, the network device configures a corresponding PUSCH time-frequency resource block for each PRACH time-frequency resource by using the second configuration information, and a PUSCH time-frequency resource in the PUSCH time-frequency resource block may be specifically used by the terminal to send uplink data.

The third configuration information is used to configure a size of each PUSCH time-frequency resource and a correspondence between a preamble sequence and a PUSCH time-frequency resource. To be specific, the network device associates each preamble sequence in each PRACH time-frequency resource with each time-frequency resource in a PUSCH time-frequency resource block by using the third configuration information.

In this way, when selecting any preamble sequence from a PRACH time-frequency resource to send an access preamble, the terminal may determine a PUSCH time-frequency resource corresponding to the preamble sequence, and send uplink data on the corresponding PUSCH time-frequency resource. Similarly, when the network device receives an access preamble sent by the terminal, the network device may determine a PUSCH time-frequency resource corresponding to the access preamble, and then obtain uplink data on the PUSCH time-frequency resource, to complete a random access procedure of the UE and reduce blind detection performed by the network device.

In some embodiments, the network device may send a broadcast message, for example, an RRC message, carrying the first configuration information, the second configuration information, and the third configuration information. The network device may add the first configuration information, the second configuration information, and the third configuration information to one RRC message, or may add some or all information of any one or more of the first configuration information, the second configuration information, and the third configuration information to a plurality of RRC messages. This is not specifically limited in the embodiments of this application.

In some other embodiments, the network device may add the first configuration information, the second configuration information, and the third configuration information to one or more specific messages when the terminal is in an RRC connected state.

Specific content included in the first configuration information, the second configuration information, and the third configuration information is described in detail below; and details are not repeatedly described herein.

S502. The terminal determines a first PRACH time-frequency resource based on the first configuration information.

Because the first configuration information includes the PRACH time-frequency resource that is configured by the network device and that is used for the two-step random access procedure, the terminal may determine, based on the first configuration information, the PRACH time-frequency resource that can be used for the random access procedure, and select the first PRACH time-frequency resource from the PRACH time-frequency resource.

S503. The terminal determines a first preamble sequence to be sent on the first PRACH time-frequency resource.

Because the first configuration information includes a preamble sequence set that is configured by the network device and that is used to send an access preamble on each PRACH time-frequency resource, the terminal may select the first preamble sequence from the first PRACH time-frequency resource based on the first configuration information, to perform the random access procedure.

S504. The terminal determines a PUSCH time-frequency resource corresponding to the first preamble sequence, based on the first PRACH time-frequency resource, the first preamble sequence, the second configuration information, and the third configuration information.

Because the second configuration information includes a correspondence between each PRACH time-frequency resource and a PUSCH time-frequency resource block, the terminal may determine, based on the first PRACH time-frequency resource and the second configuration information, a PUSCH time-frequency resource block corresponding to the first PRACH time-frequency resource. Further, because the third configuration information includes the size of each PUSCH time-frequency resource, a PUSCH time-frequency resource included in the PUSCH time-frequency resource block corresponding to the first PRACH time-frequency resource may be determined. In this case, the PUSCH time-frequency resource corresponding to the first preamble sequence may be determined based on the correspondence that is between a preamble sequence and a PUSCH time-frequency resource and that is in the third configuration information.

Further, the terminal device may determine a PUSCH subcarrier spacing configuration based on a position relationship between the determined first PRACH time-frequency resource and the PUSCH time-frequency resource corresponding to the first PRACH time-frequency resource. A PUSCH subcarrier spacing may be the same as a subcarrier spacing of an uplink BWP in which the PUSCH time-frequency resource is located. In some other embodiments, when a PUSCH frequency domain resource is within a range of a PRACH frequency domain resource, and a PUSCH time-frequency resource and a PRACH time-frequency resource are in one slot, the PUSCH subcarrier spacing may be the same as a PRACH subcarrier spacing. In this way, when processing signals on the PRACH time-frequency resource and the PUSCH time-frequency resource, the network device may process the signals by using one subcarrier spacing in one slot. This helps improve processing efficiency of the network device.

S505. The terminal sends a first message including the first preamble sequence and uplink data.

The random access preamble is carried on the first PRACH time-frequency resource, and the uplink data is carried on the PUSCH time-frequency resource corresponding to the first PRACH time-frequency resource.

It should be noted that, in addition to an MsgA message applied to a two-step random access scenario, the solution of this application may be further applied to another scenario in which a data channel is sent when timing synchronization is not obtained. This is not limited in this application.

S506. The terminal receives a second message sent by the network device.

The second message is a response of the network device to the first preamble sequence and/or the first message, and may include a UE identifier, a random access response, conflict resolution information, TA information, and the like. This is not limited in this application.

It can be learned that the terminal may determine, based on the first configuration information, the second configuration information, and the third configuration information that are configured by the network device, a preamble sequence and a PUSCH time-frequency resource corresponding to the preamble sequence. Therefore, the terminal may directly send the first message including the first preamble sequence and the uplink data, to reduce an uplink data transmission latency. In addition, the network device does not need to send PUSCH time-frequency resource scheduling information to the terminal for each random access of the terminal, to reduce signaling overheads.

The specific content of the first configuration information, the second configuration information, and the third configuration information that are configured by the network device is separately described in detail below:

1. First Configuration Information

The first configuration information may include time domain resource configuration information of a PRACH time-frequency resource and frequency domain resource configuration information of the PRACH time-frequency resource.

In some embodiments of this application, the terminal may use, in the two-step random access procedure, a PRACH time-frequency resource the same as that used in a four-step random access procedure. In an existing system, the network device configures a PRACH time-frequency resource for the four-step random access procedure. Therefore, the network device does not need to additionally configure a PRACH time-frequency resource for the two-step random access procedure. In this case, the first configuration information may be understood as configuration information of the PRACH time-frequency resource configured by the network device for the four-step random access procedure. For a specific method for configuring the PRACH time-frequency resource in the four-step random access method, refer to the foregoing description. Simply, the network device may send an RRC message to the terminal, and an IE in the RRC message carries the first configuration information. For example, the first configuration information may include a parameter prach-ConfigurationIndex, a parameter Msg 1-Frequency Start, and a parameter Msg1-FDM.

In some other embodiments of this application, the network device separately configures a PRACH time-frequency resource for Msg A in the two-step random access procedure. A method for configuring the PRACH time-frequency resource by the network device for Msg A is the same as a method for configuring a PRACH time-frequency resource by the network device for Msg 1 in an existing system. In other words, the network device separately configures PRACH time-frequency resources for the four-step random access procedure and the two-step random access procedure. For example, the network device may separately configure, by using two different IEs (field names of the IEs are different) in RRC, a PRACH time-frequency resource corresponding to Msg1 and a PRACH time-frequency resource corresponding to MsgA. In this case, the first configuration information includes configuration information used by the network device to configure the PRACH time-frequency resource for MsgA. For example, the first configuration information may include a parameter prach-ConfigurationIndex, a parameter Msg A-Frequency Start, and a parameter MsgA-FDM. The parameter prach-ConfigurationIndex is used to indicate a time domain resource corresponding to the PRACH time-frequency resource corresponding to MsgA. The parameter Msg A-FrequencyStart is used to indicate a start position of a frequency domain resource corresponding to the PRACH time-frequency resource. The parameter MsgA-FDM is used to indicate a quantity of PRACH time-frequency resources that are frequency division multiplexed in a same time domain resource.

In addition, when the network device separately configures the PRACH time-frequency resource for Msg A in the two-step random access procedure, the network device may further separately configure a subcarrier spacing for a PRACH in the two-step random access procedure. The subcarrier spacing configured for the PRACH in the two-step random access procedure may be the same as or may be different from the PRACH subcarrier spacing in the four-step random access procedure. Optionally, when the network device does not separately configure a subcarrier spacing for a PRACH in the two-step random access procedure, the network device may use, for a PRACH in the two-step random access procedure by default, a subcarrier spacing the same as that used for a PRACH in the four-step random access procedure.

It should be noted that, to avoid confusion, caused by using a same frequency domain resource sequence number for a PRACH time-frequency resource in the two-step random access procedure and a PRACH time-frequency resource in the four-step random access procedure on a same time-frequency resource (including a case in which a start symbol of a time domain resource of a PRACH time-frequency resource is the same as a slot in which the PRACH time-frequency resource is located), in calculating RA-RNTIs corresponding to the PRACH time-frequency resources, in this application, on a same time-frequency resource, a smallest frequency domain resource sequence number of PRACH time-frequency resources in the two-step random access procedure may be set to be equal to a quantity of PRACH time-frequency resources in the four-step random access procedure, and the PRACH time-frequency resources are numbered in ascending order of sequence numbers of frequency domain resources of the PRACH time-frequency resources in the two-step random access procedure. To be specific, frequency domain resources of the PRACH time-frequency resources in the four-step random access procedure are first numbered, and frequency domain resources of the PRACH time-frequency resources in the two-step random access procedure are then numbered.

Figure 5C:
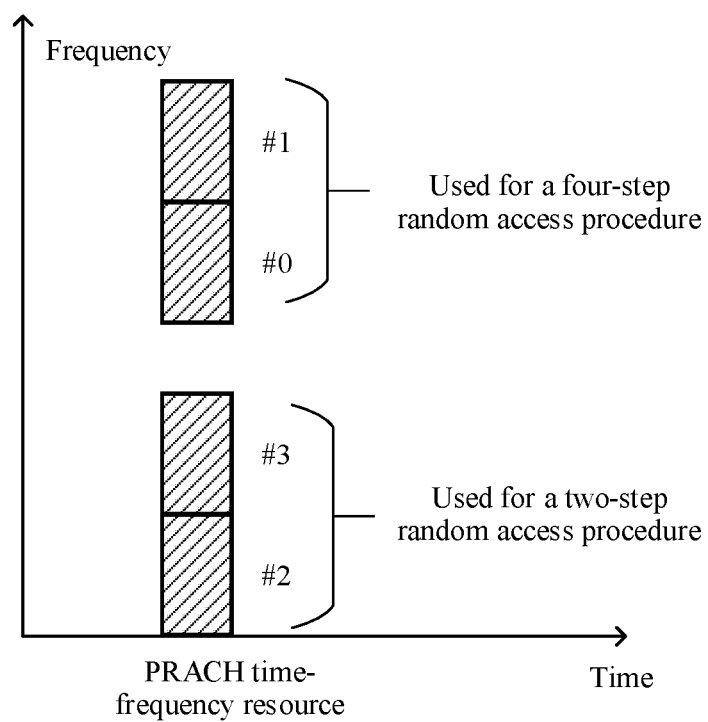
FIG. 5C is a schematic diagram of a frequency domain resource numbering method according to an embodiment of this application.

For example, it is assumed that PRACH time-frequency resources configured by the network device for Msg1 in the four-step random access procedure and PRACH time domain resources configured for MsgA in the two-step random access procedure are shown in FIG. 5C, where a quantity of the PRACH time-frequency resources configured for Msg1 in the four-step random access procedure is 2. In this case, when frequency domain resources of the PRACH time-frequency resources configured for MsgA in the two-step random access procedure are numbered, a smallest sequence number of the frequency domain resources is set to 2.

It should be further noted that, when the network device separately configures the PRACH time-frequency resource for Msg A in the two-step random access procedure, some parameters may be configured, and a parameter (or a default parameter) that is not configured may be considered, by default, to be the same as a corresponding parameter configured when the PRACH time-frequency resource is configured for Msg1 in the four-step random access procedure. For example, the network device configures the frequency division multiplexing parameter MsgA-FDM for the two-step random access procedure, but does not configure prach-ConfigurationIndex and the frequency domain resource start position Msg A-Frequency Start. In this case, it may be considered that the time domain resource configuration prach-ConfigurationIndex and the frequency domain resource start position Msg 1-Frequency Start in the four-step random access procedure may also be used in the two-step random access procedure, but different frequency domain resources are used in the two procedures. In some embodiments, there are a total of MsgA-FDM PRACH time-frequency resources on a time domain resource indicated by prach-ConfigurationIndex and at a frequency domain resource start position indicated by Msg 1-Frequency Start, where the first Msg1-FDM PRACH time-frequency resources are used for four-step random access, and remaining MsgA-FDM minus Msg1-FDM PRACH time-frequency resources are used for two-step random access. In this way, on a same time domain resource, frequency domain resources used in the four-step random access procedure and the two-step random access procedure are different, and sequence numbers of the frequency domain resources are also different. This helps subsequently calculate RA-RNTIs corresponding to the PRACH time-frequency resources.

Figure 5D:
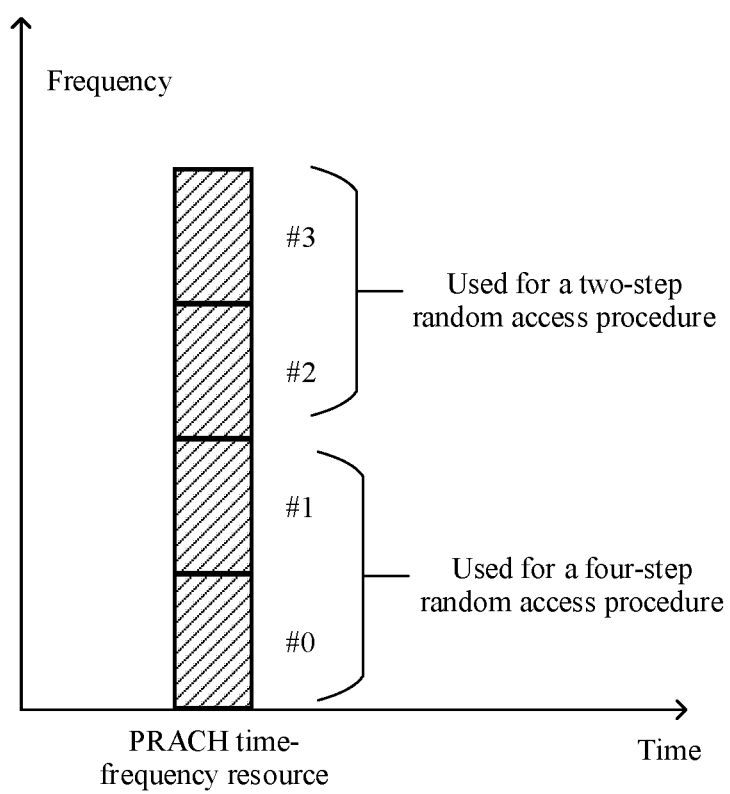
FIG. 5D is a schematic diagram of a method for configuring a PRACH time-frequency resource in a two-step random access procedure according to an embodiment of this application.

For example, as shown in FIG. 5D, it is assumed that the network device configures a time domain resource and a frequency domain resource of a PRACH time-frequency resource for Msg1, where Msg1-FDM=2, and configures only MsgA-FDM=4 for MsgA. Therefore, prach-ConfigurationIndex and Msg1-FrequencyStart for Msg1 may be used for MsgA by default. On a frequency domain resource, the first two PRACH time-frequency resources are used for four-step random access, and the last two PRACH time-frequency resources are used for two-step random access.

It may be understood that a PRACH time-frequency resource configured by the network device for the four-step random access procedure may be the same as or different from a PRACH time-frequency resource configured by the network device for the two-step random access procedure. In other words, a PRACH time-frequency resource corresponding to the four-step random access procedure may not overlap with or may completely or partially overlap with a PRACH time-frequency resource corresponding to the two-step random access procedure.

It should be noted that, if PRACH time-frequency resources corresponding to the two random access procedures overlap, after receiving a preamble sequence sent by the terminal, the network device may perform blind detection in a position of a PUSCH resource corresponding to the preamble sequence (that is, a PUSCH resource corresponding to the preamble sequence used when the two-step random access procedure provided in this embodiment of this application is used). If uplink data is detected in the position of the PUSCH resource, the network device considers that this is a two-step random access procedure; otherwise, the network device considers that this is a four-step random access procedure. It should be noted that, in the embodiments of this application, when PRACH time-frequency resources corresponding to the two random access procedures overlap, a method for distinguishing the two random access procedures by the network device is not specifically limited.

In some other embodiments of this application, the network device may select, from a random access preamble sequence set corresponding to each PRACH time-frequency resource configured for random access in an existing system, a preamble sequence subset as a PRACH random access preamble in the two-step random access procedure, where a remaining preamble sequence is used as a PRACH random access preamble in the four-step random access procedure.

For example, a PRACH time-frequency resource includes a plurality of preamble sequences, where M preamble sequences are used for random access, and each PRACH time-frequency resource corresponds to N synchronization signal blocks (SSB). The network device configures R preamble sequences, in a random access preamble sequence set that corresponds to each SSB and that is on each PRACH time-frequency resource, as PRACH random access preambles used in a contention-based random access procedure. When N<1, each SSB corresponds to an $N^{th}$ of a PRACH time-frequency resource. In this case, on each PRACH time-frequency resource corresponding to an SSB #0, R consecutive preamble sequences starting from a preamble sequence index #0 are used as random access preambles that are in contention-based random access and that correspond to the SSB #0. When N≥1, N SSBs correspond to one PRACH time-frequency resource. In this case, on the PRACH time-frequency resource, R consecutive preamble sequences starting from a preamble index #(n*M/N) are used as random access preambles that are in the contention-based random access and that correspond to an SSB #n. M is configured by using a higher-layer parameter totalNumberOfRA-Preambles, and N and R are configured by using a higher-layer parameter ssb-perRACH-OccasionAndCB-PreamblesPerSSB.

Therefore, the network device may select, from the foregoing random access preamble sequence set that is configured for the contention-based random access and that corresponds to each SSB on each PRACH time-frequency resource, Q preamble sequences as random access preambles used in the contention-based two-step random access procedure. This is because there is a mapping relationship between an SSB and a preamble. Before selecting a preamble, the UE needs to detect reference signal received power (RSRP) of each SSB, select an SSB from SSBs whose RSRP is greater than a threshold, and then select a preamble from a preamble set corresponding to the SSB and send the preamble. Therefore, dividing a preamble set mapped to a same SSB into subsets can ensure that when selecting any SSB, the UE can find a corresponding preamble for two-step access.

Optionally, the network device may select first Q preambles or last Q preambles from the random access preamble sequence set that is configured for the contention-based random access and that corresponds to each SSB on each PRACH time-frequency resource as PRACH time-frequency resources in the two-step random access procedure.

When the network device selects the first Q preambles as the PRACH time-frequency resources in the contention-based two-step random access procedure: When N<1, each SSB corresponds to an $N^{th}$ of a PRACH time-frequency resource. In this case, Q consecutive preamble sequences starting from a preamble index #0 on each PRACH time-frequency resource corresponding to an SSB #0 are used as random access preambles that are in contention-based two-step random access and that correspond to the SSB #0. When N≥1 N SSBs correspond to one PRACH time-frequency resource. In this case, on the PRACH time-frequency resource. Q consecutive preamble sequences starting from a preamble index #(n*M/N) are used as random access preambles that are in the contention-based two-step random access and that correspond to an SSB #n. In this case, in addition to the parameter used when the network device configures the PRACH time-frequency resource for the random access procedure, the first configuration information may further include a parameter Q, a parameter M, a parameter N, and a parameter R. The parameter Q may be used to indicate the network device to select first several preambles from a PRACH resource configured for the contention-based random access procedure as PRACH time-frequency resources in the contention-based two-step random access procedure. The parameter M is configured by using a higher-layer parameter totalNumberOfRA-Preambles, and the parameter N and the parameter R are configured by using a higher-layer parameter ssb-perRACH-OccasionAndCB-PreamblesPerSSB.

When the network device selects the last Q preambles as the PRACH time-frequency resources in the two-step random access procedure: When N<1, each SSB corresponds to an $N^{th}$ of a PRACH time-frequency resource. In this case, Q consecutive preamble sequences starting from a preamble index #(R−Q+1) on each PRACH time-frequency resource corresponding to an SSB #0 are used as random access preambles that are in contention-based two-step random access and that correspond to the SSB #0. When N≥1 N SSBs correspond to one PRACH time-frequency resource. In this case, on the PRACH time-frequency resource, Q consecutive preamble sequences starting from a preamble index #(n*M/N+R−Q+1) are used as random access preambles that are in the contention-based two-step random access and that correspond to an SSB #n. In this case, in addition to the parameter used when the network device configures the PRACH time-frequency resource for the random access procedure, the first configuration information may further include a parameter Q, a parameter M, a parameter N, and a parameter R. The parameter Q may be used to indicate the network device to select last several preambles from a PRACH resource configured for the contention-based random access procedure as PRACH time-frequency resources in the contention-based two-step random access procedure. The parameter M is configured by using a higher-layer parameter totalNumberOfRA-Preambles, and the parameter N and the parameter R are configured by using a higher-layer parameter ssb-perRACH-OccasionAndCB-PreamblesPerSSB.

Optionally, the network device may select Q preambles in the middle from the random access preamble sequence set that is configured for the random access and that corresponds to each SSB on each PRACH time-frequency resource as PRACH time-frequency resources in the two-step random access procedure. When N<1, each SSB corresponds to an $N^{th}$ of a PRACH time-frequency resource. In this case, R consecutive preamble sequences starting from a preamble index #0 on each PRACH time-frequency resource corresponding to an SSB #0 are used as random access preambles that are in contention-based four-step random access and that correspond to the SSB #0, and Q consecutive preamble sequences starting from a preamble index #R are used as random access preambles that are in two-step random access and that correspond to the SSB #0. When N≥1, N SSBs correspond to one PRACH time-frequency resource. In this case, on the PRACH time-frequency resource, R consecutive preamble sequences starting from a preamble index #(n*M/N) are used as random access preambles that are in the contention-based four-step random access and that correspond to an SSB #n, and Q consecutive preamble sequences starting from a preamble index #(n*M/N+R) are used as random access preambles that are in the contention-based four-step random access and that correspond to the SSB #n. In this case, in addition to the parameter used when the network device configures the PRACH time-frequency resource for the random access procedure, the first configuration information may further include a parameter Q, a parameter M, a parameter N, and a parameter R. The parameter Q may be used to indicate the network device to select a specific preamble from a PRACH resource configured for the random access procedure as a PRACH time-frequency resource in the contention-based two-step random access procedure. The parameter M is configured by using a higher-layer parameter totalNumberOfRA-Preambles, and the parameter N and the parameter R are configured by using a higher-layer parameter ssb-perRACH-OccasionAndCB-PreamblesPerSSB.

The first configuration information may further include information about a preamble sequence set on a configured PRACH time-frequency resource. For example, the first configuration information includes a quantity of preamble sequences included in each PRACH time-frequency resource.

For example, if the PRACH time-frequency resource used in the two-step random access procedure is the same as that used in the four-step random access procedure, a quantity of preamble sequences included in each PRACH time-frequency resource may be determined by a higher-layer parameter totalNumberOfRA-Preambles. In this case, the preamble sequence set is first totalNumberOfRA-Preambles preamble sequences in each PRACH time-frequency resource block. When the PRACH time-frequency resource used in the two-step random access procedure is the same as that used in the four-step random access procedure, a quantity of preamble sequences included in each PRACH time-frequency resource may be determined by a higher-layer parameter totalNumberOfRA-Preambles. In this case, the preamble sequence set is first totalNumberOfRA-Preambles preamble sequences in each PRACH time-frequency resource.

If the network device separately configures a PRACH time-frequency resource for the two-step random access procedure, the first configuration information may include a quantity U of preamble sequences included in each PRACH time-frequency resource. In this case, the preamble sequence set is first U preamble sequences in each PRACH time-frequency resource.

If the network device selects a subset from a PRACH time-frequency resource used in the four-step random access procedure, it can be learned from the foregoing description that the preamble sequence set includes Q preamble sequences. That is, the preamble sequence set is first Q or last Q preamble sequences in each PRACH time-frequency resource.

2. Second Configuration Information

In some embodiments, a mapping relationship between each PRACH time-frequency resource and a PUSCH time-frequency resource block is established based on the second configuration information.

In some other embodiments, a mapping relationship between each PRACH time-frequency resource and a PUSCH time-frequency resource block is first established based on the second configuration information, and then one or more PRACH time-frequency resources form a PRACH time-frequency resource group according to a predefined rule. Since a mapping relationship has been established between each PRACH time-frequency resource in each PRACH time-frequency resource group and a PUSCH time-frequency resource block, a mapping relationship is also established between each PRACH time-frequency resource group and the PUSCH time-frequency resource block.

In some other embodiments, one or more PRACH time-frequency resources first form a PRACH time-frequency resource group based on the second configuration information, and then the PRACH time-frequency resource group is mapped to a corresponding PUSCH time-frequency resource block.

In the embodiments of this application, two methods for configuring a PUSCH time-frequency resource block that corresponds to each PRACH time-frequency resource and that is used for uplink transmission are listed as examples. Various possible implementations of the two methods are described in detail below with reference to the accompanying drawings.

First method: The network device may determine, by configuring a first mapping pattern, a PUSCH time-frequency resource block used for uplink transmission, and a correspondence between each PRACH time-frequency resource and the PUSCH time-frequency resource block used for uplink transmission.

Considering that the PRACH time-frequency resource configured by the network device for the two-step random access procedure has periodicity (that is, a PRACH period), the first mapping pattern configured by the network device may also have periodicity (that is, a mapping period). In the embodiments of this application, the network device may configure a period T1 of the first mapping pattern, which may also be understood as the mapping period, that is, a period in which the PUSCH resource block is configured by using the first mapping pattern. That is, the second configuration information may include the period T1. The period T1 may be the same as the PRACH period, or may be an integer multiple of the PRACH period. This is not specifically limited in the embodiments of this application.

It should be noted that if the network device does not configure the period of the first mapping pattern, that is, does not configure the mapping period, the mapping period may be the PRACH period by default.

In addition, a start position of the mapping period may be the same as or different from a start position of the PRACH period. When the start position of the mapping period is different from that of the PRACH period, there is a time domain offset between the start position of the mapping period and the start position of the PRACH period. A specific value of the time domain offset may be configured by the network device, or may be predefined.

Figure 5E:
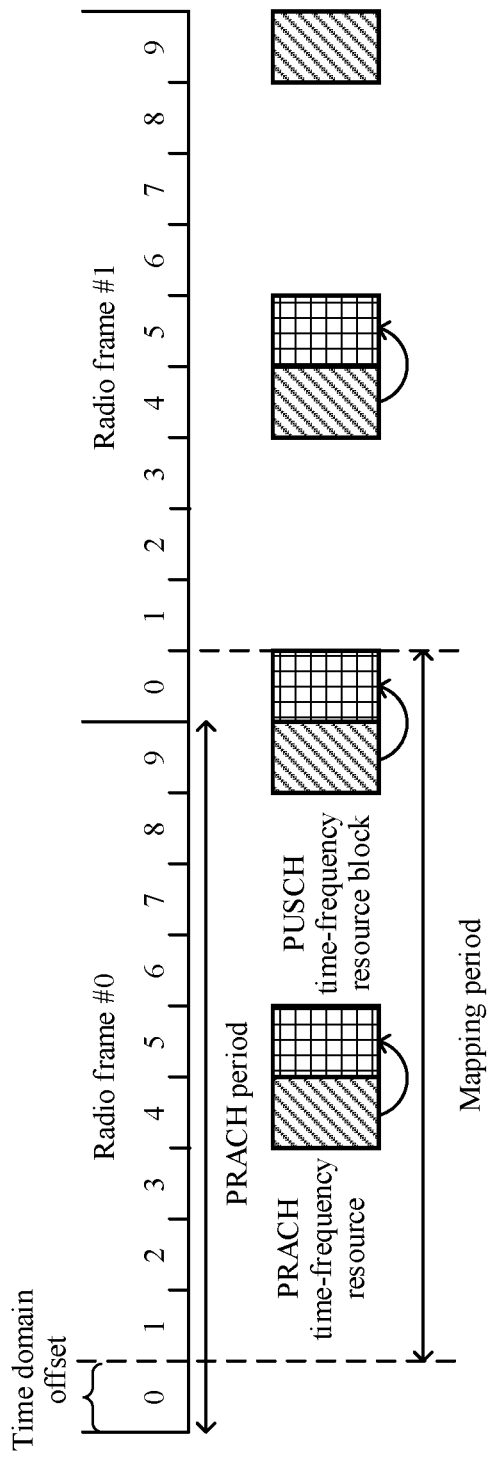
FIG. 5E is a schematic diagram of a mapping period configuration method according to an embodiment of this application.

As shown in FIG. 5E, an example in which one PRACH period is one radio frame is used for description. The time domain offset between the mapping period and the PRACH period is one slot. FIG. 5E further shows PRACH time-frequency resources in a PRACH period and PUSCH time-frequency resource blocks mapped to the PRACH time-frequency resources. It can be learned that a PRACH time-frequency resource in the last slot in the PRACH period and a PUSCH time-frequency resource block to which the PRACH time-frequency resource is mapped may be located in a same mapping period.

It should be noted that, when the time domain offset is not predefined, and the network device does not configure the time domain offset, the time domain offset may be zero by default.

Specifically, the second configuration information includes information about the first mapping image. The first mapping pattern is used to determine a time domain resource and a frequency domain resource of at least one PUSCH time-frequency resource block. The first mapping pattern is a mapping rule included in one mapping period (that is, the period T1). The mapping rule herein includes time domain resource configuration information and frequency domain resource configuration information, and therefore may also be referred to as a mapping 2-tuple. In other words, the first mapping pattern may include one or more mapping 2-tuples. Each time of mapping in a mapping 2-tuple may be used to determine a time-frequency resource and a frequency domain resource of one PUSCH time-frequency resource block. In other words, one mapping 2-tuple includes time-frequency resource configuration information and frequency domain resource configuration information of one PUSCH time-frequency resource block. For example, a mapping 2-tuple may be represented as ($\{K, S, L\}, \{RB_{start}, L_{RBs}\}$). An expression form of the mapping 2-tuple is not limited in the embodiments of this application.

It may be understood that, alternatively, one mapping 2-tuple may include only time domain resource configuration information of one PUSCH time-frequency resource block. In this case, a frequency domain resource of the PUSCH time-frequency resource block may be the same as or may have a preset relationship with a frequency domain resource of the PRACH time-frequency resource, or may be a default frequency domain resource. Similarly, alternatively, one mapping 2-tuple may include only frequency domain resource configuration information of one PUSCH time-frequency resource block. In this case, a time domain resource of the PUSCH time-frequency resource block may be the same as or may have a preset relationship with a time domain resource of the PRACH time-frequency resource, or may be a default time domain resource. This is not limited in the embodiments of this application.

1. A Mapping 2-Tuple is Used to Configure a Time-Frequency Resource of a PUSCH Time-Frequency Resource Block.

For example, time-frequency resource configuration information of the PUSCH time-frequency resource block may include a time offset relative to a PRACH time-frequency resource and a length of a time domain resource of each PUSCH time-frequency resource block. In a specific implementation, the time offset relative to the PRACH time-frequency resource may be a difference K between a sequence number of a slot in which the first symbol of the PUSCH time-frequency resource block is located and a sequence number of the first slot (or a sequence number of the last slot) occupied by the corresponding PRACH time-frequency resource, and a sequence number S of a start symbol of the PUSCH time-frequency resource block in a start slot of the PUSCH time-frequency resource block. The length of the time domain resource of each PUSCH time-frequency resource block may be a quantity L of consecutive symbols occupied by the PUSCH time-frequency resource block. A value of K may be a positive number, a negative number, or zero.

Whether a time domain resource configuration of the PUSCH time-frequency resource block uses the first slot occupied by the PRACH time-frequency resource as a reference or uses the last slot occupied by the PRACH time-frequency resource as a reference is predefined in a standard, may be agreed upon by the network device and the UE in advance, or may be notified by the network device to the UE by using indication information. The indication information may be higher layer signaling, for example, an RRC message, or may be layer 1 or layer 2 indication signaling, for example, media access control (MAC)-control element (CE) signaling or downlink control information (DCI).

For example, a table including a relationship between K, L, and S may be predefined in the standard, as shown in Table 7. In this case, the time domain resource configuration information that is of the PUSCH time-frequency resource block and that is sent by the network device to the terminal may be specifically a row index in Table 7. After receiving the row index, the terminal may search, based on Table 7, for values of K, S, and L corresponding to the row index, to determine a time domain resource of the PUSCH time-frequency resource block. It should be noted that values in Table 7 are merely examples, and K, S, and L may alternatively have other values. This is specially described.

TABLE 7

| Row index | K | S | L |
|---|---|---|---|
| 1 | −2 | 0 | 14 |
| 2 | −2 | 2 | 12 |
| 3 | −2 | 4 | 10 |
| 4 | −1 | 0 | 14 |
| 5 | −1 | 2 | 12 |
| 6 | −1 | 4 | 10 |
| 7 | 0 | 0 | 4 |
| 8 | 0 | 4 | 4 |
| 9 | 0 | 8 | 4 |
| 10 | 1 | 0 | 14 |
| 11 | 1 | 2 | 12 |
| 12 | 1 | 4 | 10 |
| 13 | 2 | 0 | 14 |
| 14 | 2 | 2 | 12 |
| 15 | 2 | 4 | 10 |
| ... | ... | ... | ... |

For another example, when the network device sends the time domain resource configuration information of the PUSCH time-frequency resource block to the UE, at least two parameters K and startSymbolAndLength may be included in an RRC information element. The UE may calculate values of S and L based on a value of K and the parameter startSymbolAndLength according to the following rule:

if (L−1)≤7 then
startSymbolAndLength=14·(L−1)+S
else
startSymbolAndLength=14·(14−L+1)+(14−1−S)

For another example, when the network device sends the time domain resource configuration information of the PUSCH time-frequency resource block to the UE, at least three parameters K, S and L may be included in an RRC information element.

For another example, when the network device sends the time domain resource configuration information of the PUSCH time-frequency resource block to the UE, at least one or more of three parameters K, S and L may be included in an RRC information element. For example, if the RRC information element includes only S and L, it may be considered by default that the first symbol of the PUSCH time-frequency resource block is located in the first available slot following a time domain resource occupied by the PRACH time-frequency resource.

Then, the UE side obtains the time domain resource configuration information K, S, and L of the PUSCH time-frequency resource block, and may determine a sequence number of the start slot of the PUSCH time-frequency resource block, the sequence number of the start symbol of the PUSCH time-frequency resource block, and a length of symbols occupied by the PUSCH time-frequency resource block, that is, may determine the time domain resource corresponding to the PUSCH time-frequency resource block.

The determined start slot of the PUSCH time-frequency resource block is (n×θ)+K, where n is the sequence number of the first slot (or the sequence number of the last slot) occupied by the PRACH time-frequency resource, and herein, a sequence number of a PRACH slot is calculated based on a subcarrier spacing assumed based on a frequency range. θ is a parameter calculated based on a PUSCH subcarrier spacing and a subcarrier spacing assumed when the PRACH slot is numbered. According to the description about a slot number in a PRACH time-frequency resource configuration in 3GPP TS 38.211 V15.3.0, when a spectrum range is FR1 (Frequency range 1), a subcarrier spacing assumed for the slot number in the PRACH time-frequency resource configuration is 15 kHz, and when the spectrum range is FR2, a subcarrier spacing assumed for the slot number in the PRACH time-frequency resource configuration is 60 KHz.

For example, the network device may preconfigure a table of correspondences between different PUSCH subcarrier spacings and values of θ. As shown in Table 8, the UE may obtain a value of θ by looking up the table. $\mu_{msgAPUSCH}$ is a subcarrier spacing of a PUSCH resource.

TABLE 8

| $\mu_{msgAPUSCH}$ | θ for FR1 | θ for FR2 |
|---|---|---|
| 0 | 1 | 0.25 |
| 1 | 2 | 0.5 |
| 2 | 4 | 1 |
| 3 | 8 | 2 |
| 4 | 16 | 4 |

For another example, the UE may alternatively obtain a value of θ through calculation according to formula (1).

$$\theta = \begin{cases} 2^{\mu_{msgAPUSCH}}, & \text{for } FR1 \\ \frac{2^{\mu_{msgAPUSCH}}}{4}, & \text{for } FR2 \end{cases} \quad (1)$$

If the sequence number of the PRACH slot is calculated based on the PUSCH subcarrier spacing, the determined start slot of the PUSCH time-frequency resource block is n+K.

2. A Mapping 2-Tuple is Used to Configure a Frequency Domain Resource of a PUSCH Time-Frequency Resource Block.

In some embodiments of this application, when configuring a frequency domain resource of a PUSCH time-frequency resource block, the network device may first configure a range of available frequency domain resources of the PUSCH time-frequency resource block. For example, the range of available frequency domain resources of the PUSCH time-frequency resource block may be configured in a frequency domain resource range of an uplink BWP, a frequency domain resource range of a PRACH time-frequency resource associated with the PUSCH time-frequency resource block, or a frequency domain resource range of a PRACH time-frequency resource group associated with the PUSCH time-frequency resource block. Optionally, the range of available PUSCH frequency domain resources may be predefined. This is not limited in the embodiments of this application.

It may be understood that a size of the configured range of available PUSCH frequency domain resources may affect a length of PUSCH frequency domain resource configuration information. When the range of available PUSCH frequency domain resources is relatively large, a length of configuration information that needs to be used to determine a PUSCH frequency domain resource in the relatively large range is relatively large. When the range of available PUSCH frequency domain resources is relatively small, a length of configuration information that needs to be used to determine a PUSCH frequency domain resource in the relatively small range is relatively small. Specifically, when a quantity of RBs in the range of available PUSCH frequency domain resources is Y, there are a total of (Y*(Y+1))/2 different combinations of quantities of start resource blocks and consecutive resource blocks. Frequency domain resource configuration information of $\log_2((Y*(Y+1)/2)$ bits is required, and is used to specify one of the foregoing possible combinations. For example, when there are 6 RBs in the available range, there are a total of 21 combinations of frequency domain resources that may be indicated by frequency domain configuration information. In this case, at least 5-bit configuration information is required. When there are 2 RBs in the available range, there are a total of three combinations of frequency domain resources that may be indicated by frequency domain configuration information. In this case, at least 2-bit frequency domain configuration information is required. It can be learned by comparing the required quantities of bits of the frequency domain configuration information used when the available range is 6 RBs and 2 RBs that, when the available range is relatively large, a length of the required PUSCH frequency domain resource configuration information is relatively large, and when the available range is relatively small, a length of the required PUSCH frequency domain resource configuration information is relatively small.

Optionally, when ranges of available PUSCH frequency domain resources are different, different explanations are subsequently provided for same frequency domain resource configuration information. For example, when the range of available PUSCH frequency domain resources is configured in the frequency domain resource range of an uplink BWP, a start resource block (RB) sequence number $RB_{start}$ in the frequency domain resource configuration information may be explained as starting from the first RB in a current active uplink bandwidth part (BWP). The current active BWP may be an initial BWP. For another example, when the range of available PUSCH frequency domain resources is configured in the frequency domain resource range of the PRACH time-frequency resource associated with the PUSCH time-frequency resource block. $RB_{start}$ in the frequency domain resource configuration information may be explained as starting from the first RB in the PRACH time-frequency resource associated with the PUSCH time-frequency resource block.

It should be noted that, when the network device does not configure a range of available PUSCH time-frequency resource blocks, the range of available PUSCH time-frequency resource blocks may be considered by default as within the frequency domain resource range of the uplink BWP. That the range of available PUSCH frequency domain resource blocks is within the frequency domain resource range of the uplink BWP is used as an example for description below:

In some embodiments of this application, frequency domain resource configuration information of the PUSCH time-frequency resource block includes a start resource block (RB) sequence number $RB_{start}$ of the PUSCH time-frequency resource block and a quantity $L_{RBs}$ of consecutive RBs occupied by the PUSCH time-frequency resource block. A start RB is numbered starting from the first RB in a current active uplink bandwidth part (BWP). The current active BWP may be an initial BWP. The PUSCH time-frequency resource block and the PRACH time-frequency resource may be located in a same BWP, or may be located in different BWPs.

For example, a possible implementation in which the network device configures $RB_{start}$ and $L_{RBs}$ is as follows: The network device includes at least a parameter startR-BAndLength in an RRC information element.

The UE may calculate $RB_{start}$ and $L_{RBs}$ according to the following rule:
if $(L_{RBs}-1) \leq \lfloor N_{BWP}^{size}/2 \rfloor$ then
$RIV = N_{BWP}^{size}(L_{RBs}-1) + RB_{start}$
else
$RIV = N_{BWP}^{size}(N_{BWP}^{size} - L_{RBs} + 1) + (N_{BWP}^{size} - 1 - RB_{start})$
$N_{BWP}^{size}$ represents a quantity of RBs included in the current active BWP.

For another example, another possible implementation in which the network device configures $RB_{start}$ and $L_{RBs}$ is as follows: The network device includes at least the parameters $RB_{start}$ and $L_{RBs}$ in an RRC information element.

In some other embodiments of this application, frequency domain resource configuration information of the PUSCH time-frequency resource block includes an offset $RB_{offset}$ between a sequence number of a start RB of the PUSCH time-frequency resource block and a sequence number of a start RB of the PRACH time-frequency resource, and a quantity $L_{RBs}$ of consecutive RBs occupied by the PUSCH time-frequency resource block. In this case, the UE may calculate the sequence number of the start RB of the PUSCH time-frequency resource block based on the sequence number of the start RB of the PRACH time-frequency resource and $RB_{offset}$. To be specific, the sequence number of the frequency domain start RB of the PUSCH time-frequency resource block=msgAprach-Frequency Start+$RB_{offset}$. Then, a position of a frequency domain resource of the PUSCH time-frequency resource block may be determined based on $L_{RBs}$.

In a possible implementation of the first method, the second configuration information may further include a parameter $N_1$, and the parameter $N_1$ is used to determine a quantity of PUSCH time-frequency resource blocks corresponding to each PRACH time-frequency resource. In other words, each PRACH time-frequency resource corresponds to $N_1$ PUSCH time-frequency resource blocks.

In this implementation, the network device determines a position and a size of the PUSCH time-frequency resource block based on the configured parameter $N_1$ and a preset order of mapping from PRACH time-frequency resources to PUSCH time-frequency resource blocks, and determines a mapping relationship between a PRACH time-frequency resource and a PUSCH time-frequency resource block. Then, the network device determines a PRACH time-frequency resource group according to a predefined rule, and determines a PUSCH time-frequency resource block corresponding to each PRACH time-frequency resource group, to perform further mapping between a preamble in the PRACH time-frequency resource group and a time-frequency resource in the PUSCH time-frequency resource block subsequently based on the third configuration information.

The predefined rule for determining the PRACH time-frequency resource group may be by default that each PRACH time-frequency resource is a PRACH time-frequency resource group, that is, PRACH time-frequency resources are mapped to PUSCH time-frequency resource blocks. Alternatively. PRACH time-frequency resources located on a same PRACH time domain resource may form one PRACH time-frequency resource group, or PRACH time-frequency resources located in a same slot may form one PRACH time-frequency resource group. Alternatively. PRACH time-frequency resources located in a plurality of consecutive slots in time domain may form one PRACH time-frequency resource group. Alternatively. PRACH time-frequency resources that use a same mapping 2-tuple may form one PRACH time-frequency resource group. The predefined rule for determining the PRACH time-frequency resource group is not specifically limited in the embodiments of this application.

It can be learned from the foregoing descriptions of the mapping 2-tuple that, when each PRACH time-frequency resource is mapped by using one mapping 2-tuple, one PUSCH time-frequency resource block is obtained. In this case, that each PRACH time-frequency resource corresponds to $N_1$ PUSCH time-frequency resource blocks may also be understood as that each PRACH time-frequency resource is mapped by using $N_1$ mapping 2-tuples. Therefore, $N_1$ PUSCH time-frequency resource blocks corresponding to the PRACH time-frequency resource are obtained. In the embodiments of this application, the PUSCH time-frequency resource block used for uplink transmission may also be understood as a PUSCH resource group. To be specific, a PRACH time-frequency resource is mapped by using $N_1$ mapping 2-tuples, to obtain $N_1$ PUSCH resource groups corresponding to the PRACH time-frequency resource.

In this case, when each PRACH time-frequency resource is mapped by using the $N_1$ mapping 2-tuples, mapping is performed in the preset order of mapping from PRACH time-frequency resources to PUSCH time-frequency resource blocks.

The preset order of mapping from PRACH time-frequency resources to PUSCH time-frequency resource blocks may be understood as that mapping is performed in an order of sequence numbers of PRACH time-frequency resources. For example, mapping may be performed in ascending order of the sequence numbers of the PRACH time-frequency resources. The ascending order of the sequence numbers of the PRACH time-frequency resources may be first in ascending order of sequence numbers of frequency domain resources, and then in ascending order of sequence numbers of time domain resources.

It should be noted that when the network device configures the first mapping pattern for the terminal, the first mapping pattern includes one or more mapping 2-tuples. In this case, when the first mapping pattern includes a plurality of mapping 2-tuples, the network device also configures an order of the plurality of mapping 2-tuples.

In this case, when each PRACH time-frequency resource is mapped by using the $N_1$ mapping 2-tuples, that mapping is performed in the preset order of mapping from PRACH time-frequency resources to PUSCH time-frequency resource blocks includes at least two meanings: First is a mapping order of all PRACH time-frequency resources, that is, which PRACH time-frequency resource is mapped first, and which PRACH time-frequency resource is mapped later. Second is $N_1$ mapping 2-tuples selected, according to an order of the mapping 2-tuples in the first mapping pattern, for mapping of each PRACH time-frequency resource, that is, specific $N_1$ mapping 2-tuples selected for mapping of each PRACH time-frequency resource.

An example in which the network device configures the PRACH time-frequency resource shown in FIG. 5A and the first mapping pattern includes two mapping 2-tuples is used to provide descriptions below with reference to the accompanying drawings.

The first mapping image is ($\{K, S, L\}$, $\{RB_{start}, L_{RBs}\}$)=$\{(\{1, 0, 14\} \{12, 6\}), (\{2, 0, 14\} \{6, 6\})\}$
It can be learned that ($\{1.0.14\}\{12.6\}$) is a first mapping 2-tuple. It can be learned from the foregoing explanation of the mapping 2-tuple that the mapping 2-tuple indicates: A slot in which the first symbol of a PUSCH time-frequency resource block obtained after mapping is located is the first slot following a slot occupied by the PRACH time-frequency resource, that is, one subframe herein; a start symbol is a symbol #0, and 14 symbols are occupied, that is, one subframe is occupied; a start RB is an RB #12, and 6 RBs are occupied. ($\{2, 0, 14\} \{6, 6\}$) is a second mapping 2-tuple. The mapping 2-tuple indicates: The slot in which the first symbol of the PUSCH time-frequency resource block obtained after mapping is located is the second slot following the slot occupied by the PRACH time-frequency resource, that is, one subframe herein: the start symbol is the symbol #0, and 14 symbols are occupied, that is, one subframe is occupied: the start RB is an RB #6, and 6 RBs are occupied.

It should be noted that, in this example, because the PRACH time-frequency resource occupies only one slot in time domain, sequence numbers of the first slot and the last slot occupied by the PRACH time-frequency resource are the same. In all subsequent examples of this application, the time domain resource of the PUSCH time-frequency resource block is calculated by using the sequence number of the first slot occupied by the PRACH time-frequency resource as a reference.

Figure 6:
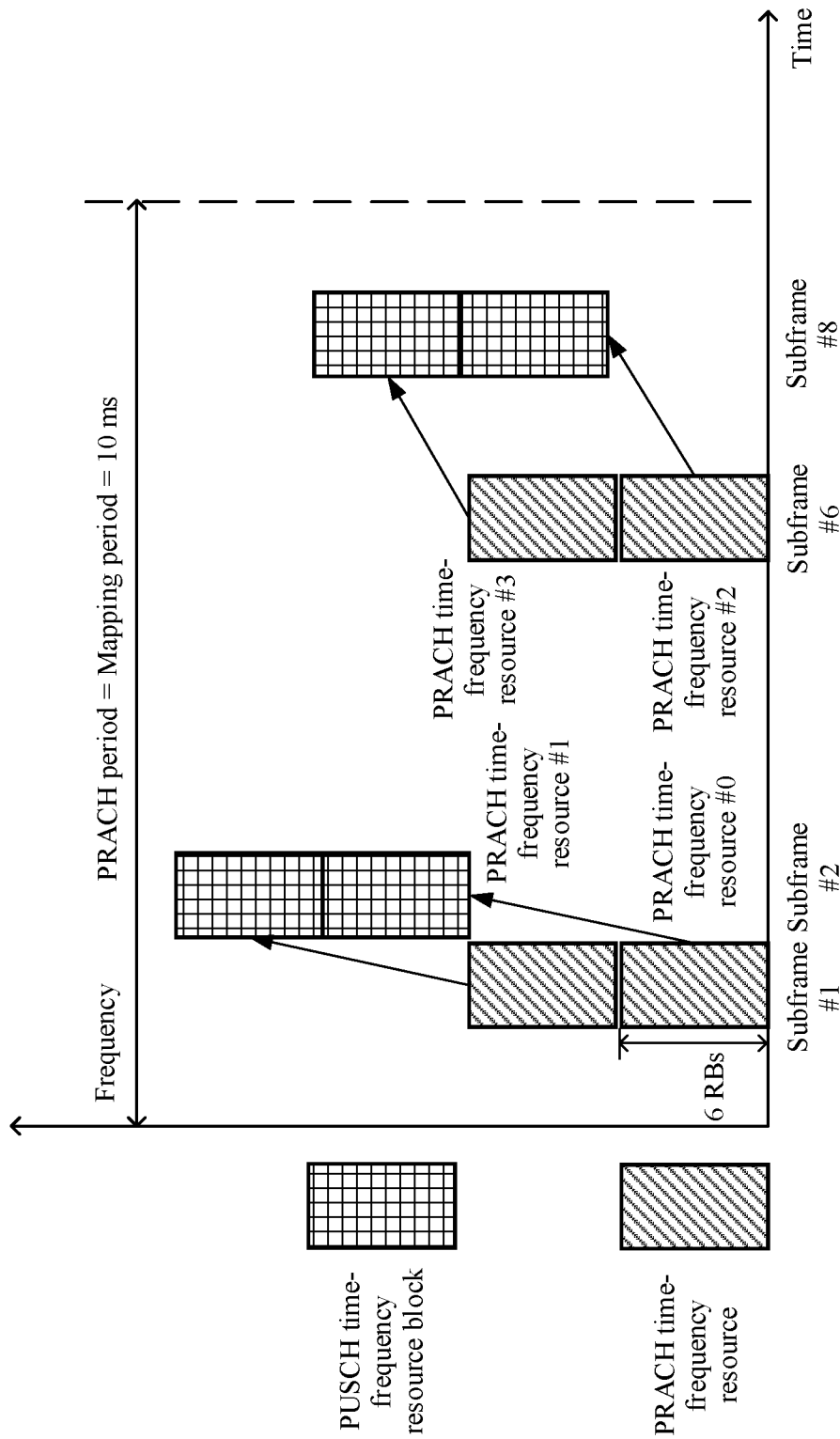
FIG. 6 is a schematic diagram of a method for mapping between a PRACH time-frequency resource and a PUSCH time-frequency resource block according to an embodiment of this application.

For example, referring to FIG. 6, when the network device configures $N_1=½$, it indicates that ½ of a mapping 2-tuple is used during mapping of one PRACH time-frequency resource. That is, two PRACH time-frequency resources use one mapping 2-tuple. During specific mapping, a PRACH time-frequency resource #0 is mapped by using a first mapping 2-tuple, and a PRACH time-frequency resource #1 is mapped also by using the first mapping 2-tuple. A PRACH time-frequency resource #2 is mapped by using a second mapping 2-tuple, and a PRACH time-frequency resource #3 is mapped also by using the second mapping 2-tuple. A PUSCH time-frequency resource block obtained after the mapping and a correspondence between PRACH time-frequency resources and the time-frequency resource are shown in FIG. 6.

Figure 7:
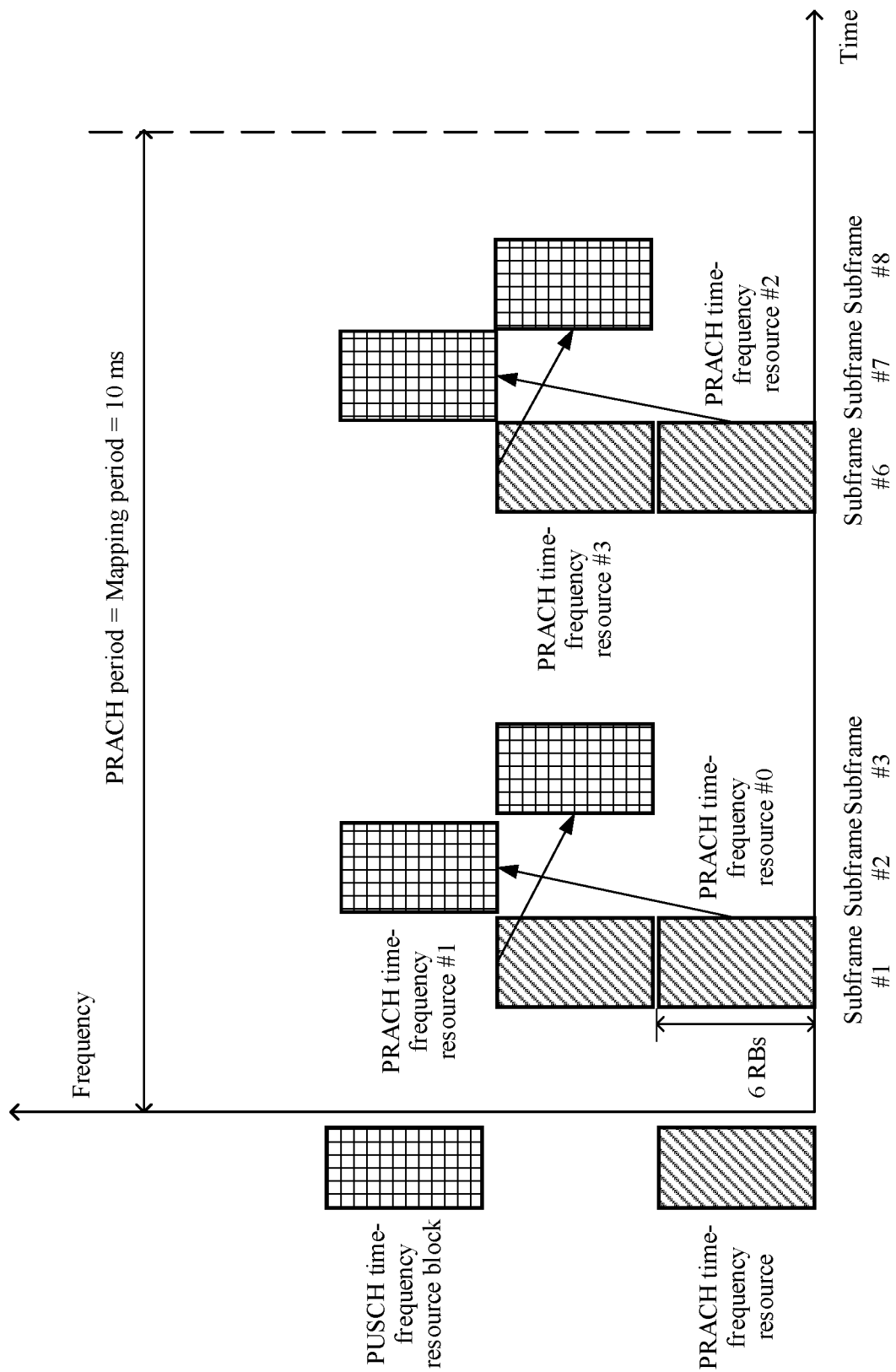
FIG. 7 is a schematic diagram of another method for mapping between a PRACH time-frequency resource and a PUSCH time-frequency resource block according to an embodiment of this application.

For another example, referring to FIG. 7, when the network device configures $N_1=1$, it indicates that one mapping 2-tuple is used during mapping of one PRACH time-frequency resource. During specific mapping, a PRACH time-frequency resource #0 is mapped by using a first mapping 2-tuple, and a PRACH time-frequency resource #1 is mapped by using a second mapping 2-tuple. Recurrently, a PRACH time-frequency resource #2 is mapped by using the first mapping 2-tuple, and a PRACH time-frequency resource #3 is mapped by using the second mapping 2-tuple. A PUSCH time-frequency resource block obtained after the mapping and a correspondence between PRACH time-frequency resources and the time-frequency resource are shown in FIG. 7.

Figure 8:
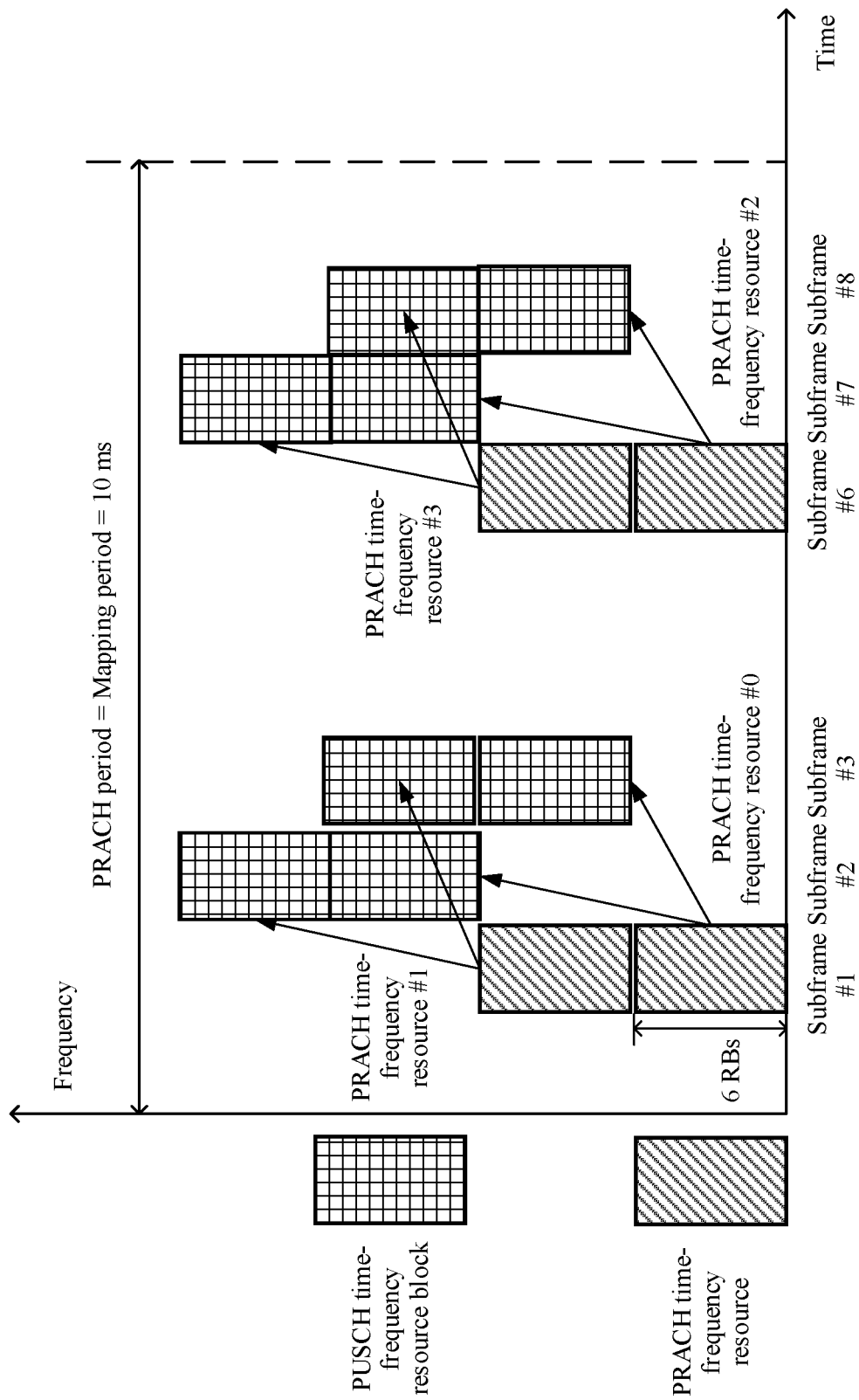
FIG. 8 is a schematic diagram of still another method for mapping between a PRACH time-frequency resource and a PUSCH time-frequency resource block according to an embodiment of this application.

It should be noted that, when the network device configures $N_1>1$, a quantity of mapping 2-tuples included in the first mapping pattern is usually two or more than two times of $N_1$. Therefore, an example in which the first mapping pattern includes four mapping 2-tuples is used for description herein. For example, the first mapping pattern is:

($\{K, S, L\}$, $\{RB_{start}, L_{RBs}\}$)=$\{(\{1, 0, 14\}\{12, 6\}), (\{2, 0, 14\}\{6, 6\}), (\{1, 0, 14\} \{18, 6\}), (\{1, 0, 14\} \{12, 6\})\}$ For another example, referring to FIG. 8, when the network device configures $n_1=2$, it indicates that two mapping 2-tuples are used during mapping of one PRACH time-frequency resource. During specific mapping, a PRACH time-frequency resource #0 is mapped by using a first mapping 2-tuple and a second mapping 2-tuple, and a PRACH time-frequency resource #1 is mapped by using a third mapping 2-tuple and a fourth mapping 2-tuple. Recurrently, a PRACH time-frequency resource #2 is mapped by using the first mapping 2-tuple and the second mapping 2-tuple, and a PRACH time-frequency resource #3 is mapped by using the third mapping 2-tuple and the fourth mapping 2-tuple. A PUSCH time-frequency resource block obtained after the mapping and a correspondence between PRACH time-frequency resources and the time-frequency resource are shown in FIG. 8.

FIG. 6 to FIG. 8 are all described by using an example in which a mapping period is the same as a PRACH period (a period of a PRACH time-frequency resource). The mapping period mentioned above may also be an integer multiple of the PRACH period. In this case, during mapping, all PRACHs in the mapping period are mapped according to the preset order of mapping from PRACH time-frequency resources to PUSCH time-frequency resource blocks and an order of mapping 2-tuples in the first mapping pattern. Mapping methods are similar, and an example in which the mapping period is twice the PRACH period is used below for description.

Figure 9:
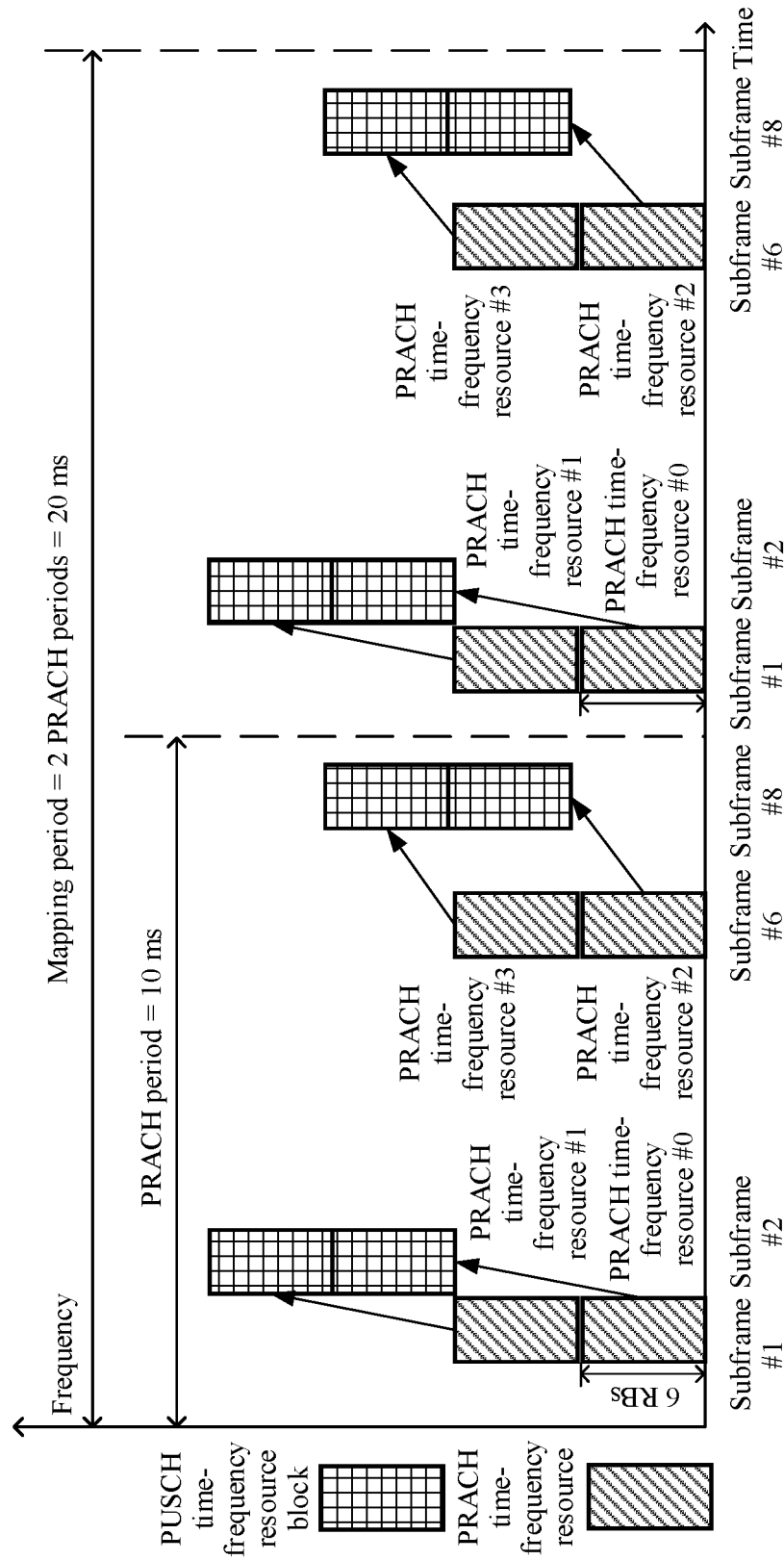
FIG. 9 is a schematic diagram of still another method for mapping between a PRACH time-frequency resource and a PUSCH time-frequency resource block according to an embodiment of this application.

For another example, as shown in FIG. 9, except that the mapping period is twice the PRACH period, that is, the mapping period is 20 ms, other configuration information is the same as that in FIG. 6. In this case, during specific mapping, in the first PRACH period, a PRACH time-frequency resource #0 and a PRACH time-frequency resource #1 are mapped by using a first mapping 2-tuple, and a PRACH time-frequency resource #2 and a PRACH time-frequency resource #3 are mapped by using a second mapping 2-tuple. In the second PRACH period, a PRACH time-frequency resource #0 and a PRACH time-frequency resource #1 are mapped by using the first mapping 2-tuple, and a PRACH time-frequency resource #2 and a PRACH time-frequency resource #3 are mapped by using the second mapping 2-tuple. A PUSCH time-frequency resource block obtained after the mapping and a correspondence between PRACH time-frequency resources and the time-frequency resource are shown in FIG. 9.

$$N_1 < 1, \frac{1}{N_1}$$

In conclusion, when PRACH time-frequency resources use a same $$\#(\frac{1}{N_1} \times g)$$

mapping 2-tuple. Specifically, a PRACH time-frequency resource to a PRACH $$\#(\frac{1}{N_1} \times (g+1)-1)$$

time-frequency resource use a mapping 2-tuple #modulo (g, G), where g is a sequence number of the mapping 2-tuple in the first mapping pattern, and G indicates a quantity of mapping 2-tuples in the first mapping pattern. When ~1=1, one PRACH time-frequency resource uses one mapping 2-tuple. Specifically, a PRACH time-frequency resource #g is mapped to the mapping 2-tuple #modulo (g, G).

When $N_1>1$, one PRACH time-frequency resource uses $N_1$ mapping 2-tuples. Specifically, a PRACH occasion #g is mapped to mapping 2-tuples #modulo (g×$N_1$, G) to #modulo ((g+1)×$N_1$–1, G).

When the predefined rule for determining the PRACH time-frequency resource group is by default that each PRACH time-frequency resource is a PRACH time-frequency resource group, for example, in FIG. 6 to FIG. 9, a PRACH time-frequency resource #n forms a PRACH time-frequency resource group #n, and an order of PRACH time-frequency resource groups is the same as that of PRACH time-frequency resources.

When the predefined rule for determining the PRACH time-frequency resource group is that PRACH time-frequency resources located in a same PRACH time domain resource form a PRACH time-frequency resource group, or that PRACH time-frequency resources located in a same slot may form a PRACH time-frequency resource group, for example, in FIG. 6 to FIG. 9, because the PRACH time domain resource #0 and the PRACH time domain resource #1 are located on a same PRACH time domain resource, and are located in a same slot, the PRACH time-frequency resource #0 and the PRACH time-frequency resource #1 may form a PRACH time-frequency resource group: because the PRACH time domain resource #2 and the PRACH time domain resource #3 are located on a same PRACH time domain resource, and are located in a same slot, the PRACH time-frequency resource #2 and the PRACH time-frequency resource #3 may form a PRACH time-frequency resource group.

When the predefined rule for determining the PRACH time-frequency resource group is that PRACH time-frequency resources that use a same mapping 2-tuple form one PRACH time-frequency resource group, for example, when $N_1<1$, as shown in FIG. 6 and FIG. 9, because the PRACH time-frequency resource #0 and the PRACH time-frequency resource #1 use a same mapping 2-tuple, the PRACH time-frequency resource #0 and the PRACH time-frequency resource #1 may form a PRACH time-frequency resource group, which is a PRACH time-frequency resource group #0; and the PRACH time-frequency resource #2 and the PRACH time-frequency resource #3 may form a PRACH time-frequency resource group, which is a PRACH time-frequency resource group #1. When $N_1$–1, as shown in FIG. 7, each PRACH time-frequency resource in the mapping period may be one PRACH time-frequency resource group, and an order of PRACH time-frequency resource groups is the same as an order of PRACH time-frequency resources. When $N_1>1$, as shown in FIG. 8, each PRACH time-frequency resource in the mapping period may be one PRACH time-frequency resource group, and an order of PRACH time-frequency resource groups is the same as an order of PRACH time-frequency resources.

In another possible implementation of the first method, the second configuration information may further include a parameter $N_2$ and a parameter $N_3$, where the parameter $N_2$ is used to configure a quantity of PRACH time-frequency resources included in one PRACH time-frequency resource group, and the parameter $N_3$ is used to determine a quantity of PUSCH time-frequency resource blocks corresponding to each PRACH time-frequency resource group.

In this implementation, because the second configuration information includes configuration information of a PRACH time-frequency resource group, that is, may be used to determine the PRACH time-frequency resource group, the PRACH time-frequency resource group may be used for mapping, to obtain a PUSCH time-frequency resource block corresponding to each PRACH time-frequency resource group. Subsequently, a preamble in the PRACH time-frequency resource group may be further mapped to a time-frequency resource of the PUSCH time-frequency resource block based on the third configuration information.

It should be noted that after the PRACH time-frequency resource group is determined, an order of PRACH time-frequency resource groups may be further determined in an order of PRACH time-frequency resources included in the PRACH time-frequency resource groups. To be specific, the order of the PRACH time-frequency resource groups may be determined based on an order of frequency domain resources and an order of time domain resources of the included PRACH time-frequency resources. For example, the PRACH time-frequency resource groups may be sorted in ascending order of frequency domain resources of the included PRACH time-frequency resources, and then in ascending order of time domain resources of the included PRACH time-frequency resources. The order of the PRACH time-frequency resource groups herein is similar to the order of the PRACH time-frequency resources, and details are not described herein again.

Further, after the PRACH time-frequency resource group is determined, mapping may be performed according to an order of mapping from PRACH time-frequency resource groups to PUSCH time-frequency resource blocks and the order of the mapping 2-tuples in the first mapping pattern. The order of mapping from PRACH time-frequency resource groups to PUSCH time-frequency resource blocks may be understood as an order of PRACH time-frequency resource groups.

An example in which the network device configures the PRACH time-frequency resources shown in FIG. 5A is used to provide descriptions below with reference to the accompanying drawings.

Figure 10:
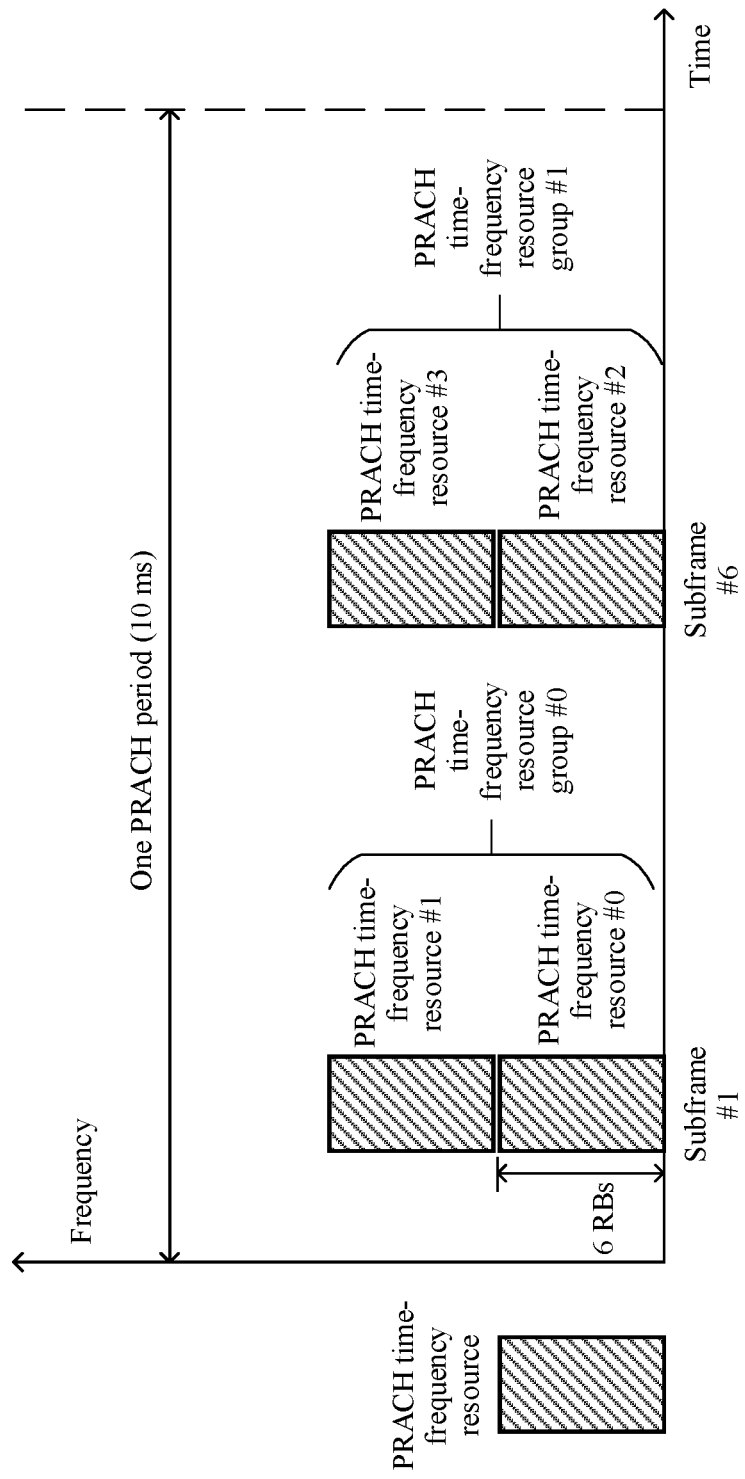
FIG. 10 is a schematic diagram of still another method for mapping between a PRACH time-frequency resource and a PUSCH time-frequency resource block according to an embodiment of this application.

Referring to FIG. 10, assuming that the network device configures that one PRACH time-frequency resource group includes two PRACH time-frequency resources, four PRACH time-frequency resources in one PRACH period may be divided into two PRACH time-frequency resource groups according to an order of the PRACH time-frequency resources: a PRACH time-frequency resource group #0 and a PRACH time-frequency resource group #1.

Subsequently, the PRACH time-frequency resource group #0 and the PRACH time-frequency resource group #1 use a mapping 2-tuple in the first mapping pattern according to a mapping order.

Figure 11:
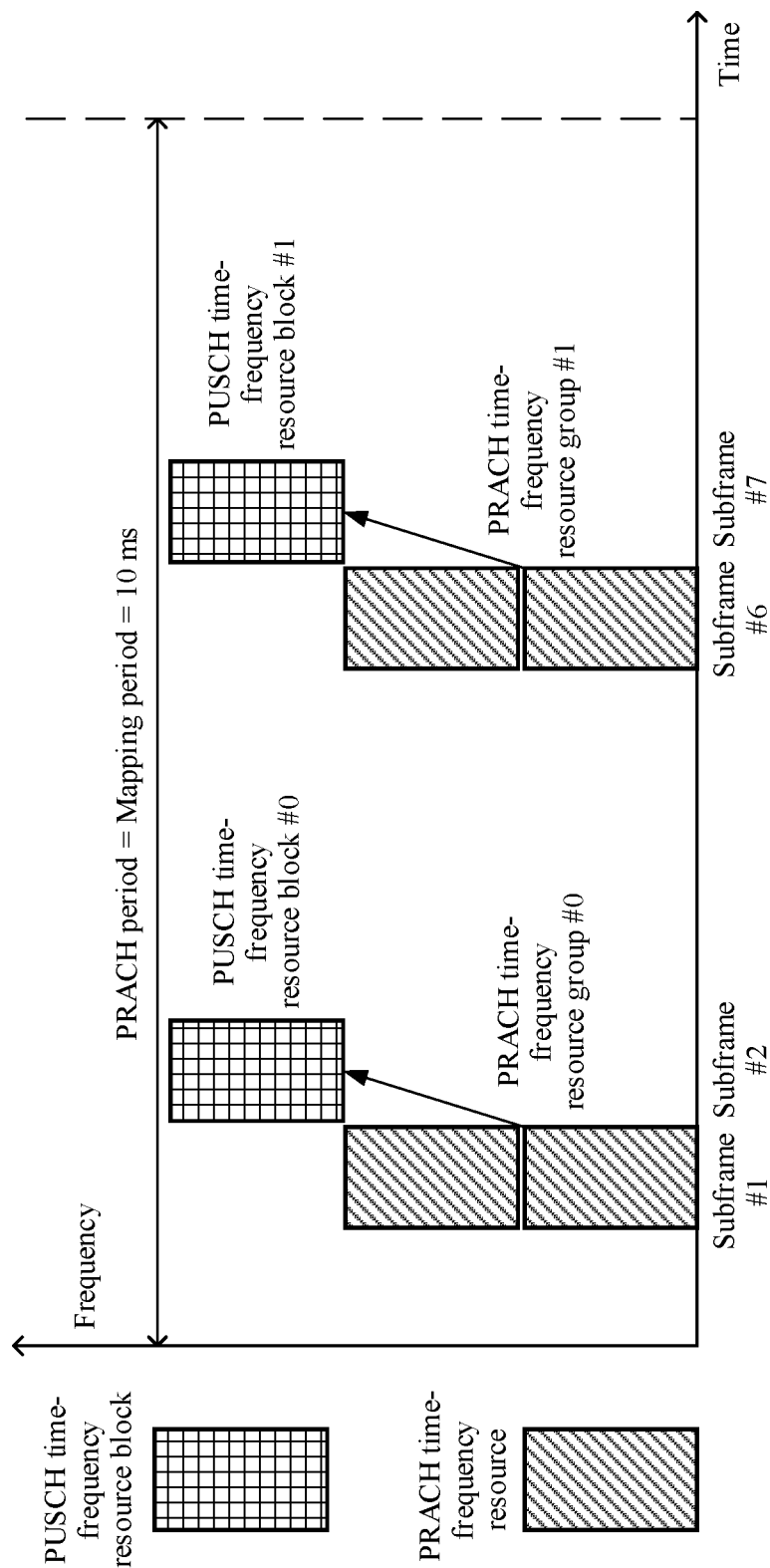
FIG. 11 is a schematic diagram of still another method for mapping between a PRACH time-frequency resource and a PUSCH time-frequency resource block according to an embodiment of this application.

For example, referring to FIG. 11, it is assumed that $N_3=1$, a mapping period is the same as a PRACH period, both of which are 10 ms, and the first mapping pattern includes one mapping 2-tuple, for example, ($\{K, S, L\}, \{RB_{start}, L_{RBs}\}$) ={({1, 0, 14} {12, 6})} In this case, both a PRACH time-frequency resource group #0 and a PRACH time-frequency resource group #1 are mapped by using the mapping 2-tuple. It can be learned that the PRACH time-frequency resource group #0 corresponds to a PUSCH time-frequency resource block #0, and the PRACH time-frequency resource group #1 corresponds to a PUSCH time-frequency resource block #1.

Figure 12:
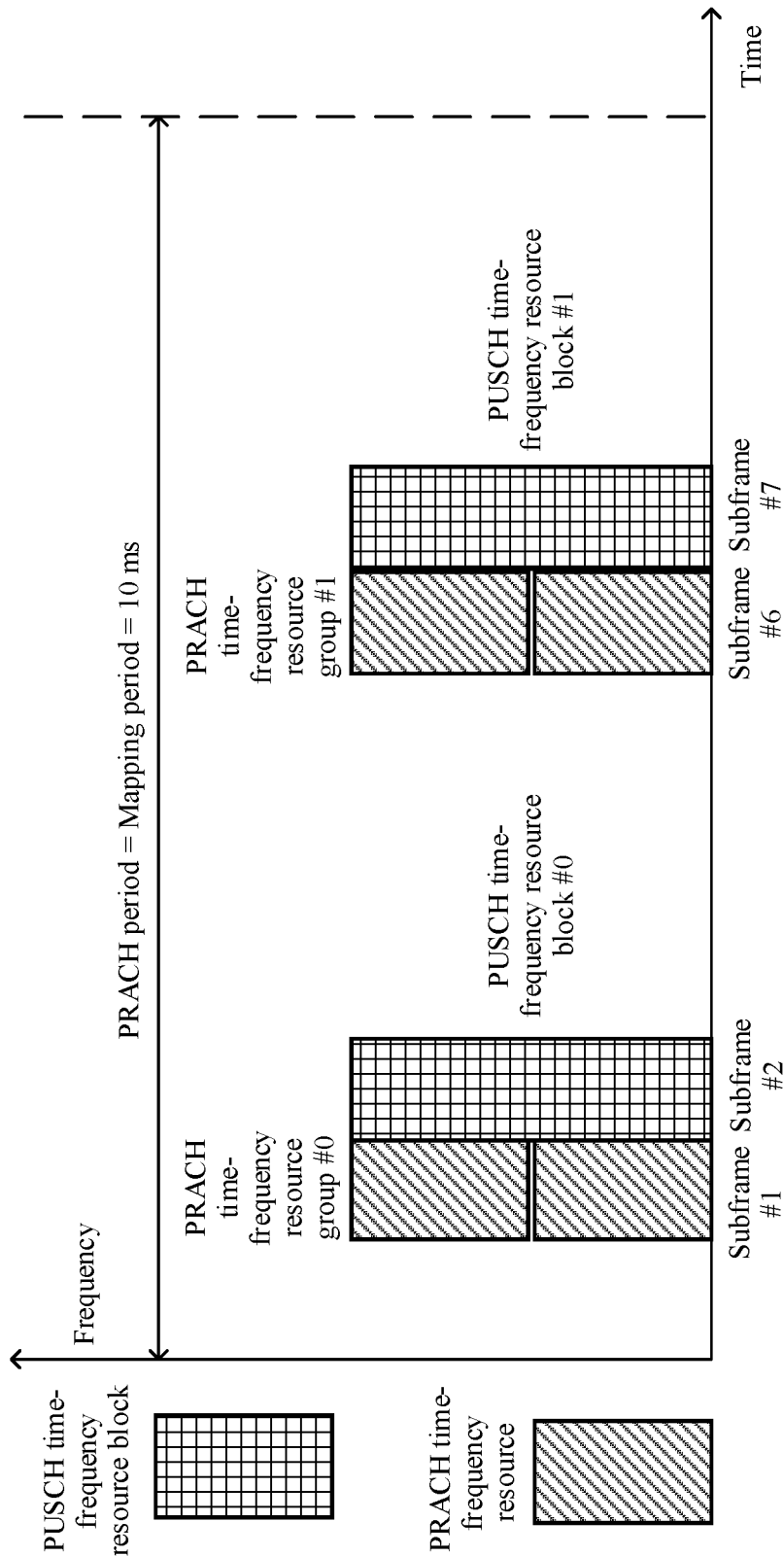
FIG. 12 is a schematic diagram of still another method for mapping between a PRACH time-frequency resource and a PUSCH time-frequency resource block according to an embodiment of this application.

For another example, referring to FIG. 12, it is assumed that $N_3=1$, a mapping period is the same as a PRACH period, both of which are 10 ms, and the first mapping pattern includes one mapping 2-tuple, for example, ({K, S, L}, $\{RB_{start}, L_{RBs}\}$)={({1, 0, 14}{ })}. It can be learned that the mapping 2-tuple includes only information about a time domain resource. In this case, it may be considered by default that a frequency domain resource of a PUSCH time-frequency resource block obtained after mapping is the same as a frequency domain resource of a PRACH time-frequency resource group. Specifically, both a PRACH time-frequency resource group #0 and a PRACH time-frequency resource group #1 are mapped by using the mapping 2-tuple. It can be learned that the PRACH time-frequency resource group #0 corresponds to a PUSCH time-frequency resource block #0, and the PRACH time-frequency resource group #1 corresponds to a PUSCH time-frequency resource block #1.

Figure 13:
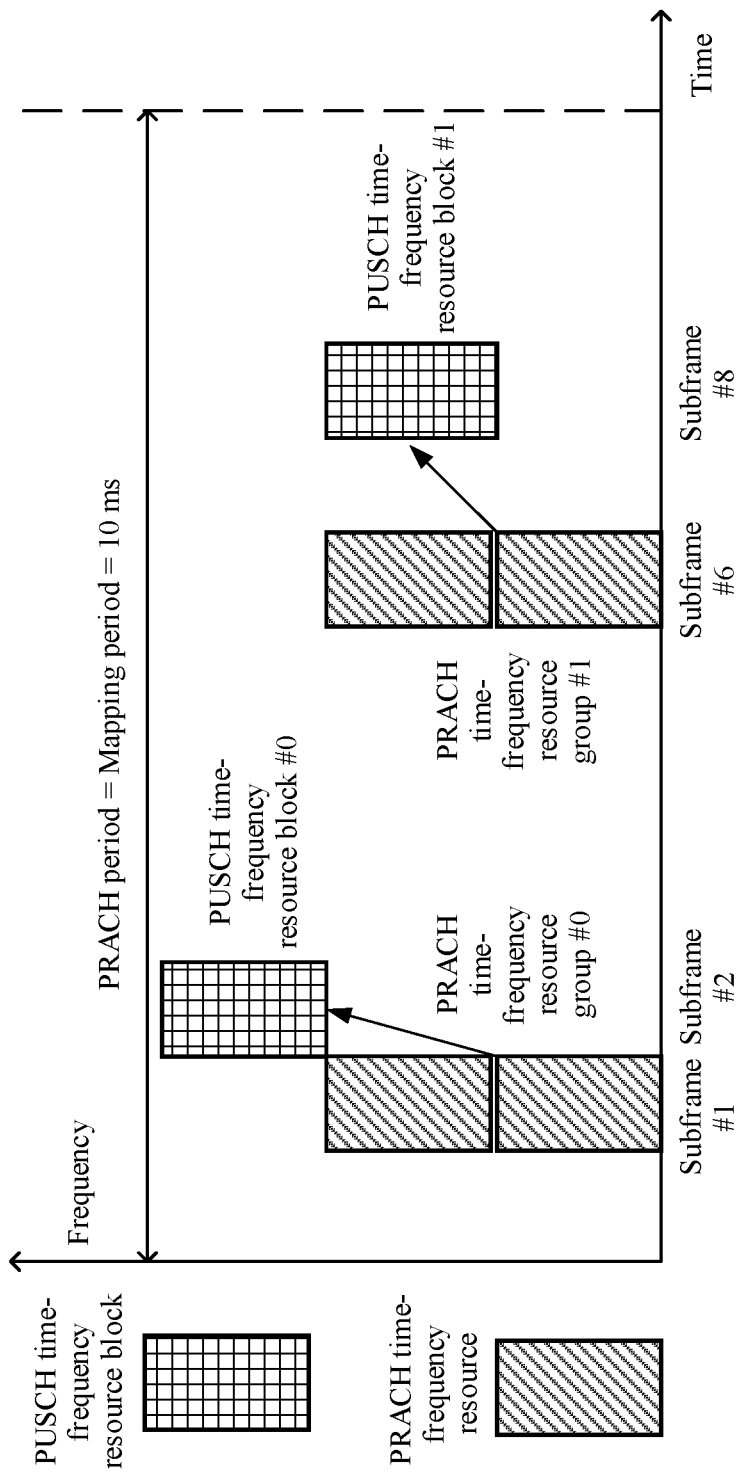
FIG. 13 is a schematic diagram of still another method for mapping between a PRACH time-frequency resource and a PUSCH time-frequency resource block according to an embodiment of this application.

For another example, referring to FIG. 13, it is assumed that $N_3=1$, a mapping period is the same as a PRACH period, both of which are 10 ms, and the first mapping pattern includes two mapping 2-tuples, for example, ({K, S, L}, $\{RB_{start}, L_{RBs}\}$)={({1, 0, 14} {12, 6}), ({2, 0, 14} {6, 6})}

Specifically, a PRACH time-frequency resource group #0 is mapped by using a first mapping 2-tuple, and a PRACH time-frequency resource group #1 is mapped by using a second mapping 2-tuple. It can be learned that the PRACH time-frequency resource group #0 corresponds to a PUSCH time-frequency resource block #0, and the PRACH time-frequency resource group #1 corresponds to a PUSCH time-frequency resource block #1.

Figure 14:
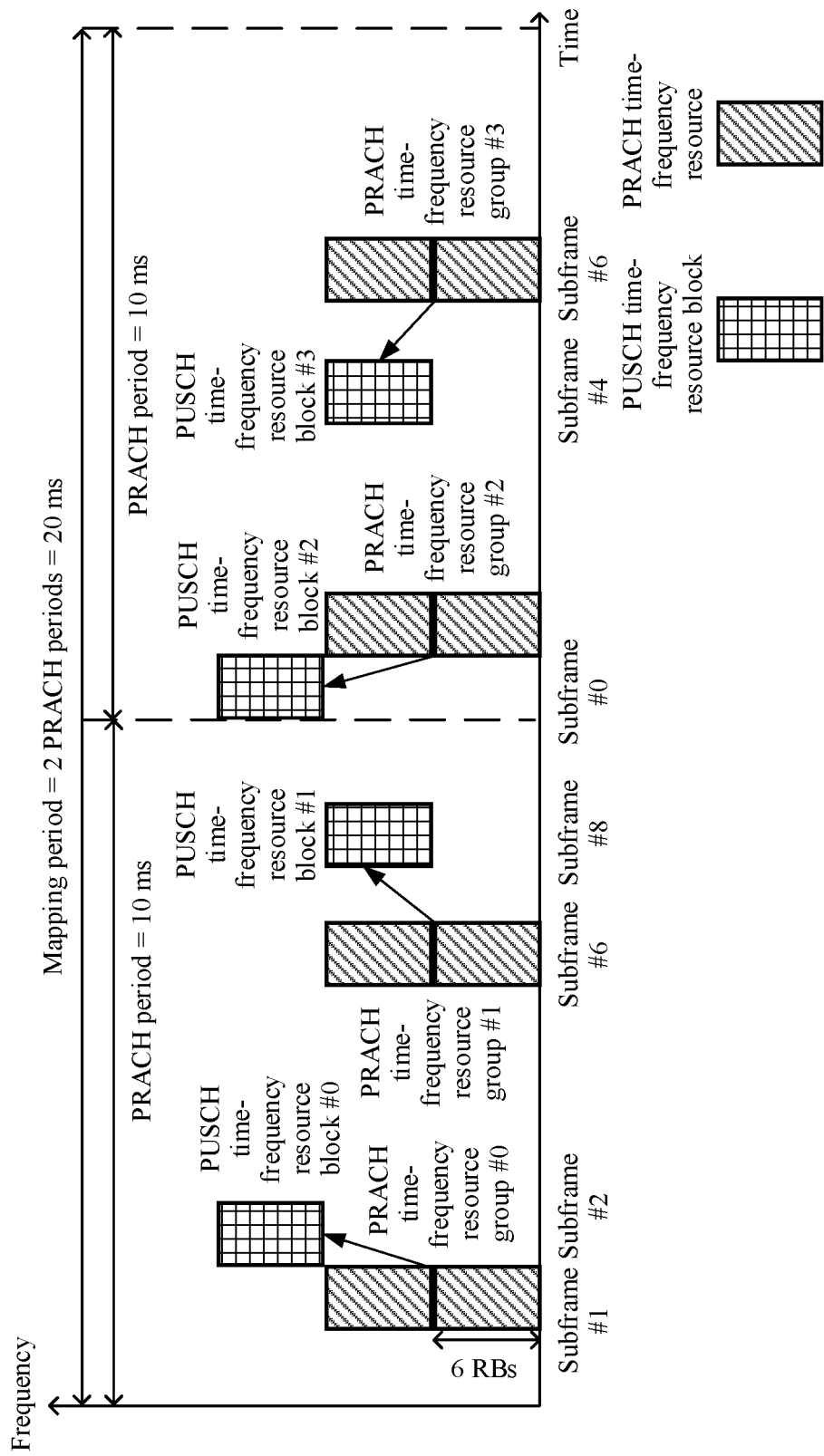
FIG. 14 is a schematic diagram of still another method for mapping between a PRACH time-frequency resource and a PUSCH time-frequency resource block according to an embodiment of this application.

For another example, referring to FIG. 14, it is assumed that a mapping period is twice a PRACH period, that is, 20 ms, and the first mapping pattern includes four mapping 2-tuples. For example:

({K, S, L}, $\{RB_{start}, L_{RBs}\}$)={({1, 0, 14}{12, 6}), ({2, 0, 14} {6, 6}), ({−1, 0, 14} {12, 6}, ({−1, 0, 14} {6, 6}))}

In this case, all PRACH time-frequency resource groups included in the mapping period (that is, all PRACH time-frequency resource groups in two PRACH periods) need to be mapped according to a preset mapping order. Specifically, a PRACH time-frequency resource group #0 is mapped by using a first mapping 2-tuple, to obtain a PUSCH time-frequency resource block #0. A PRACH time-frequency resource group #1 is mapped by using a second mapping 2-tuple, to obtain a PUSCH time-frequency resource block #1. A PRACH time-frequency resource group #2 is mapped by using a third mapping 2-tuple, to obtain a PUSCH time-frequency resource block #2. A PRACH time-frequency resource group #3 is mapped by using a fourth mapping 2-tuple, to obtain a PUSCH time-frequency resource block #3.

Second method: A periodic PUSCH time-frequency resource block is first configured, and a periodic mapping rule, that is, a second mapping pattern, is then configured, so that a periodic PRACH time-frequency resource is mapped to the periodic PUSCH time-frequency resource block.

Similar to the first method, considering that the PRACH time-frequency resource configured by the network device for the two-step random access procedure has periodicity (that is, a PRACH period), the second mapping pattern configured by the network device may also have periodicity (that is, a mapping period). In the embodiments of this application, the network device may configure a period T3 of the second mapping image, which may also be understood as the mapping period, that is, a period in which the PUSCH resource block is configured by using the second mapping pattern. That is, the second configuration information may include the period T3. The period T3 may be the same as the PRACH period, or may be an integer multiple of the PRACH period. This is not specifically limited in the embodiments of this application.

It should be noted that, if the network device does not configure the mapping period, the mapping period may be the PRACH period by default.

A start position of the mapping period may be the same as or different from a start position of the PRACH period. When the start position of the mapping period is different from that of the PRACH period, there is a time domain offset between the start position of the mapping period and the start position of the PRACH period. A specific value of the time domain offset may be configured by the network device, or may be predefined. When the time domain offset is not predefined, and the network device does not configure the time domain offset, the time domain offset may be zero by default.

In some embodiments, the second configuration information may further include a period T2 of the PUSCH time-frequency resource block, and the time domain resource configuration information and/or the frequency domain resource configuration information of the PUSCH time-frequency resource block.

There is one PUSCH time-frequency resource block in one period of the PUSCH time-frequency resource block. The time domain resource configuration information of the PUSCH time-frequency resource block includes at least a time domain offset relative to a radio frame #0, a start symbol sequence number, and a quantity of consecutive symbols occupied in one period. The frequency domain resource configuration information of the PUSCH time-frequency resource block includes at least a start RB sequence number and a quantity of consecutive RBs occupied in one period. The start RB sequence number is numbered starting from the first RB of a current active BWP. The current active BWP may be an initial BWP. The PUSCH time-frequency resource block and the PRACH time-frequency resource may be located in a same BWP, or may be located in different BWPs. This is not limited in the embodiments of this application. It may be understood that the second configuration information may alternatively include the time domain resource configuration information of the PUSCH time-frequency resource block, but does not include the frequency domain resource configuration information. In this case, it may be considered by default that a frequency domain resource of the PUSCH time-frequency resource block is the same as or has a preset relationship with a frequency domain resource of the PRACH time-frequency resource. Similarly, the second configuration information may alternatively include the frequency domain resource configuration information of the PUSCH time-frequency resource block, but does not include the time domain resource configuration information. In this case, it may be considered by default that a time domain resource of the PUSCH time-frequency resource block is the same as or has a preset relationship with a time domain resource of the PRACH time-frequency resource, or is a default time domain resource.

Similar to the first method, the network device may also configure a range of available frequency domain resources of the PUSCH time-frequency resource. For example, the range of available frequency domain resources of the PUSCH time-frequency resource block may be configured in a frequency domain resource range of an uplink BWP, a frequency domain resource range of a PRACH time-frequency resource associated with the PUSCH time-frequency resource block, or a frequency domain resource range of a PRACH time-frequency resource group associated with the PUSCH time-frequency resource block. Optionally, the range of available PUSCH frequency domain resources may be predefined. This is not limited in the embodiments of this application. For other content, refer to descriptions of related content in the first method. Details are not described herein again.

An example in which only one group of PUSCH time-frequency resource blocks is configured when a periodic PUSCH time-frequency resource block is configured is used for description above. In some other embodiments, the network device may alternatively configure a plurality of groups of (two or more groups of) PUSCH time-frequency resource blocks. That is, the second configuration information may alternatively include configuration information of a plurality of groups of PUSCH time-frequency resource blocks, and configuration information of each group of PUSCH time-frequency resource blocks may include a period of the group of PUSCH time-frequency resource blocks, and time domain resource configuration information and/or frequency domain resource configuration information of the PUSCH time-frequency resource blocks. It may alternatively be understood that the second configuration information may include periods T2 of a plurality of PUSCH time-frequency resource blocks, and time domain resource configuration information and/or frequency domain resource configuration information of a corresponding PUSCH time-frequency resource block in each period T2.

Figure 15A:
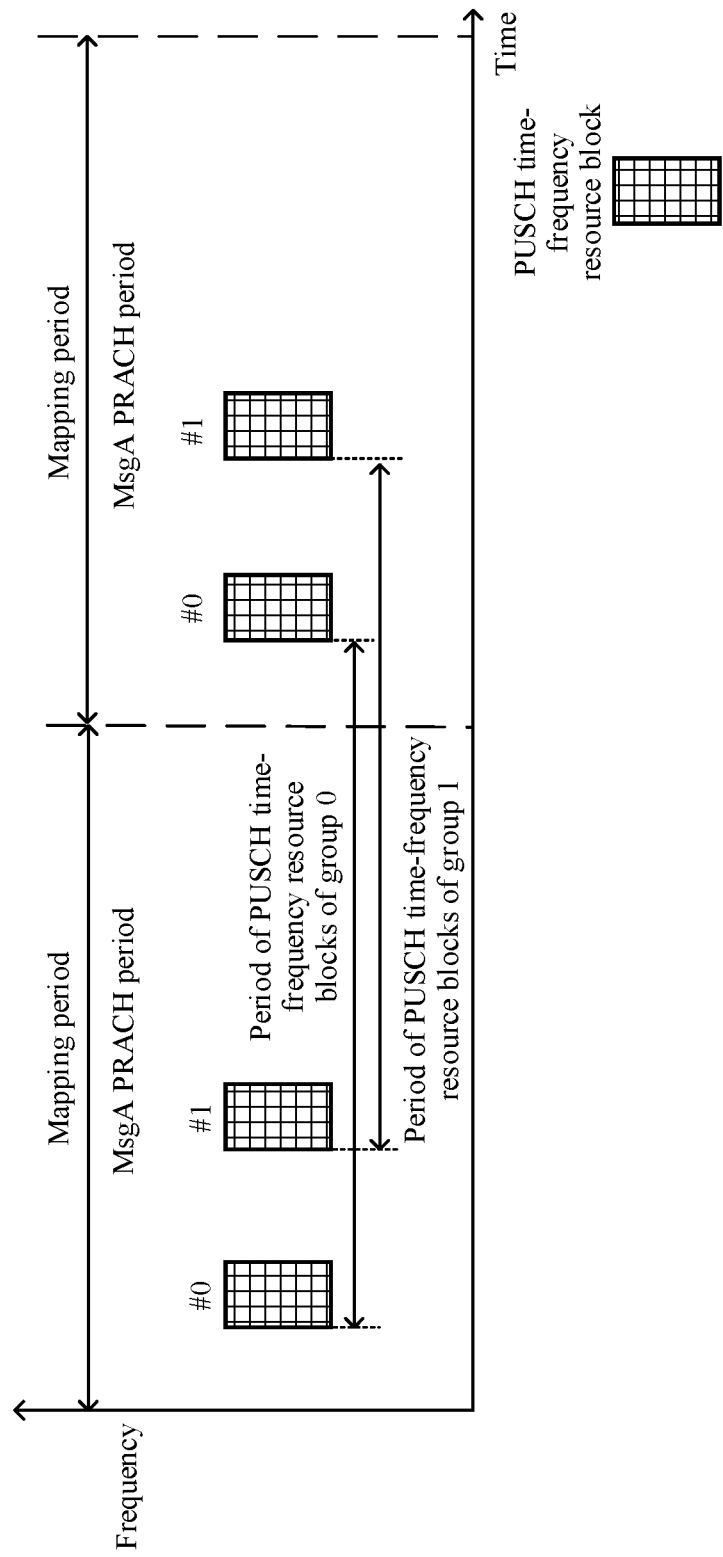
FIG. 15A is a schematic diagram of a PRACH time-frequency resource configuration method according to an embodiment of this application.

For example, as shown in FIG. 15A, two groups of PUSCH time-frequency resource blocks are configured. A PUSCH time-frequency resource block numbered #0 is a zeroth group of PUSCH time-frequency resource blocks. A PUSCH time-frequency resource block numbered #1 is a first group of PUSCH time-frequency resource blocks.

It should be noted that the periods, and the time domain resource configuration information and/or the frequency domain resource configuration information of the plurality of groups of PUSCH time-frequency resource blocks may be the same or may be different.

It should be further noted that a parameter configuration of any one or more of the periods, and the time domain resource configuration information and/or the frequency domain resource configuration information of the plurality of groups of PUSCH time-frequency resource blocks may be defaulted. If any one or more parameters in configuration information of a group of PUSCH time-frequency resource blocks is/are default, it may be considered by default that corresponding values configured for another group of PUSCH time-frequency resource blocks are used for the group of PUSCH time-frequency resource blocks. If all of the configuration information of the plurality of groups of PUSCH time-frequency resource blocks is defaulted, it may be considered by default that the configuration information of the plurality of groups of PUSCH time-frequency resource blocks is configuration information of PRACH time-frequency resources.

For example, the second configuration information includes configuration information of two groups of PUSCH time-frequency resource blocks, but a period T2 is configured in configuration information of only one group of PUSCH time-frequency resource blocks, and no period configuration information is configured in configuration information of the other group of PUSCH time-frequency resource blocks. In this case, periods of the two groups of PUSCH time-frequency resource blocks are both T2.

For another example, the second configuration information includes configuration information of two groups of PUSCH time-frequency resource blocks, but configuration information of neither of the two groups of PUSCH time-frequency resource blocks includes period configuration information. In this case, periods of the two groups of PUSCH time-frequency resource blocks are corresponding PRACH resource periods.

In some other embodiments, the second configuration information may further include information about a DMRS port associated with a PUSCH time-frequency resource block. This is because for PUSCH time-frequency resource blocks of which both time domain resources and frequency domain resources are the same, if DMRS ports associated with the PUSCH time-frequency resource blocks are different, the network device can also identify that the PUSCH time-frequency resource blocks are different PUSCH resources. In other words, a PUSCH resource may be determined by using a time domain resource, a frequency domain resource, and information about a DMRS port. Therefore, when configuring a PUSCH time-frequency resource block, the network device may also configure information about a DMRS associated with the PUSCH time-frequency resource block, that is, the second configuration information includes DMRS configuration information. The information about the DMRS port includes any one or more of the following parameters: a DMRS type, an additional DMRS position, a quantity of time domain symbols occupied by the DMRS, and a scrambling ID. The scrambling ID or a reference signal ID is used to generate a DMRS sequence, that is, different scrambling IDs or reference signal IDs may be used to generate different DMRS sequences. If a network does not configure a scrambling ID or a reference signal ID, the UE may use an ID of a cell in which the UE is located. The network device may configure one or more scrambling IDs or reference signal IDs by using indication information, to increase a quantity of DMRS ports associated with a PUSCH time-frequency resource, thereby reducing a DMRS collision probability. The indication information may be higher layer signaling such as an RRC message, or may be layer 1 or layer 2 indication signaling such as a MAC CE or DCI.

After a position of the periodic PUSCH time-frequency resource block is determined, a mapping relationship between each PRACH time-frequency resource and a PUSCH time-frequency resource block in a mapping period may be further configured.

In a possible implementation of the second method, the second configuration information may further include a parameter $N_4$, and the parameter $N_4$ is used to determine a quantity of PUSCH time-frequency resource blocks to which each PRACH time-frequency resource is mapped.

In this implementation, a mapping relationship between the configured PRACH time-frequency resource and the configured PUSCH time-frequency resource block may be established by configuring the parameter $N_4$ and a preset mapping order in the second configuration information, and then the PRACH time-frequency resource group may be determined according to a predefined rule. Since the mapping relationship has been established between the PRACH time-frequency resource in the PRACH time-frequency resource group and the PUSCH time-frequency resource block, a mapping relationship is also established between the PRACH time-frequency resource group and the PUSCH time-frequency resource block.

The predefined rule for determining the PRACH time-frequency resource group may be by default that each PRACH time-frequency resource is a PRACH time-frequency resource group, that is, PRACH time-frequency resources are mapped to PUSCH time-frequency resource blocks. Alternatively, PRACH time-frequency resources located on a same PRACH time domain resource may form one PRACH time-frequency resource group, or PRACH time-frequency resources located in a same slot may form one PRACH time-frequency resource group. Alternatively, PRACH time-frequency resources located in a plurality of consecutive slots in time domain may form one PRACH time-frequency resource group. Alternatively, PRACH time-frequency resources mapped to a same PUSCH time-frequency resource block may form one PRACH time-frequency resource group. The rule for determining the PRACH time-frequency resource group is not specifically limited in the embodiments of this application.

Specifically, in a mapping period, each PRACH time-frequency resource is mapped according to a preset order of mapping from PRACH time-frequency resources to PUSCH time-frequency resource blocks. For example, in a mapping period, mapping is performed first in ascending order of sequence numbers of frequency domain resources and then in ascending order of sequence numbers of time domain resources.

It may be understood that, when PUSCH time-frequency resource blocks are determined, an order of the PUSCH time-frequency resource blocks is also determined, and may be determined according to an order of time domain resources occupied by the PUSCH time-frequency resource blocks. For example, the PUSCH time-frequency resource blocks may be sorted in ascending order of the time domain resources occupied by the PUSCH time-frequency resource blocks.

In this case, when each PRACH time-frequency resource is mapped to $N_4$ PUSCH time-frequency resource blocks, that mapping is performed in the preset order of mapping from PRACH time-frequency resources to PUSCH time-frequency resource blocks includes at least two meanings: First is a mapping order of all PRACH time-frequency resources, that is, which PRACH time-frequency resource is mapped first, and which PRACH time-frequency resource is mapped later. Second is $N_4$ PUSCH time-frequency resource blocks to which each PRACH time-frequency resource is mapped according to an order of the PUSCH time-frequency resource blocks, that is, specific $N_4$ time-frequency resource blocks to which each PRACH time-frequency resource is specifically mapped during mapping.

It should be noted that, in one mapping period, when a quantity of PRACH time-frequency resources is greater than a quantity of PUSCH time-frequency resource blocks, it means that when the PRACH time-frequency resources are mapped according to a preset mapping order, the PRACH time-frequency resources are recurrently mapped to the PUSCH time-frequency resource blocks, until each PRACH time-frequency resource in the mapping period is mapped to at least one PUSCH time-frequency resource block. For example, one mapping period includes a PUSCH time-frequency resource block #0 and a PUSCH time-frequency resource block #1, and includes a PRACH time-frequency resource #0 to a PRACH time-frequency resource #3. In this case, after the PRACH time-frequency resource #0 is mapped to the PUSCH time-frequency resource block #0, and the PRACH time-frequency resource #1 is mapped to the PUSCH time-frequency resource block #1, the PRACH time-frequency resource #3 is mapped to the PUSCH time-frequency resource block #0, and the PRACH time-frequency resource #3 is mapped to the PUSCH time-frequency resource block #1.

The mapping relationship between the PRACH time-frequency resource and the PUSCH time-frequency resource block in this implementation is described below by using an example with reference to the accompanying drawings.

Figure 15B:
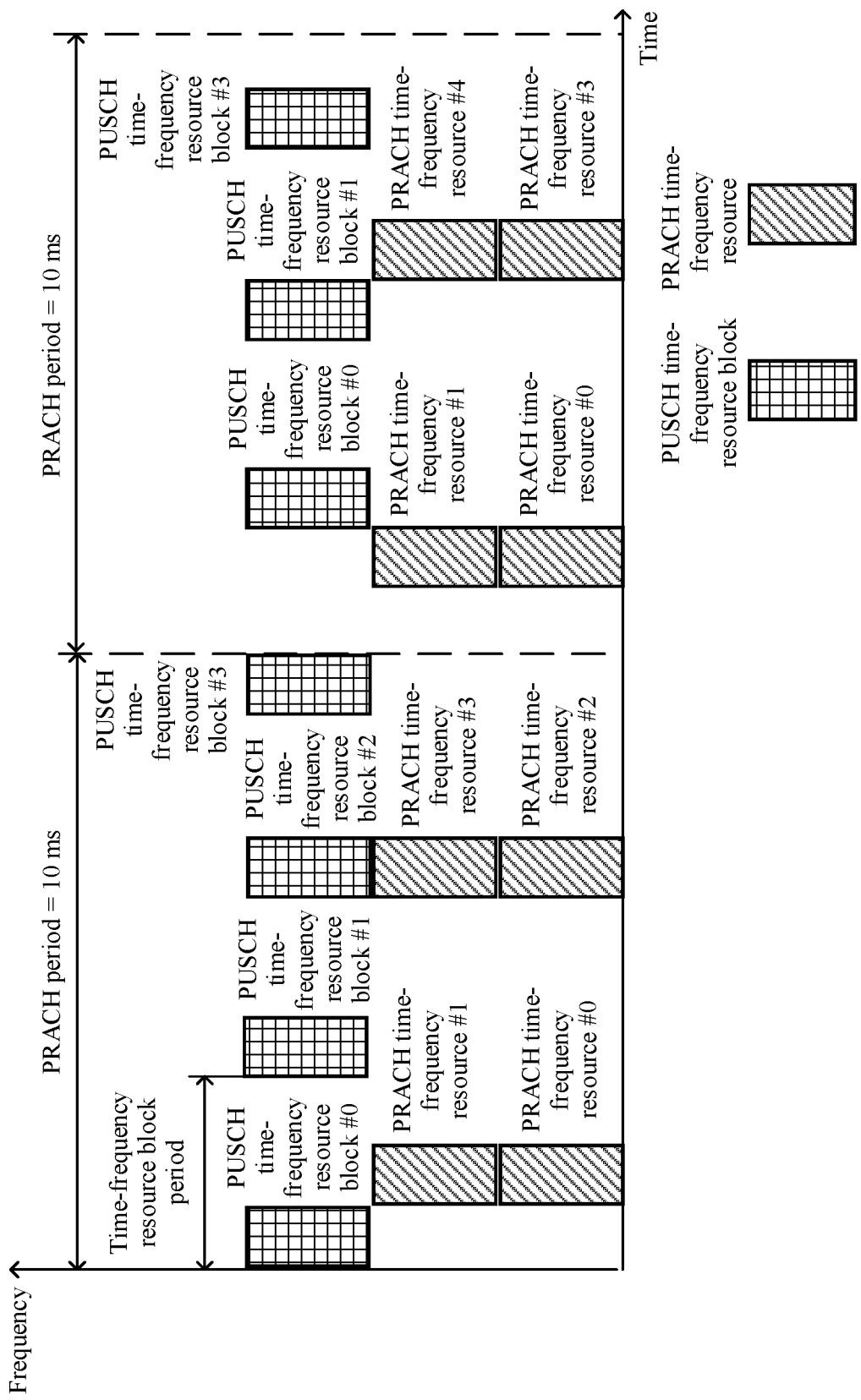
FIG. 15B is a schematic diagram of still another method for mapping between a PRACH time-frequency resource and a PUSCH time-frequency resource block according to an embodiment of this application.

It is assumed that the network device configures PUSCH time-frequency resource blocks shown in FIG. 15B based on the foregoing PUSCH time-frequency resource block configuration method. Each PRACH period includes four PRACH time-frequency resources. PUSCH time-frequency resource blocks included in PRACH periods may be different. As shown in FIG. 15B, one PRACH period includes four PUSCH time-frequency resource blocks, and the other PRACH period includes three PUSCH time-frequency resource blocks. According to the foregoing description, the order of the PUSCH time-frequency resource blocks may be determined based on the order of the sequence numbers of the time domain resources of the PUSCH time-frequency resource blocks. Herein, an example in which the PUSCH time-frequency resource blocks are sorted in ascending order of sequence numbers of time domain resources of the PUSCH time-frequency resource blocks is used for description.

Figure 16:
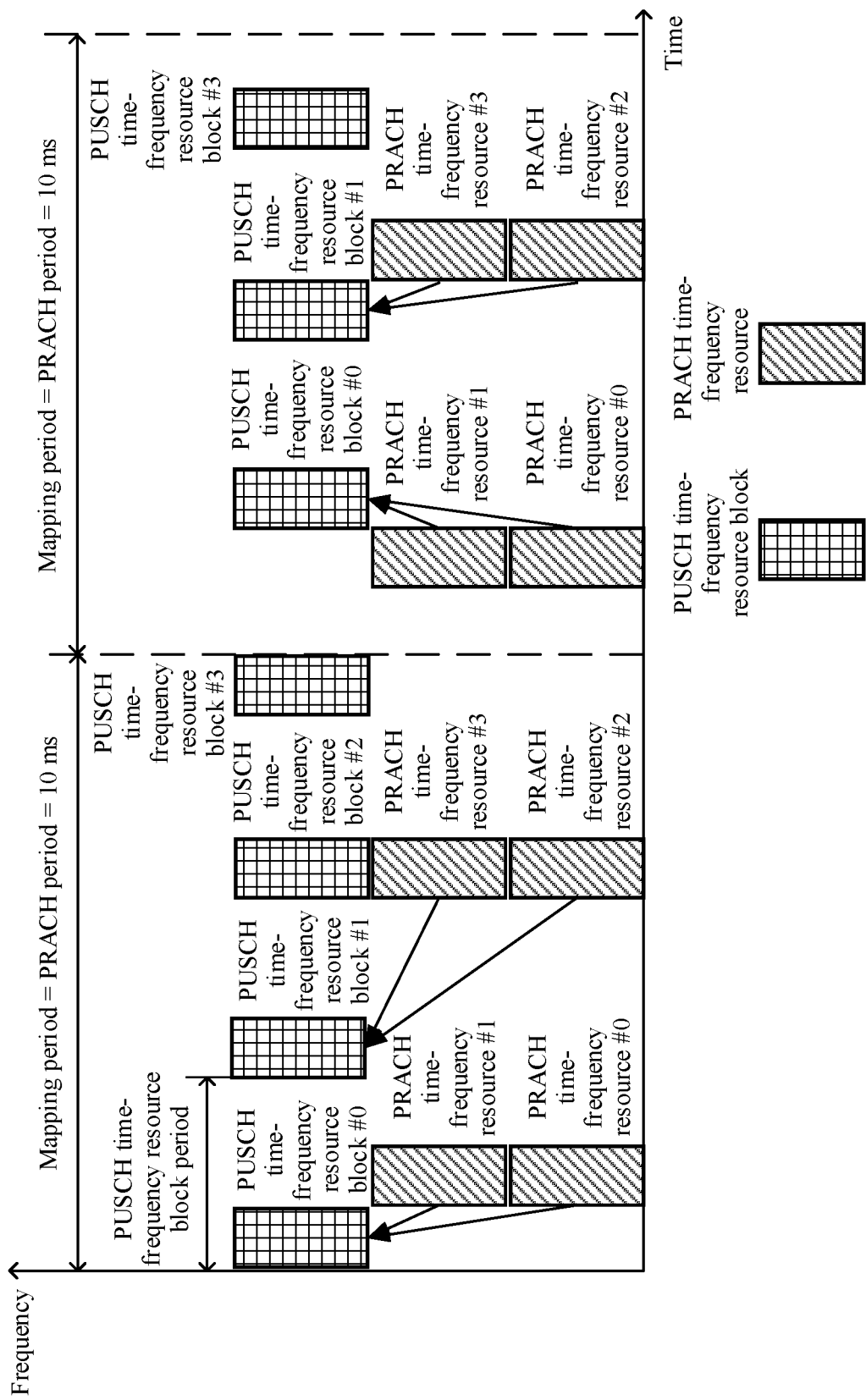
FIG. 16 is a schematic diagram of still another method for mapping between a PRACH time-frequency resource and a PUSCH time-frequency resource block according to an embodiment of this application.

For example, FIG. 16 shows mapping relationships between PRACH time-frequency resources and PUSCH time-frequency resource blocks in two mapping periods. It is assumed that the mapping period configured by the network device is the same as the PRACH period. When the network device configures $N_4=\frac{1}{2}$, it indicates that each PRACH resource is mapped to $\frac{1}{2}$ of a PUSCH time-frequency resource block, that is, every two PRACH time-frequency resources are mapped to one PUSCH time-frequency resource block. During specific mapping, in one mapping period, a PRACH time-frequency resource #0 and a PRACH time-frequency resource #1 are mapped to a PUSCH time-frequency resource block #0, and a PRACH time-frequency resource #2 and a PRACH time-frequency resource #3 are mapped to a PUSCH time-frequency resource block #1. A mapping method in the other mapping period is similar, and details are not described again.

In some embodiments, the second configuration information may further include information about some mapping rules. To be specific, the network device may further configure some mapping rules. For example, a PRACH time-frequency resource and a PUSCH time-frequency resource block to which the PRACH time-frequency resource is mapped and corresponds cannot overlap in time domain. For another example, a PRACH time-frequency resource and a PUSCH time-frequency resource block to which the PRACH time-frequency resource is mapped and corresponds cannot overlap in frequency domain. It may be understood that the mapping rule may alternatively be predefined, that is, does not need to be configured by the network device. This is not limited in the embodiments of this application.

In this case, the parameter $N_4$ is used to determine a quantity of valid PUSCH time-frequency resource blocks to which each PRACH time-frequency resource is mapped. The valid PUSCH time-frequency resource block is a PUSCH time-frequency resource block that meets the mapping rule. A method for mapping each PRACH time-frequency resource to a valid PUSCH time-frequency resource block is the same as the foregoing method, and details are not described herein again.

Figure 17:
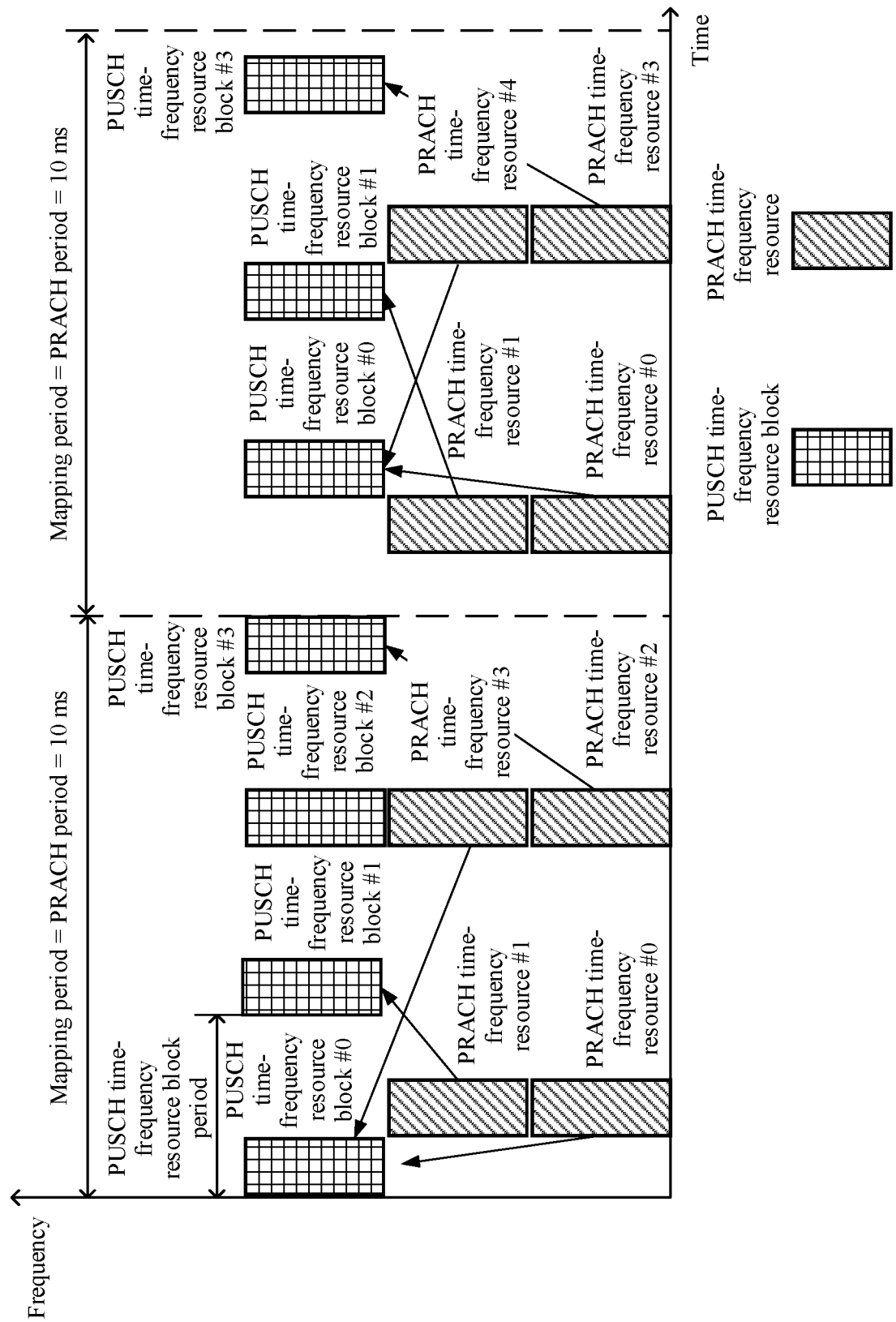
FIG. 17 is a schematic diagram of still another method for mapping between a PRACH time-frequency resource and a PUSCH time-frequency resource block according to an embodiment of this application.

For another example. FIG. 17 shows mapping relationships between PRACH time-frequency resources and PUSCH time-frequency resource blocks in two mapping periods. It is assumed that the mapping period configured by the network device is the same as the PRACH period, and the following mapping rule is configured: A PRACH time-frequency resource and a PUSCH time-frequency resource block to which the PRACH time-frequency resource is mapped and corresponds cannot overlap in time domain. When the network device configures $N_4=1$, it indicates that each PRACCH resource is mapped to one PUSCH time-frequency resource block. During specific mapping, in one mapping period, a PRACH time-frequency resource #0 is mapped to a PUSCH time-frequency resource block #0, and a PRACH time-frequency resource #1 is mapped to a PUSCH time-frequency resource block #1. A PRACH time-frequency resource #2 should be mapped to a PUSCH time-frequency resource block #2 according to the mapping order. However, because the PUSCH time-frequency resource block #2 and the PRACH time-frequency resource #2 are located in a same time domain, the PRACH PUSCH time-frequency resource block #2 is mapped backwards to the PUSCH time-frequency resource block #3. A PRACH time-frequency resource #3 is sequentially mapped to the PUSCH time-frequency resource block #0. A mapping method in the other mapping period is similar, and details are not described again.

It should be noted that when the network device configures $N_4>1$, a quantity of PUSCH time-frequency resource blocks included in one mapping period is usually two or more than two times of $N_4$. Therefore, for ease of description, an example in which one mapping period includes five PUSCH time-frequency resource blocks and one mapping period includes two PRACH time-frequency resources is used for description herein.

Figure 18:
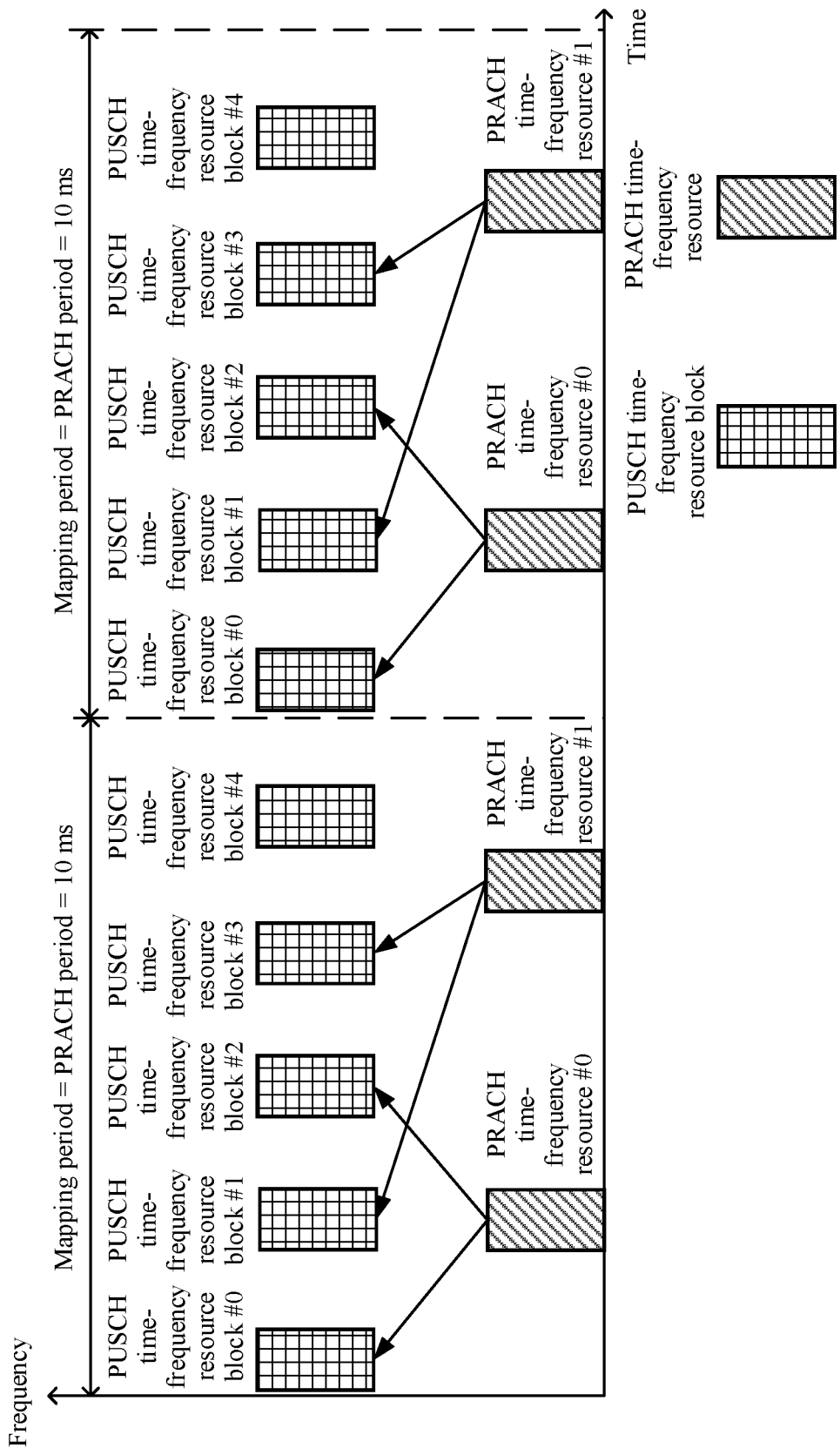
FIG. 18 is a schematic diagram of still another method for mapping between a PRACH time-frequency resource and a PUSCH time-frequency resource block according to an embodiment of this application.
Figure 19:
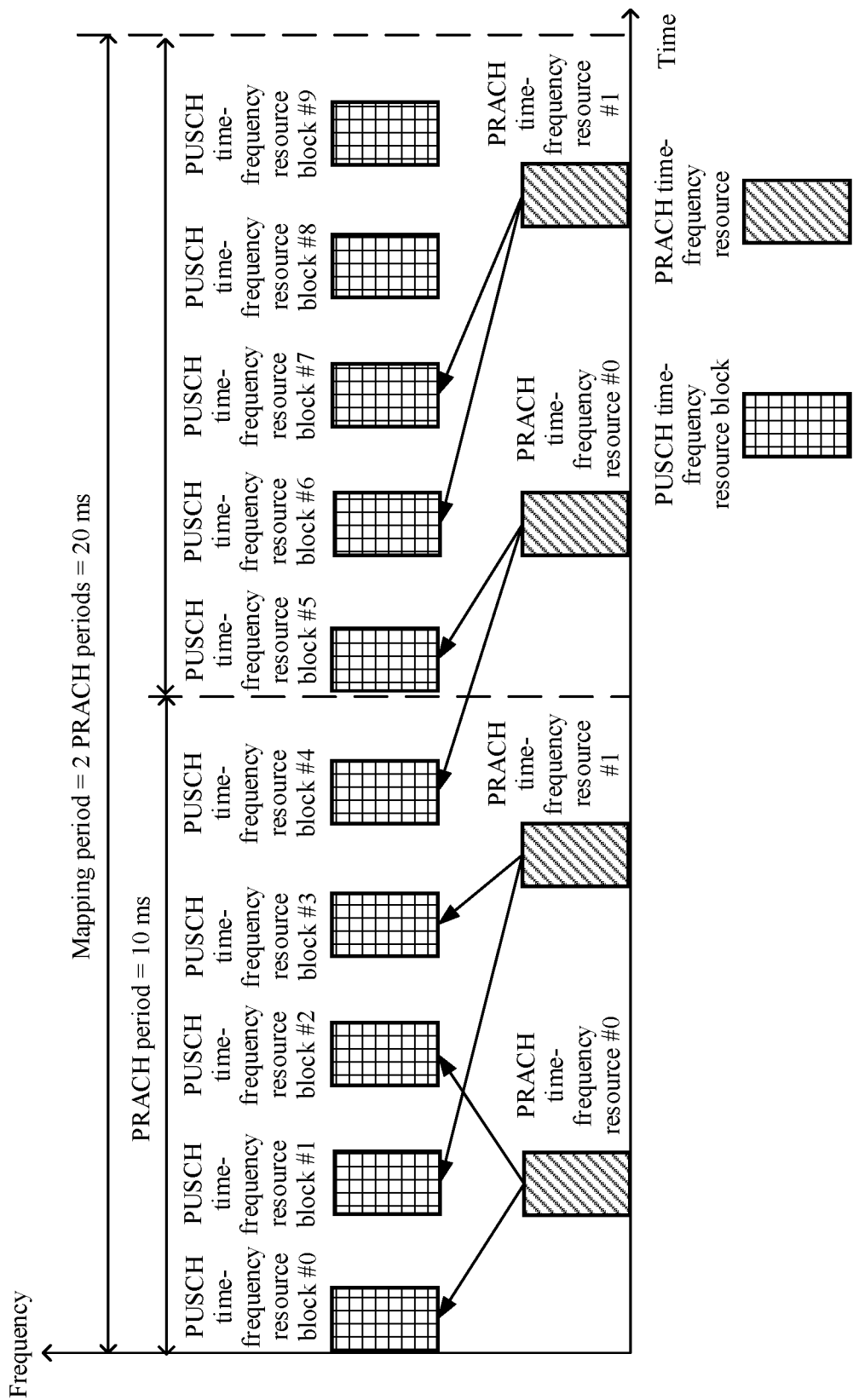
FIG. 19 is a schematic diagram of still another method for mapping between a PRACH time-frequency resource and a PUSCH time-frequency resource block according to an embodiment of this application.

For another example. FIG. 18 shows mapping relationships between PRACH time-frequency resources and PUSCH time-frequency resource blocks in two mapping periods. It is assumed that the mapping period configured by the network device is the same as the PRACH period. When the network device configures $N_4=2$, it indicates that each PRACH resource is mapped to two PUSCH time-frequency resource blocks. During specific mapping, in one mapping period, a PRACH time-frequency resource #0 is mapped to a PUSCH time-frequency resource block #0 and a PUSCH time-frequency resource block #1, and a PRACH time-frequency resource #1 is mapped to a PUSCH time-frequency resource block #2 and a PUSCH time-frequency resource block #3. A mapping method in the other mapping period is similar, and details are not described again.

FIG. 16 to FIG. 18 are all described by using an example in which a mapping period is the same as a PRACH period (a period of a PRACH time-frequency resource). The mapping period mentioned above may also be an integer multiple of the PRACH period. In this case, during mapping, all PRACHs in the mapping period are mapped according to the preset order of mapping from PRACH time-frequency resources to PUSCH time-frequency resource blocks and an order of PUSCH time-frequency resource blocks. Mapping methods are similar, and an example in which the mapping period is twice the PRACH period is used below for description.

For another example, except that the mapping period is twice the PRACH period, that is, the mapping period is 20 ms, other configuration information is the same as that in FIG. 16. It should be noted that sequence numbers of the PUSCH time-frequency resource blocks change in the second PRACH period. In this case, during specific mapping, a mapping relationship for PRACH time-frequency resources in the first PRACH period is the same as that in FIG. 16, and details are not described again. In the second PRACH period, the PRACH time-frequency resource #0 is mapped to a time-frequency resource #4 and a time-frequency resource #6, and the PRACH time-frequency resource #1 is mapped to the time-frequency resource #6 and a time-frequency resource #7.

In conclusion, when the network device configures $N_4<1$, it indicates that $1/N_4$ PRACH time-frequency resources are mapped to one PUSCH time-frequency resource block. When the network device configures $N_4=1$, it indicates that one PRACH resource is mapped to one PUSCH time-frequency resource block. When the network device configures $N_4>1$, it indicates that one PRACH time-frequency resource is mapped to $N_4$ PUSCH time-frequency resource blocks.

When the predefined rule for determining the PRACH time-frequency resource group is by default that each PRACH time-frequency resource is a PRACH time-frequency resource group, for example, in FIG. 16 to FIG. 19, a PRACH time-frequency resource #n forms a PRACH time-frequency resource group #n, and an order of PRACH time-frequency resource groups is the same as that of PRACH time-frequency resources.

When the predefined rule for determining the PRACH time-frequency resource group is that PRACH time-frequency resources located in a same PRACH time domain resource form a PRACH time-frequency resource group, or that PRACH time-frequency resources located in a same slot may form a PRACH time-frequency resource group, for example, in FIG. 16 and FIG. 17, because the PRACH time domain resource #0 and the PRACH time domain resource #1 are located on a same PRACH time domain resource, and are located in a same slot, the PRACH time-frequency resource #0 and the PRACH time-frequency resource #1 may form a PRACH time-frequency resource group: because the PRACH time domain resource #2 and the PRACH time domain resource #3 are located on a same PRACH time domain resource, and are located in a same slot, the PRACH time-frequency resource #2 and the PRACH time-frequency resource #3 may form a PRACH time-frequency resource group. For another example, in FIG. 18 and FIG. 19, all PRACH time-frequency resources are located on different PRACH time domain resources, and are located in different slots. Therefore, a PRACH time-frequency resource #n forms a PRACH time-frequency resource group #n, and an order of PRACH time-frequency resource groups is the same as an order of PRACH time-frequency resources.

When the predefined rule for determining the PRACH time-frequency resource group is that PRACH time-frequency resources that use a same mapping 2-tuple may form one PRACH time-frequency resource group, for example, when $N_1<1$, as shown in FIG. 16, because the PRACH time-frequency resource #0 and the PRACH time-frequency resource #1 are mapped to a same PUSCH time-frequency resource block, the PRACH time-frequency resource #0 and the PRACH time-frequency resource #1 may form a PRACH time-frequency resource group, which is a PRACH time-frequency resource group #0; and the PRACH time-frequency resource #2 and the PRACH time-frequency resource #3 may form a PRACH time-frequency resource group, which is a PRACH time-frequency resource group #1. For another example, when $N_1=1$, as shown in FIG. 17, each PRACH time-frequency resource in the mapping period may be one PRACH time-frequency resource group, and an order of PRACH time-frequency resource groups is the same as an order of PRACH time-frequency resources. For another example, when $N_1>1$, as shown in FIG. 8, each PRACH time-frequency resource in the mapping period may be one PRACH time-frequency resource group, and an order of PRACH time-frequency resource groups is the same as an order of PRACH time-frequency resources.

In another possible implementation of the second method, the second configuration information may further include a parameter $N_5$ and a parameter $N_6$.

In this implementation, the network device may configure, by using the parameter $N_5$ in the second configuration information, a quantity of PRACH time-frequency resources included in each PRACH time-frequency resource group, and then, establish a mapping relationship between a PRACH time-frequency resource group and a PUSCH time-frequency resource block by using the parameter $N_6$.

Specifically, the parameter $N_5$ is used to determine the quantity of PRACH time-frequency resources included in each PRACH time-frequency resource group. In this case, the UE may determine each PRACH time-frequency resource group according to a preset order of the PRACH time-frequency resources and according to a rule that every $N_5$ PRACH time-frequency resources form one PRACH time-frequency resource group.

It should be noted that after the PRACH time-frequency resource group is determined, an order of PRACH time-frequency resource groups may be further determined in an order of PRACH time-frequency resources included in the PRACH time-frequency resource groups. To be specific, the order of the PRACH time-frequency resource groups may be determined based on an order of frequency domain resources and an order of time domain resources of the included PRACH time-frequency resources. For example, the PRACH time-frequency resource groups may be sorted in ascending order of frequency domain resources of the included PRACH time-frequency resources, and then in ascending order of time domain resources of the included PRACH time-frequency resources. The order of the PRACH time-frequency resource groups herein is similar to the order of the PRACH time-frequency resources, and details are not described herein again.

The parameter $N_6$ is used to determine a quantity of PUSCH time-frequency resource blocks to which each PRACH time-frequency resource group is mapped.

In a mapping period, each PRACH time-frequency resource group is mapped according to a preset order of mapping from PRACH time-frequency resources to PUSCH time-frequency resource blocks. The preset order of mapping from PRACH time-frequency resources to PUSCH time-frequency resource blocks may be that mapping is performed according to sequence numbers of PRACH time-frequency resource groups.

It may be understood that, when PUSCH time-frequency resource blocks are determined, an order of the PUSCH time-frequency resource blocks is also determined, and may be determined according to an order of time domain resources occupied by the PUSCH time-frequency resource blocks. For example, the PUSCH time-frequency resource blocks may be sorted in ascending order of the time domain resources occupied by the PUSCH time-frequency resource blocks.

In this case, when each PRACH time-frequency resource group is mapped to $N_6$ PUSCH time-frequency resource blocks, that mapping is performed in the preset order of mapping from PRACH time-frequency resources to PUSCH time-frequency resource blocks includes at least two meanings: First is a mapping order of all PRACH time-frequency resource groups, that is, which PRACH time-frequency resource group is mapped first, and which PRACH time-frequency resource group is mapped later. Second is $N_6$ PUSCH time-frequency resource blocks to which each PRACH time-frequency resource group is mapped according to an order of the PUSCH time-frequency resource blocks, that is, specific $N_6$ PUSCH time-frequency resource blocks to which each PRACH time-frequency resource is specifically mapped during mapping.

It should be noted that, in one mapping period, when a quantity of PRACH time-frequency resource groups is greater than a quantity of PUSCH time-frequency resource blocks, it means that when the PRACH time-frequency resource groups are mapped according to a preset mapping order, the PRACH time-frequency resource groups are recurrently mapped to the PUSCH time-frequency resource blocks, until each PRACH time-frequency resource group in the mapping period is mapped to at least one PUSCH time-frequency resource block.

In some embodiments, the second configuration information may further include information about some mapping rules. To be specific, the network device may further configure some mapping rules. For example, a PRACH time-frequency resource group and a PUSCH time-frequency resource block to which the PRACH time-frequency resource group is mapped and corresponds cannot overlap in time domain. For another example, a PRACH time-frequency resource group and a PUSCH time-frequency resource block to which the PRACH time-frequency resource group is mapped and corresponds cannot overlap in frequency domain. It may be understood that the mapping rule may alternatively be predefined, that is, does not need to be configured by the network device. This is not limited in the embodiments of this application.

In this case, the parameter $N_5$ is used to determine a quantity of valid PUSCH time-frequency resource blocks to which each PRACH time-frequency resource group is mapped. The valid PUSCH time-frequency resource block is a PUSCH time-frequency resource block that meets the mapping rule. A method for mapping each PRACH time-frequency resource group to a valid PUSCH time-frequency resource block is the same as the foregoing method, and details are not described herein again.

For example, referring to FIG. 16, it is assumed that PRACH time-frequency resources and PUSCH time-frequency resource blocks are configured as in FIG. 16. In this case, when the network device configures $N_5=2$ and $N_6=1$, it indicates that every two PRACH time-frequency resources form one PRACH time-frequency resource group, and each resource group is mapped to one PUSCH time-frequency resource block. Therefore, it may be determined that in the first mapping period, a PRACH time-frequency resource #0 and a PRACH time-frequency resource #1 form a PRACH time-frequency resource group #0, and a PRACH time-frequency resource #2 and a PRACH time-frequency resource #3 form a PRACH time-frequency resource group #1. During mapping, the PRACH time-frequency resource group #0 is mapped to a PUSCH time-frequency resource block #0, and the PRACH time-frequency resource group #2 is mapped to a PUSCH time-frequency resource block #1. Mapping in the second mapping period is similar, and details are not described again.

For another example, referring to FIG. 17, it is assumed that PRACH time-frequency resources and PUSCH time-frequency resource blocks are configured as in FIG. 17, and the network device configures a mapping rule: A PRACH time-frequency resource group and a PUSCH time-frequency resource block to which the PRACH time-frequency resource group is mapped cannot be in a same time domain. In this case, when the network device configures $N_5=1$ and $N_6=1$, it indicates that each PRACH time-frequency resource forms one PRACH time-frequency resource group, and each resource group is mapped to one PUSCH time-frequency resource block. Therefore, it may be determined that in the first mapping period, a PRACH time-frequency resource #0 forms a PRACH time-frequency resource group #0 and is mapped to a PUSCH time-frequency resource block #0, a PRACH time-frequency resource #1 forms a PRACH time-frequency resource group #1 and is mapped to a PUSCH time-frequency resource block #1, a PRACH time-frequency resource #2 forms a PRACH time-frequency resource group #2 and is mapped to a PUSCH time-frequency resource block #3, and a PRACH time-frequency resource #3 forms a PRACH time-frequency resource group #3 and is mapped to a PUSCH time-frequency resource block #1. Mapping in the second mapping period is similar, and details are not described again.

For another example, referring to FIG. 18, it is assumed that PRACH time-frequency resources and PUSCH time-frequency resource blocks are configured as in FIG. 18, and the network device configures a mapping rule: A PRACH time-frequency resource group and a PUSCH time-frequency resource block to which the PRACH time-frequency resource group is mapped cannot be in a same time domain. In this case, when the network device configures $N_5=1$ and $N_6=2$, it indicates that each PRACH time-frequency resource forms one PRACH time-frequency resource group, and each resource group is mapped to two PUSCH time-frequency resource blocks. Therefore, it may be determined that in the first mapping period, a PRACH time-frequency resource #0 forms a PRACH time-frequency resource group #0 and is mapped to a PUSCH time-frequency resource block #0 and a PUSCH time-frequency resource block #2, and a PRACH time-frequency resource #1 forms a PRACH time-frequency resource group #1, and is mapped to a PUSCH time-frequency resource block #1 and a PUSCH time-frequency resource block #3. Mapping in the second mapping period is similar, and details are not described again.

In still another possible implementation of the second method, the second configuration information may further include a parameter $N_7$ and information about the second mapping pattern.

In this implementation, the network device may configure, by using the parameter $N_7$ in the second configuration information, a quantity of PRACH time-frequency resources included in each PRACH time-frequency resource group, and then, establish a mapping relationship between a PRACH time-frequency resource group and a PUSCH time-frequency resource block by using the second mapping pattern.

Specifically, the parameter $N_7$ is used to determine the quantity of PRACH time-frequency resources included in each PRACH time-frequency resource group. A meaning and a function of the parameter $N_7$ are the same as those of the parameter $N_5$ in the foregoing implementation, and details are not described herein again.

After configured PRACH time-frequency resources are grouped into PRACH time-frequency resource groups based on the parameter $N_7$, that is, after the PRACH time-frequency resource groups are determined, the PRACH time-frequency resource groups may be mapped.

The second mapping pattern is used to determine at least one PUSCH time-frequency resource block. For example, the second mapping pattern may be one or more sequence number sets, and each sequence number set includes sequence numbers of one or more PUSCH time-frequency resource blocks. As described above, when each PUSCH time-frequency resource block is determined, an order of time-frequency blocks is also determined. In this case, sequence numbers of the PUSCH time-frequency resource blocks may be determined based on the order of the PUSCH time-frequency resource blocks. For example, the sequence numbers of the PUSCH time-frequency resource blocks may be sorted in ascending order of time domain resources of the PUSCH time-frequency resource blocks.

Figure 20:
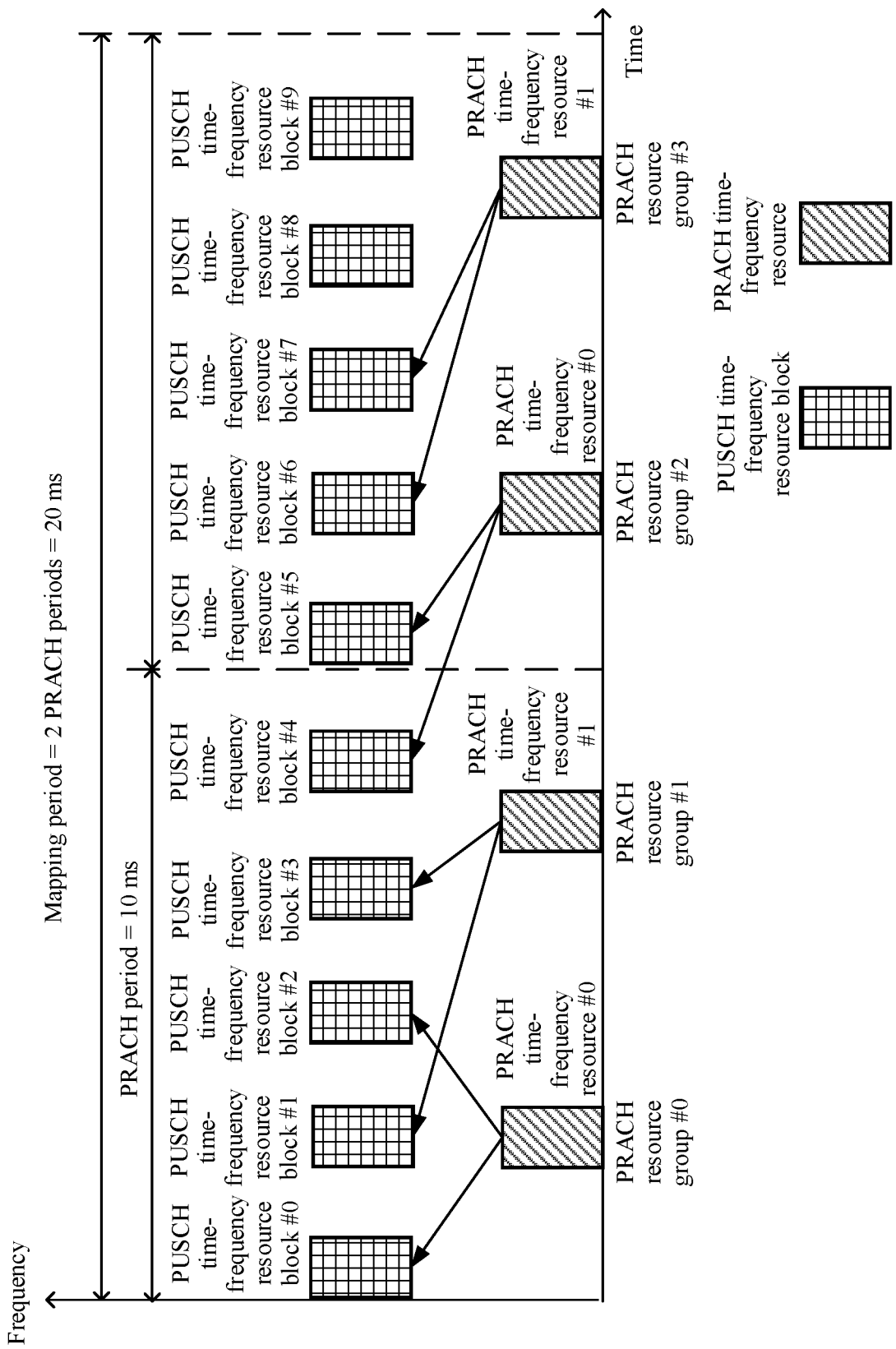
FIG. 20 is a schematic diagram of still another method for mapping between a PRACH time-frequency resource and a PUSCH time-frequency resource block according to an embodiment of this application.

For example, referring to FIG. 20, it is assumed that PRACH time-frequency resources and PUSCH time-frequency resource blocks are configured as in FIG. 20, and a mapping period configured by the network device is twice a PRACH period. When the network configures $N_7=1$, the second mapping pattern is {(#0, #2), (#1, #3), (#4, #5), (#6, #7)} In this case, during specific mapping, in a mapping period, each PRACH time-frequency resource forms one PRACH time-frequency resource group, to obtain a PRACH time-frequency resource group #0 to a PRACH time-frequency resource group #3. Then, mapping is performed in an order of mapping sequence numbers in the second mapping pattern. To be specific, a PRACH time-frequency resource group #0 is mapped to a PUSCH time-frequency resource block #0 and a PUSCH time-frequency resource block #2 by using the first sequence number set, a PRACH time-frequency resource group #1 is mapped to a PUSCH time-frequency resource block #1 and a PUSCH time-frequency resource block #3 by using the second sequence number set, a PRACH time-frequency resource group #2 is mapped to a PUSCH time-frequency resource block #4 and a PUSCH time-frequency resource block #5 by using the third sequence number set, and a PRACH time-frequency resource group #3 is mapped to a PUSCH time-frequency resource block #6 and a PUSCH time-frequency resource block #7 by using the fourth sequence number set.

3. Third Configuration Information

It can be learned from the foregoing description that the mapping relationship between the PRACH time-frequency resource group and the PUSCH time-frequency resource block may be finally determined based on the first configuration information and the second configuration information. Further, the network device may establish a mapping relationship between a preamble sequence in the PRACH time-frequency resource group and each PUSCH time-frequency resource in the PUSCH time-frequency resource block by configuring the third configuration information. Because the PRACH time-frequency resource group may include one or more PRACH time-frequency resources, there may be a plurality of cases for a quantity of preamble sequences included in each PRACH time-frequency resource group. Therefore, the third configuration information is configured by using the method, so that the mapping relationship between the preamble sequence and the PUSCH time-frequency resource can be more flexibly established, thereby satisfying a plurality of requirements.

Certainly, it may be understood that, it may also be learned from the foregoing description that a mapping relationship between a PRACH time-frequency resource and a PUSCH time-frequency resource block may be determined based on the first configuration information and the second configuration information. In this case, the network device may directly establish, by using the third configuration information, a mapping relationship between a PUSCH time-frequency resource and a preamble sequence included in each PRACH time-frequency resource. A specific method for configuring the third configuration information is similar.

The method for configuring the third configuration information is described below by using an example in which the network device configures the mapping relationship between the preamble sequence in the PRACH time-frequency resource group and each PUSCH time-frequency resource in the PUSCH time-frequency resource block.

Specifically, a preamble sequence included in each PRACH time-frequency resource group and a PUSCH time-frequency resource included in each PUSCH time-frequency resource block need to be first determined.

It can be learned from the foregoing descriptions of the first configuration information that a preamble sequence set in each PRACH time-frequency resource, that is, a preamble sequence included in each PRACH time-frequency resource, may be determined based on the first configuration information. In addition, the PRACH time-frequency resource included in each PRACH time-frequency resource group may be determined based on the second configuration information. In this case, information about a preamble sequence included in each PRACH time-frequency resource group may be determined.

In some embodiments, the third configuration information may include information about a size of each PUSCH time-frequency resource in a PUSCH time-frequency resource block. The information about the size of each PUSCH time-frequency resource may be, for example, a quantity of consecutive symbols occupied by the PUSCH time-frequency resource or a quantity of consecutive RBs occupied by the PUSCH time-frequency resource. In this case, each PUSCH time-frequency resource may be determined based on the size of each PUSCH time-frequency resource, an order of time domain resources, and an order of frequency domain resources.

Optionally, the third configuration information may further include a time domain interval or a frequency domain interval between adjacent PUSCH time-frequency resources. In other words, in the third configuration information, whether PUSCH time-frequency resources in the PUSCH time-frequency resource block are consecutive and an interval in case of nonconsecutive PUSCH time-frequency resources may be further configured. For example, if both the time domain interval and the frequency domain interval are zero, or the third configuration information does not include information about the time domain interval or the frequency domain interval, it may be considered that the PUSCH time-frequency resources are consecutive in time domain and frequency domain. Alternatively, if only the time domain interval is zero or information about the time domain interval is defaulted, it may be considered that the PUSCH time-frequency resources are consecutive in time domain. Alternatively, if only the frequency domain interval is zero or information about the frequency domain interval is defaulted, it may be considered that the PUSCH time-frequency resources are consecutive in frequency domain.

In the embodiments, the terminal may determine each PUSCH time-frequency resource based on the information about the size of the PUSCH time-frequency resource, the time domain interval, and the frequency domain interval that are configured in the third configuration information, the order of time domain resources, and the order of frequency domain resources.

In some other embodiments, the third configuration information may include a quantity of PUSCH time-frequency resources included in each PUSCH time-frequency resource block. The quantity of PUSCH time-frequency resources included in each PUSCH time-frequency resource block may include, for example, a quantity in time domain and a quantity in frequency domain. In this case, each PUSCH time-frequency resource may be determined based on the quantity in time domain, the quantity in frequency domain, an order of time domain resources, and an order of frequency domain resources. A method for determining a PUSCH time-frequency resource in each PUSCH time-frequency resource block is not limited in the embodiments of this application.

It can be learned from the foregoing descriptions of the second configuration information that the second configuration information may include the quantity of DMRS ports associated with each PUSCH time-frequency resource block. If the second configuration information does not include the quantity of DMRS ports, it may be considered by default that the quantity of DMRS ports associated with each PUSCH time-frequency resource block is 1.

The quantity of DMRS ports may be determined based on parameters such as a DMRS configuration type and a quantity of time domain symbols occupied by a DMRS. In other words, the network device may not need to perform configuration. This is not limited in the embodiments of this application.

After the preamble sequence included in each PRACH time-frequency resource group and the time-frequency resource included in each PUSCH time-frequency resource block are separately determined, a mapping relationship between each preamble sequence and each PUSCH time-frequency resource may be further established based on the third configuration information.

In some embodiments, the third configuration information includes one size of time-frequency resources. In other words, sizes of PUSCH time-frequency resources included in all PUSCH time-frequency resource blocks are the same. In this case, the third configuration information may include that every $N_8$ preamble sequences are mapped to one PUSCH time-frequency resource.

When $N_8<1$, one preamble sequence is mapped to $1/N_8$ PUSCH time-frequency resources with consecutive sequence numbers. When $N_8=1$, one preamble sequence is mapped to one PUSCH time-frequency resource with consecutive sequence numbers. When $N_8>1$, $N_8$ preamble sequences are mapped to one PUSCH time-frequency resource with consecutive sequence numbers.

In this case, when a mapping relationship is established between a preamble sequence in each PRACH time-frequency resource and a PUSCH time-frequency resource in a corresponding PUSCH time-frequency resource block, mapping may be performed based on the parameter $N_8$, an order of preamble sequences, and an order of PUSCH time-frequency resources.

The order of the preamble sequences may be understood as an order of frequency domain resources and time-frequency resources occupied by the preamble sequences. For example, the preamble sequences may be sorted first in ascending order of sequence numbers of the frequency domain resources and then in ascending order of sequence numbers of the time domain resources.

The order of the time-frequency resources may be understood as an order of frequency domain resources occupied by the time-frequency resources, an order of time domain resources occupied by the time-frequency resources, and an order of sequence numbers of DMRS ports associated with the time-frequency resources. For example, the time-frequency resources may be sorted in ascending order of the sequence numbers of the DMRS ports associated with the time-frequency resources, in ascending order of the frequency domain resources, and then in ascending order of the time domain resources. For another example, the time-frequency resources may be sorted in ascending order of the sequence numbers of the DMRS ports associated with the time-frequency resources, in ascending order of the time domain resources, and then in ascending order of the frequency domain resources.

Figure 21:
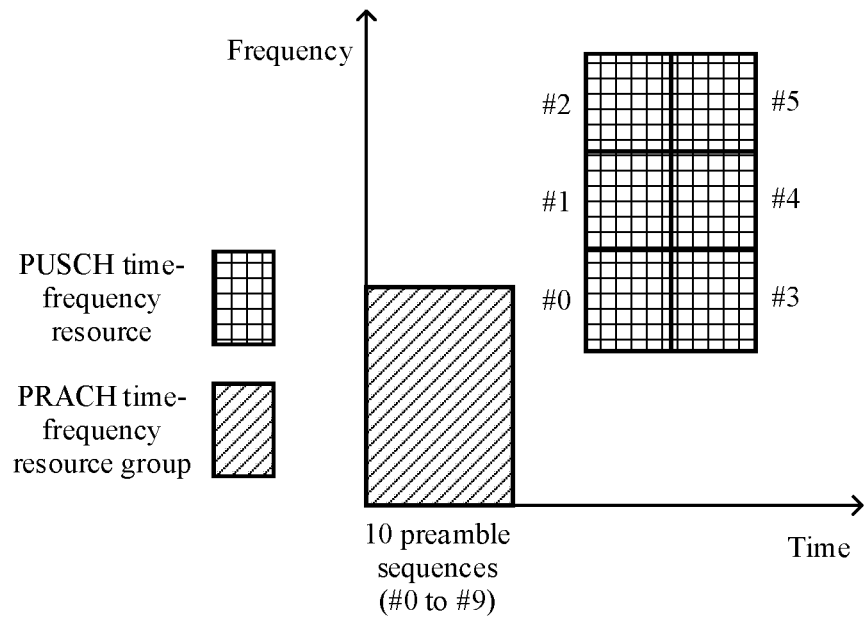
FIG. 21 is a schematic diagram of a method for mapping between a preamble sequence and a PUSCH time-frequency resource according to an embodiment of this application.

For example, referring to FIG. 21, it is assumed that one PRACH time-frequency resource group includes 10 preamble sequences, which are a preamble sequence #0 to a preamble sequence #9. In addition, a PUSCH time-frequency resource block corresponding to the PRACH time-frequency resource includes six PUSCH time-frequency resources of a same size, and a quantity of DMRS ports associated with the PUSCH time-frequency resource block is 8. In addition, in the third configuration information, $N_8=2$. In other words, every two preamble sequences are mapped to one PUSCH time-frequency resource. In this case, a specific mapping relationship is as follows:

the preamble sequence #0 is mapped to a PUSCH time-frequency resource #0: a DMRS port #0 to a DMRS port #3;
the preamble sequence #1 is mapped to the PUSCH time-frequency resource #0: a DMRS port #4 to a DMRS port #7;
the preamble sequence #2 is mapped to a PUSCH time-frequency resource #1: a DMRS port #0 to a DMRS port #3;
the preamble sequence #3 is mapped to the PUSCH time-frequency resource #1: a DMRS port #4 to a DMRS port #7;
the preamble sequence #8 is mapped to a PUSCH time-frequency resource #4: a DMRS port #0 to a DMRS port #3; and
the preamble sequence #9 is mapped to the PUSCH time-frequency resource #4: a DMRS port #4 to a DMRS port #7.

A PUSCH time-frequency resource #5 does not participate in mapping, and is not used to transmit an MsgA message in a two-step random access procedure.

In this embodiment, when $N_8>1$, that is, every $N_8$ preamble sequences are mapped to one PUSCH time-frequency resource, and a quantity of DMRS ports of the PUSCH time-frequency resource is E (E is an integer greater than 1), mapping may be performed in an order of the $N_8$ preamble sequences and an order of the DMRS ports associated with the PUSCH time-frequency resource.

In some examples, the DMRS ports associated with the PUSCH time-frequency resource may be divided into $N_8$ parts based on the order of the DMRS ports associated with the PUSCH time-frequency resource, and each part is sequentially corresponding to one preamble sequence.

For example, in the mapping method shown in FIGS. 21, $N_8=2$, and E=8. That is, every two preamble sequences are mapped to one PUSCH time-frequency resource. A quantity of DMRS ports associated with each PUSCH time-frequency resource is 8, the DMRS ports associated with each PUSCH time-frequency resource are divided into two parts based on sequence numbers of the DMRS ports, and each part corresponds to one preamble sequence. To be specific, the preamble sequence #0 is mapped to the PUSCH time-frequency resource #0: the DMRS port #0 to the DMRS port #3: the preamble sequence #1 is mapped to the PUSCH time-frequency resource #0: the DMRS port #4 to the DMRS port #7. Mapping of other preamble sequences is similar, and details are not described again.

In some other examples, recurrent mapping may alternatively be performed in a one-to-one manner based on the order of the preamble sequences and an order of sequence numbers of the DMRS ports, until each of the $N_8$ preamble sequences is mapped to at least one DMRS port sequence number. To be specific, in every $N_8$ preamble sequences, a preamble sequence #n is mapped to a DMRS port #(n mod E) of a PUSCH time-frequency resource corresponding to the $N_8$ preamble sequences.

For example, $N_8=5$, and E=4. To be specific, every five preamble sequences need to be mapped to one PUSCH time-frequency resource block, and each PUSCH time-frequency resource block is associated with four DMRS ports. During specific mapping, a preamble sequence #0 is mapped to a DMRS port #0, a preamble sequence #1 is mapped to a DMRS port #1, . . . , and a preamble sequence #4 is mapped to a DMRS port #4. In this case, a preamble sequence #5 does not participate in mapping. Therefore, recurrent mapping is performed, and the preamble sequence #5 is mapped to the DMRS port #0.

For another example, $N_8=3$, and E=8. To be specific, every three preamble sequences need to be mapped to one PUSCH time-frequency resource block, and each PUSCH time-frequency resource block is associated with eight DMRS ports. During specific mapping, a preamble sequence #0 is mapped to a DMRS port #0, a preamble sequence #1 is mapped to a DMRS port #1, and a preamble sequence #2 is mapped to a DMRS port #2.

In still some other examples, recurrent mapping may alternatively be performed in a one-to-one manner based on the order of the preamble sequences and an order of sequence numbers of the DMRS ports, until each DMRS port of each PUSCH time-frequency resource block is mapped to at least one preamble sequence. In this case, when $N_8<E$, a preamble sequence #n in every $N_8$ preamble sequences is mapped to a DMRS port #($N_8$*i+n) of a PUSCH time-frequency resource corresponding to the $N_8$ preamble sequences, where a value of i is an integer greater than or equal to 0 and less than $$\frac{E-n}{N_8}.$$

For example, $N_8=3$, and E=4. To be specific, every three preamble sequences need to be mapped to one PUSCH time-frequency resource block, and each PUSCH time-frequency resource block is associated with four DMRS ports. During specific mapping, a preamble sequence #0 is mapped to a DMRS port #0, a preamble sequence #1 is mapped to a DMRS port #1, and a preamble sequence #2 is mapped to a DMRS port #2. In this case, a DMRS port #3 does not participate in mapping. Therefore, recurrent mapping is performed, and the preamble sequence #0 is mapped to the DMRS port #3.

It can be learned from the foregoing description that the third configuration information may include the parameter $N_8$, used to indicate that the $N_8$ preamble sequences are mapped to one PUSCH time-frequency resource. That is, the preamble sequence is mapped to the PUSCH time-frequency resource. In some other embodiments, the preamble sequence may also be mapped to a PUSCH resource unit. The PUSCH resource unit is a smaller granularity than the PUSCH time-frequency resource. For example, if a quantity of DMRSs associated with one PUSCH time-frequency resource is E, the PUSCH time-frequency resource may be considered as E PUSCH resource units.

In other words, the third configuration information may include a parameter F, and the parameter F is used to indicate that every F preamble sequences are mapped to one PUSCH resource unit. One PUSCH resource unit may be understood as one PUSCH time-frequency resource and a DMRS port corresponding to the PUSCH resource unit. The DMRS port may be understood as having different DMRS configurations and/or different DMRS sequences.

It may be understood that when $N_8=F*E$, mapping every $N_8$ preamble sequences to one PUSCH time-frequency resource is equivalent to mapping every F preamble sequences to one PUSCH resource unit. E represents a quantity of DMRS ports associated with one PUSCH time-frequency resource.

Further, when a mapping relationship is established between a preamble sequence in each PRACH time-frequency resource group and a PUSCH time-frequency resource in a corresponding PUSCH time-frequency resource block, mapping may be performed based on the parameter F, an order of preamble sequences, and an order of PUSCH resource units.

It should be noted that, in a PRACH time-frequency resource, because preamble sequences have their own default sequence order, based on the default sequence order of the preamble sequences in the PRACH time-frequency resource, an order of the preamble sequences may be understood as further including an order of PRACH time-frequency resources occupied by the preamble sequences. For example, the preamble sequences may be sorted, based on the default sequence order of the preamble sequences in the PRACH time-frequency resource, first in ascending order of sequence numbers of frequency domain resources of the PRACH time-frequency resources occupied by the preamble sequences, and then in ascending order of sequence numbers of time domain resources of the PRACH time-frequency resources.

The order of the PUSCH resource units may be understood as an order of PUSCH time-frequency resources and an order of sequence numbers of DMRS ports associated with each of the PUSCH time-frequency resources. For example, the PUSCH resource units may be sorted in ascending order of the sequence numbers of the DMRS ports associated with each of the PUSCH time-frequency resources, and then in ascending order of sequence numbers of the PUSCH time-frequency resources. For another example, the PUSCH resource units may be sorted first in ascending order of sequence numbers of the PUSCH time-frequency resources, and then in ascending order of the sequence numbers of the DMRS ports.

For example, when the PUSCH resource units are sorted first in ascending order of the sequence numbers of the DMRS ports associated with the PUSCH time-frequency resources, and then in ascending order of the sequence numbers of the PUSCH time-frequency resources, an index of a PUSCH time-frequency resource corresponding to a PUSCH resource unit #a is $$\left\lfloor \frac{a}{E} \right\rfloor,$$

and an index of a corresponding DMRS port is a mod E. [X] represents a maximum integer less than or equal to X.

For example, there are two PUSCH time-frequency resources, and each PUSCH time-frequency resource corresponds to two DMRS ports. In this case, the two PUSCH time-frequency resources include four PUSCH resource units. An order of the four PUSCH resource units may be shown in Table 9. The four PUSCH resource units are numbered first in ascending order of sequence numbers of the DMRS ports and then in ascending order of sequence numbers of the time-frequency resources.

TABLE 9

| PUSCH resource | PUSCH time-frequency | DMRS port |
|---|---|---|
| unit #0 | resource #0 | #0 |
| PUSCH resource unit #1 | PUSCH time-frequency resource #0 | DMRS port #1 |
| PUSCH resource unit #2 | PUSCH time-frequency resource #1 | DMRS port #0 |
| PUSCH resource unit #3 | PUSCH time-frequency resource #1 | DMRS port #1 |

For another example, when the PUSCH resource units are sorted first in ascending order of the sequence numbers of the PUSCH time-frequency resources, and then in ascending order of the sequence numbers of the DMRS ports, an index of a PUSCH time-frequency and an index of a corresponding resource corresponding to a PUSCH resource unit #a is $$\left\lfloor \frac{a}{H} \right\rfloor,$$

and an index of a corresponding DMRS port is a mod L. H is a quantity of PUSCH time-frequency resources in a PUSCH time-frequency resource block.

For example, there are two PUSCH time-frequency resources, and each PUSCH time-frequency resource corresponds to two DMRS ports. In this case, the two PUSCH time-frequency resources include four PUSCH resource units. An order of the four PUSCH resource units may be shown in Table 10. The four PUSCH resource units are numbered first in ascending order of sequence numbers of the time-frequency resources and then in ascending order of sequence numbers of the DMRS ports.

TABLE 10

| PUSCH resource unit #0 | PUSCH time-frequency resource #0 | DMRS port #0 |
|---|---|---|
| PUSCH resource unit #1 | PUSCH time-frequency resource #1 | DMRS port #0 |
| PUSCH resource unit #2 | PUSCH time-frequency resource #0 | DMRS port #1 |
| PUSCH resource unit #3 | PUSCH time-frequency resource #1 | DMRS port #1 |

The order of the PUSCH time-frequency resources may be understood as that the PUSCH time-frequency resources are sorted first in ascending order of frequency domain resources and then in ascending order of time domain resources. Alternatively, the order of the PUSCH time-frequency resources may be understood as that the PUSCH time-frequency resources are sorted first in ascending order of time domain resources and then in ascending order of frequency domain resources. For specific content, refer to the foregoing descriptions of related content. Details are not described herein again.

It should be noted that, that the DMRS ports are numbered in an order of indexes of antenna ports is used as an example for description above. The DMRS ports may alternatively be numbered in another order. This is not limited in the embodiments of this application.

For example, when the network device configures a plurality of scrambling IDs or reference signal IDs used to generate DMRS sequences, the network device may further number the DMRSs with reference to indexes of the scrambling IDs or the reference signal IDs. For example, the order of the DMRS ports may alternatively be understood as that the DMRS ports are numbered first in ascending order of the indexes of the scrambling IDs or the reference signal IDs for generating the DMRS sequences, and then in ascending order of the indexes of the antenna ports. Alternatively, the order of the DMRS ports may be understood as that the DMRS ports are numbered first in ascending order of the indexes of the antenna ports, and then in ascending order of the indexes of the scrambling IDs or the reference signal IDs for generating the DMRS sequences. It can be learned from the foregoing related description in Table 5 that different antenna ports correspond to different DMRS configurations.

For example, one PUSCH resource unit includes two antenna ports, and each antenna port includes two DMRS sequences generated by using different IDs. In this case, the PUSCH resource unit includes four DMRS ports. An order of the four DMRS ports may be shown in Table 11. The four DMRS ports are numbered first in ascending order of indexes of scrambling IDs for generating DMRS sequences, and then in ascending order of indexes of the antenna ports.

TABLE 11

| DMRS port #0 | DMRS configuration corresponding to an antenna port #0 | DMRS sequence generated by using a scrambling ID #0 |
|---|---|---|
| DMRS port #1 | DMRS configuration corresponding to the antenna port #0 | DMRS sequence generated by using a scrambling ID #1 |

TABLE 11-continued

| DMRS port #2 | DMRS configuration corresponding to an antenna port #1 | DMRS sequence generated by using a scrambling ID #0 |
|---|---|---|
| DMRS port #3 | DMRS configuration corresponding to the antenna port #1 | DMRS sequence generated by using a scrambling ID #1 |

For another example, one PUSCH resource unit includes two antenna ports, and each antenna port includes two DMRS sequences generated by using different IDs. In this case, the PUSCH resource unit includes four DMRS ports. An order of the four DMRS ports may be shown in Table 12. The four DMRS ports are numbered first in ascending order of indexes of the antenna ports, and then in ascending order of indexes of scrambling IDs for generating DMRS sequences.

TABLE 12

| DMRS port #0 | DMRS configuration corresponding to an antenna port #0 | DMRS sequence generated by using a scrambling ID #0 |
|---|---|---|
| DMRS port #1 | DMRS configuration corresponding to an antenna port #1 | DMRS sequence generated by using a scrambling ID #0 |
| DMRS port #2 | DMRS configuration corresponding to the antenna port #0 | DMRS sequence generated by using a scrambling ID #1 |
| DMRS port #3 | DMRS configuration corresponding to the antenna port #1 | DMRS sequence generated by using a scrambling ID #1 |

After the order of the preamble sequences and the order of the PUSCH resource units are determined, the mapping relationship between the preamble sequence and the PUSCH resource unit may be established based on the two orders.

In some embodiments, when a mapping relationship between a preamble sequence in each PRACH time-frequency resource group and a PUSCH time-frequency resource in a corresponding PUSCH time-frequency resource block is established, all preamble sequences are consecutively mapped in an order of the preamble sequences and an order of PUSCH resource units, and every F preamble sequences with consecutive sequence numbers in all the preamble sequences are mapped to one PUSCH resource unit.

For example, when F<1, one preamble sequence is mapped to 1/F PUSCH resource units with consecutive sequence numbers, and a preamble sequence #n is mapped to PUSCH resource units #(n*F) to #((n+1)*F−1). When F≥1, a preamble sequence #n is mapped to a PUSCH resource unit $$\#\left\lfloor \frac{n}{F} \right\rfloor.$$

It should be noted that, when a quantity (denoted as P) of preamble sequences in a PRACH time-frequency resource group is not a multiple or a divisor of a quantity (that is, H) of PUSCH resource units of a PUSCH time-frequency resource block corresponding to the PRACH time-frequency resource group, in the PRACH time-frequency resource group, a quantity of preamble sequences in a part mapped to a PUSCH resource unit is different from a quantity of preamble sequences in the other part mapped to a PUSCH resource unit.

Specifically, in this case, every F preamble sequences with consecutive sequence numbers in the part of the preamble sequences are mapped to one PUSCH resource unit. When F≤1, each of the other part of the preamble sequences is mapped to $$\frac{1}{F}+1$$

PUSCH resource units. When F>1, every F−1 preamble sequences in the other part of the preamble sequences are mapped to one PUSCH resource unit. A specific quantity of preamble sequences included in each part may be calculated by using the quantity (P) of the preamble sequences in the PRACH time-frequency resource group, the quantity (H) of the PUSCH resource units in the PUSCH time-frequency resource block, and the parameter F. This mapping manner can ensure that each PUSCH resource unit in a PUSCH time-frequency resource block is mapped to a preamble sequence, thereby improving utilization of the PUSCH resource unit.

For example, when F≤1, the first $$P\left(\frac{1}{F}+1\right)-E^*H$$

preamble sequences are sequentially mapped to $$\frac{1}{F}$$

PUSCH resource units with consecutive sequence numbers, and the last $$E^*H-\frac{P}{F}$$

preamble sequences are sequentially mapped to $$\frac{1}{F}+1$$

PUSCH resource units with consecutive sequence numbers. Alternatively, the first $$E^*H-\frac{P}{L}$$

preamble sequences are sequentially mapped to $$\frac{1}{F}+1$$

PUSCH resource units with consecutive sequence numbers, and the last $$P\left(\frac{1}{F}+1\right)-E^*H$$

preamble sequences are sequentially mapped to $$\frac{1}{F}$$

PUSCH resource units with consecutive sequence numbers, units with consecutive sequence numbers.

For another example, when F>1, every F consecutive preamble sequences in the first F(P−E*H*(F−1)) preamble sequences are mapped to one PUSCH resource unit, and every F−1 consecutive preamble sequences in the last (F−1)*(F*E*H−P) preamble sequences are mapped to one PUSCH resource unit. Alternatively, every F−1 consecutive preamble sequences in the first (F−1)*(F*E*H−P) preamble sequences are mapped to one PUSCH resource unit, and every F consecutive preamble sequences in the last F(P−E*H*(F−1)) preamble sequences are mapped to one PUSCH resource unit.

In this application, the network device may alternatively not configure the parameter F. That is, a rule of mapping a preamble sequence to a PUSCH resource unit is predefined. In this case, a mapping relationship between the preamble sequence and the PUSCH resource unit may be directly established according to the predefined mapping rule. In other words, the third configuration information may not include the parameter F.

In some embodiments, first, F may be calculated based on a quantity of preamble sequences in the PRACH time-frequency resource group and a quantity of PUSCH resource units in the PUSCH time-frequency resource block.

For example, when P≤E*H, $$F=\frac{1}{\left\lfloor\frac{E*H}{P}\right\rfloor}.$$

When P>E*H, $$F=\left\lceil\frac{P}{E*H}\right\rceil,$$

where [X] represents a minimum integer greater than or equal to X.

Then, the preamble sequence is mapped to the PUSCH resource unit by using a mapping method the same as that in the foregoing embodiment.

In some other embodiments, a predefined mapping method is: When a mapping relationship between a preamble sequence in each PRACH time-frequency resource group and a PUSCH time-frequency resource in a corresponding PUSCH time-frequency resource block is established, based on an order of preamble sequences and an order of PUSCH resource units, recurrent mapping is performed in a one-to-one manner until each preamble sequence in each PRACH time-frequency resource group is mapped to at least one PUSCH resource unit.

For example, a preamble sequence #n is mapped to a PUSCH resource unit #(n mod (E*H)).

In some other embodiments, a predefined mapping method is: When a mapping relationship between a preamble sequence in each PRACH time-frequency resource group and a PUSCH time-frequency resource in a corresponding PUSCH time-frequency resource block is established, based on an order of preamble sequences and an order of PUSCH resource units, recurrent mapping is performed in a one-to-one manner when P<E*H, until each PUSCH resource unit in each PUSCH time-frequency resource block is mapped to at least one preamble sequence.

For example, when P<E*H, a preamble sequence #n is mapped to a PUSCH resource unit #(P*(i+n)). A value of i is any integer greater than or equal to 0 and less than $$\frac{E*H-n}{P}.$$

In another embodiment, when one PRACH time-frequency resource group includes a plurality of groups of preamble sequences, and preamble sequences in different groups need to use PUSCH time-frequency resources of different sizes, the PUSCH time-frequency resources of the different sizes may also be configured in the third configuration information.

Specifically, the third configuration information may include size information of two or more types of PUSCH time-frequency resources.

The third configuration information may include a parameter $N_5$ configured for a preamble in each group. That is, the third configuration information includes a plurality of values of $N_8$. For other content, refer to the foregoing description. Details are not described herein again.

In a case, the PRACH time-frequency resource group including the plurality of groups of preamble sequences is mapped to one PUSCH time-frequency resource block. In this case, the PUSCH time-frequency resource block may be configured as PUSCH time-frequency resources of different sizes. That is, the PUSCH time-frequency resource block may include PUSCH time-frequency resources of different sizes.

Figure 22:
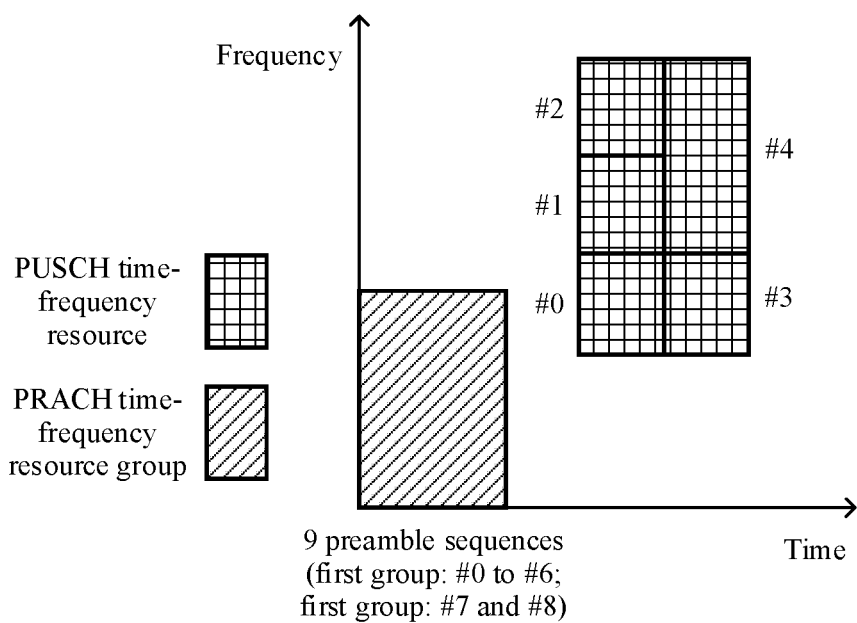
FIG. 22 is a schematic diagram of another method for mapping between a preamble sequence and a PUSCH time-frequency resource according to an embodiment of this application.

For example, referring to FIG. 22, it is assumed that one PRACH time-frequency resource group includes 10 preamble sequences, which are divided into two groups. A first group includes seven preamble sequences, which are specifically a preamble sequence #0 to a preamble sequence #6. A first group includes two preamble sequences, which are specifically a preamble sequence #7 and a preamble sequence #8. In addition, a PUSCH time-frequency resource block corresponding to the PRACH time-frequency resource includes five PUSCH time-frequency resources (including two types of PUSCH time-frequency resources of different sizes). In addition, a quantity of DMRS ports associated with the PUSCH time-frequency resource block is 8. In addition, in the third configuration information, $N_8=2$. In other words, every two preamble sequences are mapped to one time-frequency resource. In this case, a specific mapping relationship is as follows:

the preamble sequence #0 is mapped to a PUSCH time-frequency resource #0: a DMRS port #0 to a DMRS port #3;

the preamble sequence #1 is mapped to the PUSCH time-frequency resource #0: a DMRS port #4 to a DMRS port #7;

the preamble sequence #6 is mapped to a PUSCH time-frequency resource #3: a DMRS port #0 to a DMRS port #3;

the preamble sequence #7 is mapped to a PUSCH time-frequency resource #0: a DMRS port #0 to a DMRS port #3; and the preamble sequence #8 is mapped to the PUSCH time-frequency resource #0: a DMRS port #4 to a DMRS port #7.

It can be learned from the foregoing that a DMRS port #4 to a DMRS port #7 of the PUSCH time-frequency resource #3 do not participate in mapping, and are different from transmitting an MsgA message in a two-step random access procedure.

In another case, the PRACH time-frequency resource group including the plurality of groups of preamble sequences is mapped to a plurality of PUSCH time-frequency resource blocks. In this case, different PUSCH time-frequency resource blocks may be configured as PUSCH time-frequency resources of different sizes. In other words, different PUSCH time-frequency resource blocks include time-frequency resources of different sizes, but one PUSCH time-frequency resource block includes a same time-frequency resource.

Figure 23:
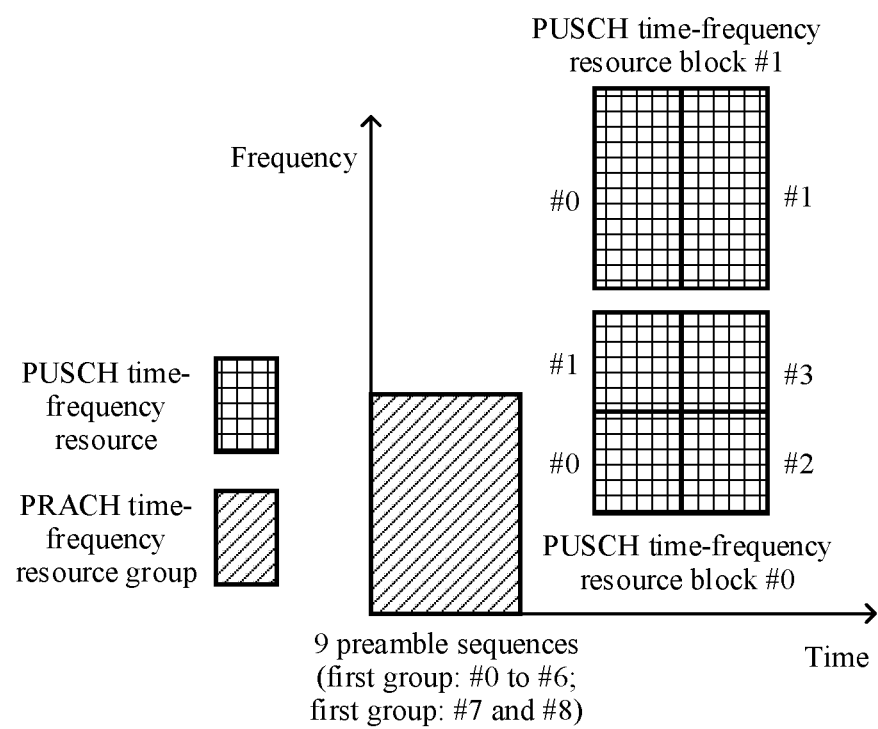
FIG. 23 is a schematic diagram of still another method for mapping between a preamble sequence and a PUSCH time-frequency resource according to an embodiment of this application.

For another example, referring to FIG. 23, it is assumed that one PRACH time-frequency resource group includes 10 preamble sequences, which are divided into two groups. A first group includes seven preamble sequences, which are specifically a preamble sequence #0 to a preamble sequence #6. A first group includes two preamble sequences, which are specifically a preamble sequence #7 and a preamble sequence #8. In addition, PUSCH time-frequency resource blocks corresponding to the PRACH time-frequency resource include a PUSCH time-frequency resource block #0 and a PUSCH time-frequency resource block #1. The PUSCH time-frequency resource block #0 includes four PUSCH time-frequency resources, and the PUSCH time-frequency resource block #1 includes two PUSCH time-frequency resources. In addition, a quantity of DMRS ports associated with the PUSCH time-frequency resource block is 8. In addition, in the third configuration information, $N_5=2$. In other words, every two preamble sequences are mapped to one time-frequency resource. In this case, a specific mapping relationship is as follows:

the preamble sequence #0 is mapped to a PUSCH time-frequency resource #0 of the PUSCH time-frequency resource block #0: a DMRS port #0 to a DMRS port #3;

the preamble sequence #1 is mapped to the PUSCH time-frequency resource #0 of the PUSCH time-frequency resource block #0: a DMRS port #4 to a DMRS port #7;

the preamble sequence #6 is mapped to a PUSCH time-frequency resource #3 of the PUSCH time-frequency resource block #0: a DMRS port #0 to a DMRS port #3;

the preamble sequence #7 is mapped to a PUSCH time-frequency resource #0 of the PUSCH time-frequency resource block #1: a DMRS port #0 to a DMRS port #3; and the preamble sequence #8 is mapped to the PUSCH time-frequency resource #0 of the PUSCH time-frequency resource block #0: a DMRS port #4 to a DMRS port #7;

It can be learned from the foregoing that none of a DMRS port #4 to a DMRS port #7 of the PUSCH time-frequency resource #3 of the PUSCH time-frequency resource block #0 and a DMRS port #1 to a DMRS port #7 of a PUSCH time-frequency resource #1 of the PUSCH time-frequency resource block #1 participates in mapping, and is different from transmitting an MsgA message in a two-step random access procedure.

It should be noted that the foregoing embodiments may be combined randomly on a premise that the solutions are not contradictory. That is, in the random access method provided in the embodiments of this application, the mapping relationship between the preamble sequence and the PUSCH time-frequency resource can be established. Division into the first configuration information, the second configuration information, and the third configuration information is merely intended to describe the method in this application, and does not constitute a specific limitation on the first configuration information, the second configuration information, and the third configuration information. That is, some or all content of the first configuration information may be in the second configuration information or the third configuration information, some or all content of the second configuration information may be in the first configuration information or the third configuration information, and some or all content of the third configuration information may be in the first configuration information or the second configuration information.

For example, in an embodiment, first configuration information is the same as the first configuration information in the foregoing embodiments, and details are not described herein again.

Second configuration information and third configuration information are slightly different from the second configuration information and the third configuration information in the foregoing embodiments, and are specifically described below:

The second configuration information is similar to that in the first method, the network device may determine, by configuring a first mapping pattern, a PUSCH time-frequency resource block used for uplink transmission, and a correspondence between each PRACH time-frequency resource and the PUSCH time-frequency resource block used for uplink transmission.

Specifically, the second configuration information includes information about the first mapping image, and configuration and content of the first mapping pattern are the same as those in the first method. A difference between a function of the first mapping pattern and that in the first method is that in this embodiment, time domain resource configuration information and frequency domain resource configuration information that are determined by using each mapping 2-tuple in the first mapping pattern belong to one PUSCH time-frequency resource, while in the first method, the time domain resource configuration information and the frequency domain resource configuration information that are determined by using each mapping 2-tuple belong to one PUSCH time-frequency resource block. In other words, in this embodiment, the PUSCH time-frequency resource may be determined based on the second configuration information.

In this embodiment, the second configuration information may further include a quantity $M_1$ of PUSCH time-frequency resources that are frequency division multiplexed and/or a quantity $M_2$ of PUSCH time-frequency resources that are time division multiplexed. A PUSCH time-frequency resource block may be determined by combining the time domain resource configuration information and the frequency domain resource configuration information of the PUSCH time-frequency resource with the quantity $M_1$ of PUSCH time-frequency resources that are frequency division multiplexed and/or the quantity $M_2$ of PUSCH time-frequency resources that are time division multiplexed.

Compared with the foregoing embodiments, in this embodiment, the third configuration information may not include information for determining a PUSCH time-frequency resource, that is, may not include size information of the PUSCH time-frequency resource, a time domain interval, a frequency domain interval, a quantity of PUSCH time-frequency resources included in each PUSCH time-frequency resource block, or the like. The third configuration information may include a mapping relationship between each preamble sequence in a PRACH time-frequency resource and a PUSCH time-frequency resource. In other words, the third configuration information may include a quantity $N_8$ of preamble sequences mapped to one PUSCH time-frequency resource. For content of this part, refer to the foregoing description. Details are not described again.

An example in which the network device configures the PRACH time-frequency resource shown in FIG. 5A and the first mapping pattern includes two mapping 2-tuples is used to provide descriptions below with reference to the accompanying drawings.

The first mapped image is:

$(\{K, S, L\}, \{RB_{start}, L_{RBs}\}) = \{((\{1, 2, 12\} \{12, 2\}), (\{2, 2, 12\} \{6, 2\})\}$, where $M_1=3$, and $M_2=2$.

($\{1, 2, 12\} \{12, 2\}$) is a first mapping 2-tuple. It can be learned from the foregoing explanation of the mapping 2-tuple that the mapping 2-tuple indicates: A slot in which the first symbol of a PUSCH time-frequency resource obtained after mapping is located is the first slot following a slot occupied by the PRACH time-frequency resource, that is, one subframe herein: a start symbol is a symbol #2, and 12 symbols are occupied: a start RB is an RB #12, and 2 RBs are occupied. A quantity of PUSCH time-frequency resources that are frequency domain multiplexed is 3, that is, three PUSCH time-frequency resources are frequency division multiplexed in one slot. Start RBs are an RB #12, an RB #14, and an RB #16, and 2 RBs are occupied by each PUSCH time-frequency resource. A quantity of PUSCH time-frequency resources that are time domain multiplexed is 2, that is, there are three PUSCH time-frequency resources in each of two consecutive slots. Start symbols are all symbols #2, and 12 symbols are occupied by each PUSCH time-frequency resource. The six PUSCH time-frequency resources form one PUSCH time-frequency resource block. ($\{2, 2, 12\} \{6, 2\}$) is a second mapping 2-tuple, and a method for a PUSCH time-frequency resource and a PUSCH time-frequency resource block corresponding to the second mapping 2-tuple is the same as that for the first mapping 2-tuple.

Figure 24A:
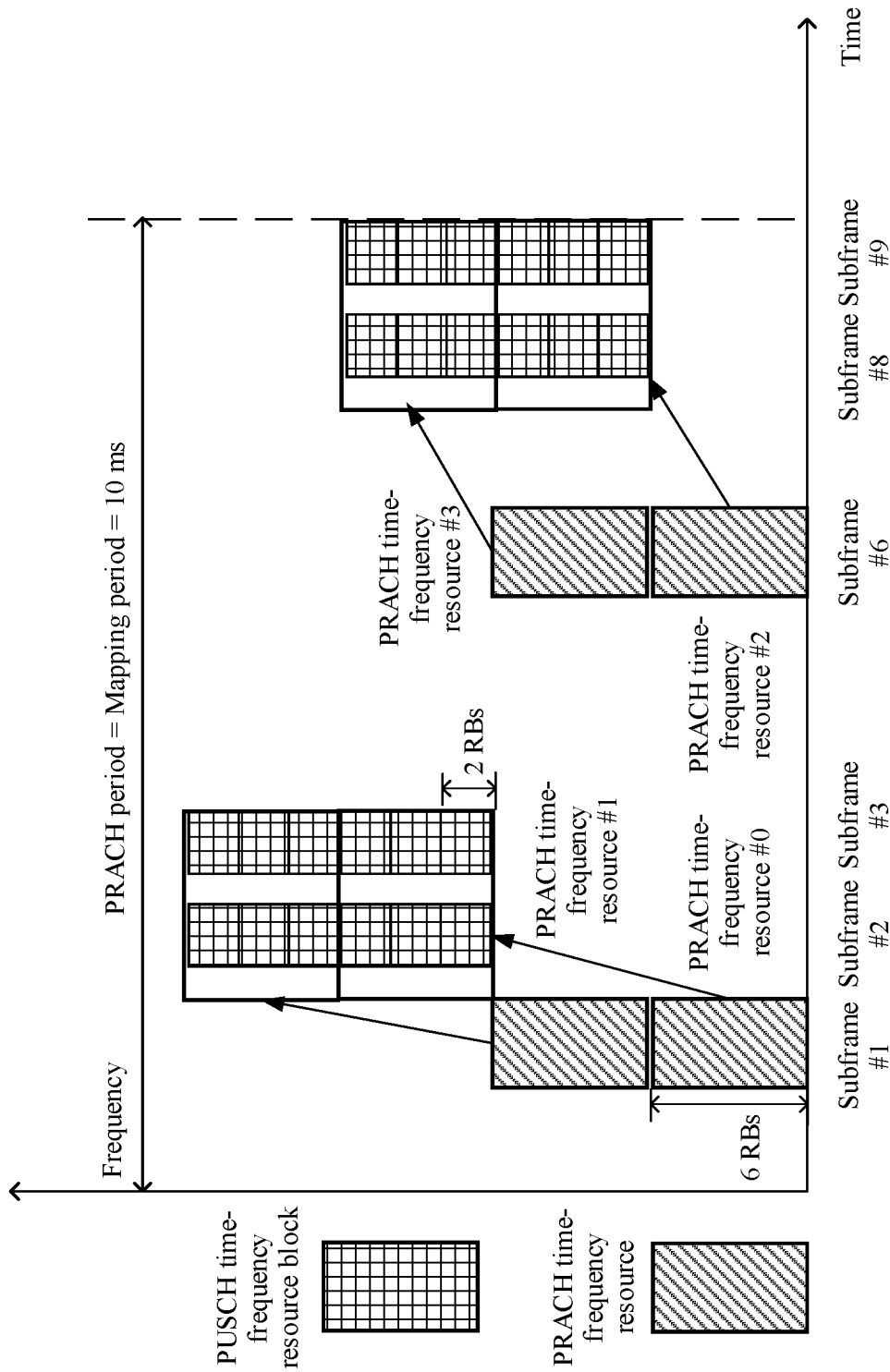
FIG. 24A is a schematic diagram of still another method for mapping between a preamble sequence and a PUSCH time-frequency resource according to an embodiment of this application.

For example, referring to FIG. 24A, when the network device configures $N_1=\frac{1}{2}$, it indicates that ½ of a mapping 2-tuple is used during mapping of one PRACH time-frequency resource. That is, two PRACH time-frequency resources use one mapping 2-tuple. During specific mapping, a PRACH time-frequency resource #0 is mapped by using a first mapping 2-tuple, and a PRACH time-frequency resource #1 is mapped also by using the first mapping 2-tuple. A PRACH time-frequency resource #2 is mapped by using a second mapping 2-tuple, and a PRACH time-frequency resource #3 is mapped also by using the second mapping 2-tuple. PUSCH time-frequency resources are obtained after the mapping, and then PUSCH time-frequency resource blocks are obtained based on the PUSCH time-frequency resources, $M_1$ and $M_2$. A correspondence between the PRACH time-frequency resources and the PUSCH time-frequency resource blocks is shown in FIG. 24A.

For other content, refer to descriptions of related content in the foregoing embodiment. Details are not described herein again.

The foregoing mainly describes the solutions provided in the embodiments of this application from a perspective of interaction between the network elements. It may be understood that to implement the foregoing functions, the network elements, such as the terminal and the network device, include a corresponding hardware structure and/or software module for performing each function. A person of ordinary skill in the art should easily be aware that, in combination with units and algorithms steps of the examples described in the embodiments disclosed in this specification, this application may be implemented by hardware, software, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the terminal and the network device may be divided into function modules based on the foregoing method examples. For example, each function module may be obtained through division based on each function, or two or more functions may be integrated in one processing module. The integrated module may be implemented in a form of hardware, or may be implemented in a form of a software function module. It should be noted that, in the embodiments of this application, division into the modules is an example, and is merely logical function division. In actual implementation, another division manner may be used. An example in which each function module is obtained through division based on each corresponding function is used below for description.

Figure 24B:
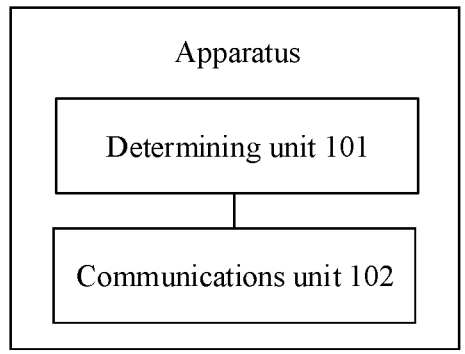
FIG. 24B is a schematic structural diagram of an apparatus according to an embodiment of this application.

FIG. 24B is a schematic structural diagram of an apparatus in the foregoing embodiments. The apparatus may implement a function of the terminal in the methods provided in the embodiments of this application. The apparatus may be a terminal or an apparatus that may support a terminal in implementing a function of the terminal in the embodiments of this application. For example, the apparatus is a chip system used in the terminal. The apparatus includes a determining unit 101 and a communications unit 102. The determining unit 101 may be configured to support the apparatus shown in FIG. 24B in performing steps S502. S503, and S504 in the foregoing embodiment. The communications unit 102 is configured to support the apparatus shown in FIG. 24B in performing steps S501. S505, and S506 in the foregoing embodiment. All related content of the steps in the foregoing method embodiments may be cited in function descriptions of the corresponding function modules. Details are not described herein again.

Optionally, in this embodiment of this application, the chip system may include a chip, or may include a chip and another discrete component.

Optionally, the communications unit in this embodiment of this application may be a circuit, a component, an interface, a bus, a software module, a transceiver, or any other apparatus that can implement communication.

Optionally, the communications unit 102 may be a communications interface of the terminal or a communications interface of the chip system used in the terminal. For example, the communications interface may be a transceiver circuit. The determining unit 101 may be integrated on a processor of the terminal or a processor of the chip system used in the terminal.

Figure 25:
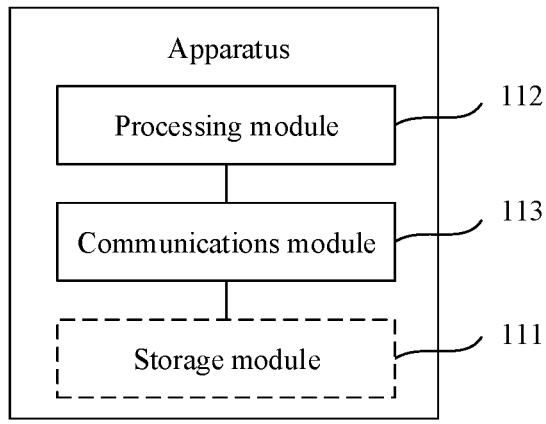
FIG. 25 is a schematic structural diagram of another apparatus according to an embodiment of this application.

FIG. 25 is a schematic diagram of a possible logical structure of an apparatus in the foregoing embodiments. The apparatus may implement a function of the terminal in the methods provided in the embodiments of this application. The apparatus may be a terminal or a chip system used in a terminal. The apparatus includes a processing module 112 and a communications module 113. The processing module 112 is configured to control and manage an action of the apparatus shown in FIG. 25. For example, the processing module 112 is configured to perform a step of message or data processing performed on the apparatus side shown in FIG. 25, for example, support the apparatus shown in FIG. 25 in performing steps S502. S503, and S504 in the foregoing embodiment. The communications module 113 is configured to support the apparatus shown in FIG. 25 in performing S501, S505, and S506 in the foregoing embodiment, and/or is configured to perform another process performed by the apparatus shown in FIG. 25 in the technology described in this specification. Optionally, the apparatus shown in FIG. 25 may further include a storage module 111, configured to store program code and data of the apparatus.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in the embodiments of this application. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 26:
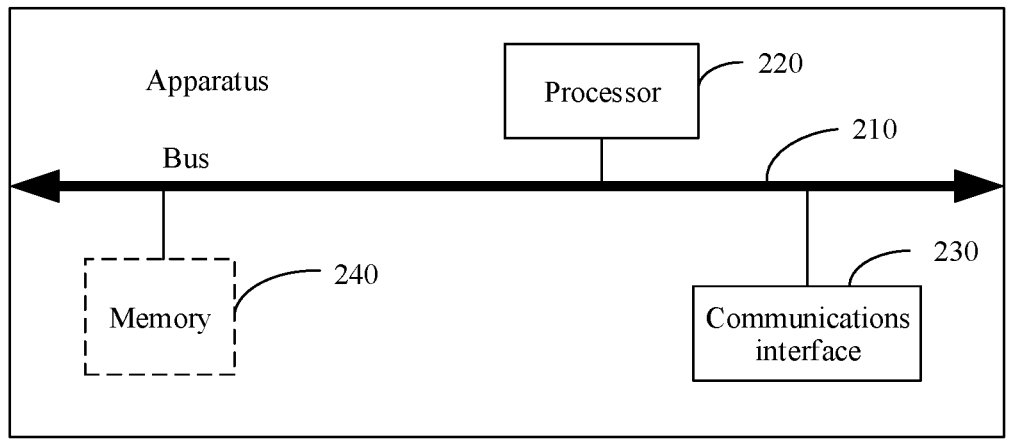
FIG. 26 is a schematic structural diagram of still another apparatus according to an embodiment of this application.

When the processing module 112 is a processor 220, the communications module 113 is a communications interface 230 or a transceiver, and the storage module 111 is a memory 240, the apparatus in this embodiment of this application may be an apparatus shown in FIG. 26.

The communications interface 230, at least one processor 220, and the memory 240) are connected to each other by using a bus 210. The bus 210 may be a PCI bus, an EISA bus, or the like. The bus may be classified into an address bus, a data bus, a control bus, and the like. For ease of representation, only one thick line is used to represent the bus in FIG. 26, but this does not mean that there is only one bus or only one type of bus. The memory 240 is configured to store program code and data of the apparatus. The communications interface 230 is configured to support the apparatus in communicating with another device. The processor 220) is configured to support the apparatus in executing the program code stored in the memory 240), to implement the data channel transmission method provided in the embodiments of this application.

Optionally, the memory 240 may be included in the processor 220.

Figure 27:
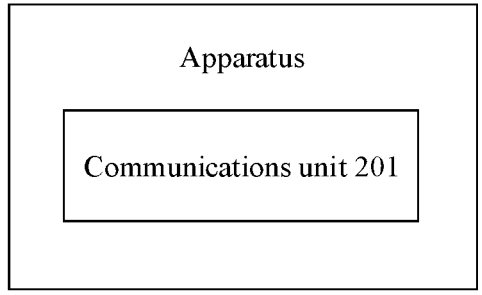
FIG. 27 is a schematic structural diagram of still another apparatus according to an embodiment of this application.

FIG. 27 is a possible schematic structural diagram of an apparatus in the foregoing embodiments. The apparatus may implement a function of the network device in the methods provided in the embodiments of this application. The apparatus may be a network device or a chip system used in a network device. The apparatus includes a communications unit 201, configured to support the apparatus shown in FIG. 27 in performing steps S501, S505, and S506 in the foregoing embodiment, and/or configured to perform another process in the technology described in this specification. All related content of the steps in the foregoing method embodiments may be cited in function descriptions of the corresponding function modules. Details are not described herein again.

Optionally, the communications unit 201 may be a communications interface of the network device or a communications interface of the chip system used in the network device, for example, a transceiver.

Figure 28:
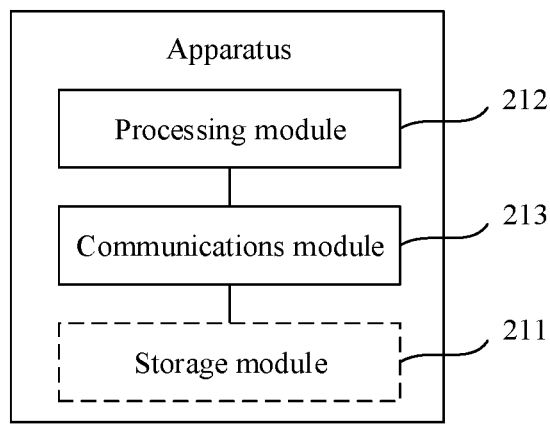
FIG. 28 is a schematic structural diagram of still another apparatus according to an embodiment of this application.

FIG. 28 is a possible schematic structural diagram of an apparatus in the foregoing embodiments. The apparatus may implement a function of the network device in the methods provided in the embodiments of this application. The apparatus may be a network device or a chip system used in a network device. The apparatus includes a processing module 212 and a communications module 213. The processing module 212 is configured to control and manage an action of the apparatus. For example, the processing module 212 is configured to support the apparatus shown in FIG. 28 in performing a message or data processing operation on the apparatus side shown in FIG. 28 in the foregoing embodiment. The communications module 213 is configured to support the apparatus shown in FIG. 28 in performing operations of receiving and sending a message or data on the apparatus side in the foregoing embodiment, for example, steps S501, S505, and S506 in the foregoing embodiment, and/or is configured to perform another process performed by the apparatus shown in FIG. 28 in the technology described in this specification.

Optionally, the apparatus shown in FIG. 28 may further include a storage module 211, configured to store program code and data of the apparatus.

The processing module 212 may be a processor or controller, for example, may be a central processing unit, a general-purpose processor, a digital signal processor, an application-specific integrated circuit, a field-programmable gate array or another programmable logic device, a transistor logic device, a hardware component, or any combination thereof. The processor may implement or execute various example logical blocks, modules, and circuits described with reference to content disclosed in the embodiments of this application. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 29:
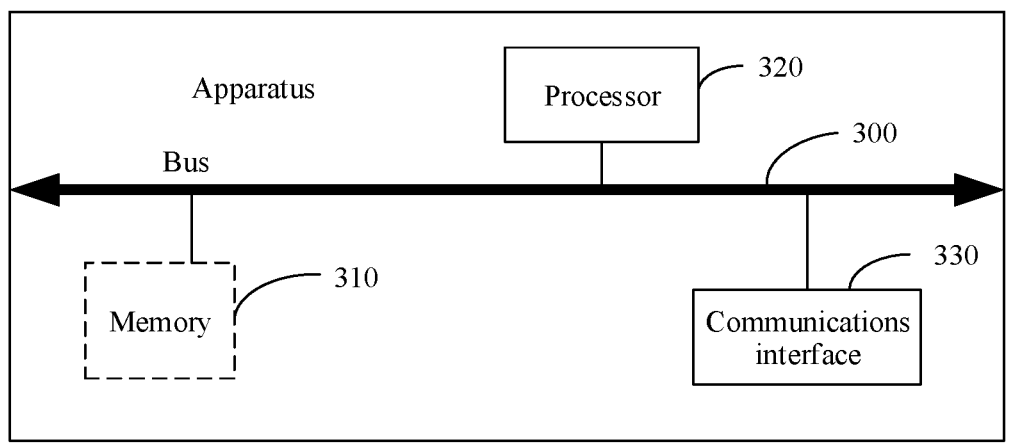
FIG. 29 is a schematic structural diagram of still another apparatus according to an embodiment of this application.

When the processing module 212 is a processor 320, the communications module 213 is a communications interface 330 or a transceiver, and the storage module 211 is a memory 310, the data channel receiving apparatus in the embodiments of this application may be an apparatus shown in FIG. 29.

The communications interface 330, at least one processor 320, and the memory 310 are connected to each other by using a bus 300. The bus 300 may be a PCI bus, an EISA bus, or the like. The bus may be classified into an address bus, a data bus, a control bus, and the like. For ease of representation, only one thick line is used to represent the bus in FIG. 29, but this does not mean that there is only one bus or only one type of bus. The memory 310 is configured to store program code and data of the apparatus. The communications interface 330 is configured to support the apparatus in communicating with another device (for example, the apparatuses shown in FIG. 15B to FIG. 17). The processor 320 is configured to support the apparatus in executing the program code stored in the memory 310, to implement the random access method provided in this application.

Optionally, the memory 310 may be included in the processor 320.

In a possible implementation, the apparatuses shown in FIG. 26 and FIG. 29 in this application may alternatively be chip systems. For steps performed by components in the chip systems, refer to the steps performed by the apparatuses shown in FIG. 16 and FIG. 29 in the foregoing embodiments. Details are not described herein again in this application.

All or some of the methods in the embodiments of this application may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, a network device, a terminal, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In an aspect, a computer-readable storage medium is provided. The computer-readable storage medium stores an instruction, and when the instruction is run on a computer, the computer is enabled to perform S501, S502, S503, S504, S505, and S506 in the foregoing embodiment, and/or is configured to perform another process performed by a terminal or a chip system used in a terminal in the technology described in this specification. The foregoing readable storage medium may include any medium that can store program code, such as a USB flash drive, a removable hard disk, a read-only memory, a random access memory, a magnetic disk, or an optical disc.

In another aspect, a computer-readable storage medium is provided. The computer-readable storage medium stores an instruction, and when the instruction is run on a computer, the computer is enabled to perform steps S501, S505, and S506 in the foregoing embodiment, In an aspect, a computer program product including an instruction is provided. When the instruction is run on a computer, the computer is enabled to perform S501, S502, S503, S504, S505, and S506.

In another aspect, a computer program product including an instruction is provided. When the instruction is run on a computer, the computer is enabled to perform S501, S505, and S506 in the foregoing embodiment.

In an aspect, a chip system is provided. The chip system includes a processor, and may further include a memory, configured to implement S501, S502, S503, S504, and S505 in the foregoing embodiment.

In another aspect, a chip system is provided. The chip system includes a processor, and may further include a memory, configured to implement functions of the network device in the foregoing embodiments. The chip system includes at least one processor and an interface circuit. The interface circuit is interconnected with the at least one processor by using a line. The processor is configured to run an instruction, to perform steps S501, S505, and S506 in the foregoing embodiment.

In addition, this application further provides a communications system. The communications system includes the terminal shown in any one of FIG. 24B to FIG. 26, and the network device shown in any one of FIG. 27 to FIG. 29.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the foregoing described apparatus embodiment is merely an example. For example, division into units is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application should be subject to the protection scope of the claims.

What is claimed is:

1. A random access method comprising:
   receiving, by a terminal, first configuration information, second configuration information, and third configuration information that are sent by a network device,
      wherein the first configuration information is used to configure one or more physical random access channel (PRACH) time-frequency resources and a preamble sequence set,
      wherein the second configuration information is used to configure a physical uplink shared channel (PUSCH) time-frequency resource block associated with a PRACH time-frequency resource group,
      wherein the PUSCH time-frequency resource block comprises one or more PUSCH time-frequency resources,
      wherein PRACH time-frequency resources of the one or more PRACH time-frequency resources located in a same slot belong to one PRACH time-frequency resource group, and
      wherein the third configuration information is used to configure at least one of a size of each PUSCH time-frequency resource, a time domain interval between adjacent PUSCH time-frequency resources, a frequency domain interval between adjacent PUSCH time-frequency resources, and a quantity of PUSCH time-frequency resources included in each PUSCH time-frequency resource block;
   determining a first PRACH time-frequency resource based on the first configuration information;
   determining a first preamble sequence to be sent on the first PRACH time-frequency resource, wherein the first preamble sequence is a preamble sequence in the preamble sequence set;
   determining a PUSCH time-frequency resource associated with the first preamble sequence, based on the first PRACH time-frequency resource, the first preamble sequence, the second configuration information, and the third configuration information; and
   sending a first message comprising the first preamble sequence and uplink data,
      wherein the first preamble sequence is carried on the first PRACH time-frequency resource, and
      wherein the uplink data is carried on the PUSCH time-frequency resource associated with the first preamble sequence carried on the first PRACH time-frequency resource.

2. The method according to claim 1, wherein the second configuration information comprises information used for configuring a demodulation reference signal (DMRS) port associated with the PUSCH time-frequency resource block.

3. The method according to claim 1, wherein the second configuration information comprises configuration information of a first mapping pattern, the first mapping pattern comprises one or more mapping rules, and each mapping rule is used together with at least one PRACH time-frequency resource to determine a time domain resource and a frequency domain resource of at least one PUSCH time-frequency resource block.

4. The method according to claim 3, wherein the second configuration information further comprises a period used to configure the PUSCH time-frequency resource block, and the first mapping pattern is used to determine a PUSCH time-frequency resource block associated with a PRACH time-frequency resource in the period.

5. The method according to claim 3, wherein the second configuration information further comprises a parameter $N_1$, and the parameter $N_1$ is used to determine a quantity of PUSCH time-frequency resource blocks associated with each PRACH time-frequency resource.

6. The method according to claim 1, wherein the third configuration information comprises the size of each PUSCH time-frequency resource and a parameter $N_8$, and the parameter $N_8$ is used to determine a quantity of PUSCH time-frequency resources associated with each preamble sequence.

7. The method according to claim 6, wherein determining the PUSCH time-frequency resource associated with the first preamble sequence, based on the first PRACH time-frequency resource, the first preamble sequence, the second configuration information, and the third configuration information comprises:
    determining the PUSCH time-frequency resource associated with the first preamble sequence, based on a preset order of mapping from PRACH time-frequency resources to PUSCH time-frequency resource blocks, a preset order of mapping from preamble sequences to PUSCH time-frequency resources, the first PRACH time-frequency resource, the first preamble sequence, the second configuration information, and the third configuration information.

8. The method according to claim 7, further comprising determining, based on a preset order of mapping from preamble sequences to demodulation reference signal (DMRS) ports, a DMRS port associated with the PUSCH time-frequency resource associated with the first PRACH time-frequency resource.

9. A random access apparatus comprising a receiver and a processor, wherein
    the receiver is configured to cooperate with the processor to receive first configuration information, second configuration information, and third configuration information that are sent by a network device,
        wherein the first configuration information is used to configure one or more physical random access channel (PRACH) time-frequency resources and a preamble sequence set, and
        wherein the second configuration information is used to configure a physical uplink shared channel (PUSCH) time-frequency resource block associated with a PRACH time-frequency resource group;
        the PUSCH time-frequency resource block comprises one or more PUSCH time-frequency resources,
        wherein PRACH time-frequency resources of the one or more PRACH time-frequency resources located in a same slot belong to one PRACH time-frequency resource group, and
        wherein the third configuration information is used to configure at least one of a size of each PUSCH time-frequency resource, a time domain interval between adjacent PUSCH time-frequency resources, a frequency domain interval between adjacent PUSCH time-frequency resources, and a quantity of PUSCH time-frequency resources included in each PUSCH time-frequency resource block;
    the processor is configured to determine a first PRACH time-frequency resource based on the first configuration information;
    the processor is further configured to determine a first preamble sequence to be sent on the first PRACH time-frequency resource, wherein the first preamble sequence is a preamble sequence in the preamble sequence set;
    the processor is further configured to determine a PUSCH time-frequency resource associated with the first preamble sequence, based on the first PRACH time-frequency resource, the first preamble sequence, the second configuration information, and the third configuration information; and
    the receiver is further configured to cooperate with the processor to send a first message comprising the first preamble sequence and uplink data,
        wherein the first preamble sequence is carried on the first PRACH time-frequency resource, and the uplink data is carried on the PUSCH time-frequency resource associated with the first preamble sequence carried on the first PRACH time-frequency resource.

10. The apparatus according to claim 9, wherein the second configuration information comprises information used for configuring a demodulation reference signal (DMRS) port associated with the PUSCH time-frequency resource block.

11. The apparatus according to claim 9, wherein the second configuration information comprises configuration information of a first mapping pattern, the first mapping pattern comprises one or more mapping rules, and each mapping rule may be used together with at least one PRACH time-frequency resource to determine a time domain resource and a frequency domain resource of at least one PUSCH time-frequency resource block.

12. The apparatus according to claim 11, wherein the second configuration information further comprises a period used to configure the PUSCH time-frequency resource block, and the first mapping pattern is used to determine a PUSCH time-frequency resource block associated with a PRACH time-frequency resource in the period.

13. The apparatus according to claim 11, wherein the second configuration information further comprises a parameter $N_1$, and the parameter $N_1$ is used to determine a quantity of PUSCH time-frequency resource blocks associated with each PRACH time-frequency resource.

14. The apparatus according to claim 13, wherein the parameter $N_1$ and the first mapping pattern are used to determine the PUSCH time-frequency resource block associated with each PRACH time-frequency resource.

15. The apparatus according to claim 9, wherein the third configuration information comprises the size of each PUSCH time-frequency resource and a parameter $N_8$, and the parameter $N_8$ is used to determine a quantity of PUSCH time-frequency resources associated with each preamble sequence.

16. The apparatus according to claim 15, wherein in connection with determining the PUSCH time-frequency resource associated with the first preamble sequence the processor is configured to:
    determine the PUSCH time-frequency resource associated with the first preamble sequence, based on a preset order of mapping from PRACH time-frequency resources to PUSCH time-frequency resource blocks, a preset order of mapping from preamble sequences to PUSCH time-frequency resources, the first PRACH time-frequency resource, the first preamble sequence, the second configuration information, and the third configuration information.

17. The apparatus according to claim 16, wherein the processor is further configured to:
  determine, based on a preset order of mapping from preamble sequences to demodulation reference signal (DMRS) ports, a DMRS port associated with the PUSCH time-frequency resource associated with the first PRACH time-frequency resource.

18. A random access apparatus comprising a receiver and a processor, wherein
  the receiver is configured to cooperate with the processor to send first configuration information, second configuration information, and third configuration information to a terminal,
    wherein the first configuration information is used to configure one or more physical random access channel (PRACH) time-frequency resources and a preamble sequence set,
    wherein the second configuration information is used to configure a physical uplink shared channel (PUSCH) time-frequency resource block associated with a PRACH time-frequency resource group,
    wherein the PUSCH time-frequency resource block comprises one or more PUSCH time-frequency resources,
    wherein PRACH time-frequency resources of the one or more PRACH time-frequency resources located in a same slot belong to one PRACH time-frequency resource group, and
    wherein the third configuration information is used to configure at least one of a size of each PUSCH time-frequency resource, a time domain interval between adjacent PUSCH time-frequency resources, a frequency domain interval between adjacent PUSCH time-frequency resources, and a quantity of PUSCH time-frequency resources included in each PUSCH time-frequency resource block; and
  the receiver is further configured to cooperate with the processor to receive a first message that comprises a first preamble sequence and uplink data and that is sent by the terminal,
    wherein the first preamble sequence is carried on a first PRACH time-frequency resource, and the uplink data is carried on a PUSCH time-frequency resource associated with the first preamble sequence carried on the first PRACH time-frequency resource.

19. A non-transitory computer-readable storage medium, comprising a processor-executable instruction, wherein when the instruction is run on a computer, the computer is caused to perform a method comprising:
  receiving first configuration information, second configuration information, and third configuration information that are sent by a network device,
    wherein the first configuration information is used to configure one or more physical random access channel (PRACH) time-frequency resources and a preamble sequence set,
    wherein the second configuration information is used to configure a physical uplink shared channel (PUSCH) time-frequency resource block associated with a PRACH time-frequency resource group,
    wherein the PUSCH time-frequency resource block comprises one or more PUSCH time-frequency resources,
    wherein PRACH time-frequency resources of the one or more PRACH time-frequency resources located in a same slot belong to one PRACH time-frequency resource group, and
    wherein the third configuration information is used to configure at least one of a size of each PUSCH time-frequency resource, a time domain interval between adjacent PUSCH time-frequency resources, a frequency domain interval between adjacent PUSCH time-frequency resources, and a quantity of PUSCH time-frequency resources included in each PUSCH time-frequency resource block;
  determining a first PRACH time-frequency resource based on the first configuration information;
  determining a first preamble sequence to be sent on the first PRACH time-frequency resource, wherein the first preamble sequence is a preamble sequence in the preamble sequence set;
  determining a PUSCH time-frequency resource associated with the first preamble sequence, based on the first PRACH time-frequency resource, the first preamble sequence, the second configuration information, and the third configuration information; and
  sending a first message comprising the first preamble sequence and uplink data,
    wherein the first preamble sequence is carried on the first PRACH time-frequency resource, and
    wherein the uplink data is carried on the PUSCH time-frequency resource associated with the first preamble sequence carried on the first PRACH time-frequency resource.

20. The non-transitory computer-readable storage medium according to claim 19, wherein the second configuration information comprises information used for configuring a demodulation reference signal (DMRS) port associated with the PUSCH time-frequency resource block.

* * * * *